United States Patent
Joshi et al.

(10) Patent No.: US 9,513,874 B2
(45) Date of Patent: Dec. 6, 2016

(54) ENTERPRISE COMPUTING PLATFORM WITH SUPPORT FOR EDITING DOCUMENTS VIA LOGICAL VIEWS

(75) Inventors: Dinesh Govind Joshi, Thane (IN); Mahesh Huyilalu Shivaram, Bangalore (IN); Ganesan Kaushik, Bangalore (IN); Subramanian Baskaran, Bangalore (IN); Vinoop Aradhya, Bangalore (IN)

(73) Assignee: Infosys Limited, Bangalore (IN)

( * ) Notice: Subject to any disclaimer, the term of this patent is extended or adjusted under 35 U.S.C. 154(b) by 879 days.

(21) Appl. No.: 13/306,903

(22) Filed: Nov. 29, 2011

(65) Prior Publication Data

US 2013/0047135 A1  Feb. 21, 2013

(30) Foreign Application Priority Data

Aug. 18, 2011 (IN) .......................... 2818/CHE/2011

(51) Int. Cl.
*G06F 9/44* (2006.01)

(52) U.S. Cl.
CPC ...................... *G06F 8/30* (2013.01)

(58) Field of Classification Search
None
See application file for complete search history.

(56) References Cited

U.S. PATENT DOCUMENTS

| | | | |
|---|---|---|---|
| 6,295,527 B1 * | 9/2001 | McCormack | ....... H04L 41/0213 |
| 6,341,269 B1 | 1/2002 | Dulaney et al. | |
| 6,598,025 B1 | 7/2003 | Hamilton et al. | |
| 6,732,120 B1 * | 5/2004 | Du | ................................ 715/764 |
| 7,082,575 B2 | 7/2006 | Lin et al. | |
| 7,634,511 B1 * | 12/2009 | Freiheit | ............... G06F 11/1458 |
| 7,685,023 B1 | 3/2010 | Abraham et al. | |
| 7,734,495 B2 | 6/2010 | Klaubauf et al. | |
| 7,822,710 B1 * | 10/2010 | Miller | ............... G06F 17/30997 |
| | | | 707/620 |
| 8,189,855 B2 | 5/2012 | Opalach et al. | |
| 8,412,656 B1 | 4/2013 | Baboo et al. | |
| 2002/0035537 A1 | 3/2002 | Waller et al. | |
| 2003/0023712 A1 * | 1/2003 | Zhao | ..................... H04L 41/046 |
| | | | 709/223 |
| 2003/0088831 A1 * | 5/2003 | Bauer et al. | ................... 715/516 |
| 2003/0110102 A1 | 6/2003 | Chien et al. | |
| 2004/0107414 A1 * | 6/2004 | Bronicki | ................... G06F 8/34 |
| | | | 717/105 |

(Continued)

OTHER PUBLICATIONS

Tran et al., "ViewBased Reverse Engineering Approach for Enhancing Model Interoperability and Reusability in ProcessDriven SOAs," 2008.*

(Continued)

*Primary Examiner* — Insun Kang
(74) *Attorney, Agent, or Firm* — Klarquist Sparkman, LLP

(57) ABSTRACT

Various technologies related to an enterprise computing platform are presented. Documents in a framework can be edited via logical views as described. An enterprise computing platform having a variety of frameworks can be configured to operate in a variety of business domains. Features such as parallel computing, distributed computing, logical documents, document transformation, space visualization, data security, and others can be accomplished via configuration rather than coding.

30 Claims, 43 Drawing Sheets

(56) References Cited

U.S. PATENT DOCUMENTS

| | | | |
|---|---|---|---|
| 2004/0122861 A1* | 6/2004 | Hulse et al. | 707/104.1 |
| 2004/0260702 A1* | 12/2004 | Cragun | G06F 17/30873 |
| 2004/0268309 A1* | 12/2004 | Grover et al. | 717/120 |
| 2005/0203790 A1 | 9/2005 | Cohen | |
| 2006/0129605 A1* | 6/2006 | Doshi | 707/104.1 |
| 2007/0027745 A1 | 2/2007 | Ouimet | |
| 2007/0050235 A1 | 3/2007 | Ouimet | |
| 2007/0130182 A1* | 6/2007 | Forney | 707/101 |
| 2007/0250405 A1* | 10/2007 | Ronen et al. | 705/27 |
| 2007/0288296 A1 | 12/2007 | Lewis | |
| 2008/0082959 A1* | 4/2008 | Fowler | 717/104 |
| 2008/0104092 A1* | 5/2008 | Cummins | G06Q 10/06 |
| 2008/0148146 A1* | 6/2008 | Estrada | G06F 17/30873 715/255 |
| 2008/0208719 A1 | 8/2008 | Sharma | |
| 2008/0249837 A1 | 10/2008 | Angell et al. | |
| 2008/0249858 A1 | 10/2008 | Angell et al. | |
| 2009/0217243 A1* | 8/2009 | Hashimoto et al. | 717/120 |
| 2010/0030578 A1* | 2/2010 | Siddique et al. | 705/3 |
| 2010/0318403 A1 | 12/2010 | Bottom | |
| 2011/0035257 A1 | 2/2011 | Solanki et al. | |
| 2011/0050396 A1 | 3/2011 | Chaves | |
| 2011/0261049 A1 | 10/2011 | Cardno et al. | |
| 2011/0276364 A1 | 11/2011 | Bergstrom et al. | |
| 2012/0053986 A1* | 3/2012 | Cardno | G06Q 30/0201 705/7.29 |
| 2012/0179987 A1* | 7/2012 | Mohan et al. | 715/762 |
| 2012/0185821 A1* | 7/2012 | Yaseen et al. | 717/105 |
| 2012/0210296 A1* | 8/2012 | Boulter et al. | 717/107 |
| 2012/0246638 A1 | 9/2012 | He et al. | |
| 2012/0317059 A1 | 12/2012 | Joshi et al. | |
| 2013/0041706 A1 | 2/2013 | Joshi et al. | |
| 2013/0061155 A1* | 3/2013 | Hon | G06F 17/30058 715/753 |
| 2013/0119138 A1 | 5/2013 | Winkel et al. | |
| 2013/0325638 A1 | 12/2013 | Auclair et al. | |
| 2014/0025420 A1 | 1/2014 | Joshi et al. | |

OTHER PUBLICATIONS

Demsar, "A Visualisation of a Hierarchical Structure in Geographical Metadata," AGILE Conference on Geographic Information Science Apr. 29-May 1, 2004.*

Luebke et al., "An Extensible Framework for Information Visualization and Collection," Copyright 2003 ACM.*

Karabulut et al., "A Hybrid Genetic Algorithm for Packing in 3D with Deepest Bottom Left with Fill Method," Advances in Information Systems, Third International Conference, ADVIS 2004, Izmir, Turkey, LNCS 3261, pp. 441-450, Oct. 20-22, 2004.

Murray, C.C., D. Talukdar, A. Gosavi, "Joint Optimization of Product Price, Display Orientation and Shelf-Space Allocation in Retail Category Management," Journal of Retailing, 86 (2), 125-136, Jun. 2010.

Ruibin Bai, "An Investigation of Novel Approaches for Optimising Retail Shelf Space Allocation," Thesis, School of Computer Science & Information Technology, The University of Nottingham, Nottingham, UK, 217 pages, Sep. 2005.

SAS, "SAS Retail Space Management," http://www.sas.com/resources/factsheet/retail-space-mgmt.pdf, 4 pages, accessed Feb. 17, 2012.

Wikipedia, "Automatic Parallelization," May 2, 2010, p. 1.

"Windows Workflow Foundation," *Wikipedia*, visited Nov. 28, 2011, 4 pages.

"Microsoft Message Queuing," *Wikipedia*, visited Nov. 28, 2011, 3 pages.

"Windows HPC Server 2008," *Wikipedia*, visited Nov. 28, 2011, 2 pages.

"IBM WebSphere MQ," *Wikipedia*, visited Nov. 28, 2011, 7 pages.

"IBM Cognos 8 Business Intelligence," *Wikipedia*, visited Nov. 28, 2011, 4 pages.

"IBM WebSphere," *Wikipedia*, visited Nov. 28, 2011, 7 pages.

"Alchemi: A.NE—based Enterprise Grid System and Framework, User Guide for Alchemi 1.0," Jul. 2005, 30 pages.

"Struts," Apache Software Foundation, visited Nov. 28, 2011, 3 pages.

Lecture Notes for "Parallelism and Divide and Conquer," retrieved from http://web.archive.org/web/20070220095948/http://www.cs.berkeley.edu/~demmel/cs170_spr07/LectureNotes/Lecture_Parallelism_DC.pdf, archived Feb. 20, 2007, 7 pages.

"Automatic Parallelization," retrieved from http://web.archive.org/web/20090519102 31/http://en.wikipedia.org/wiki/Automatic_parallelization, archived Apr. 11, 2009, 3 pages.

"Divide and Conquer Algorithm," retrieved from http://web.archive.org/web/20080308135251/http://en.wikipedia.org/wiki/Divide_and_conquer_algorithms, archived Feb. 21, 2008, 4 pages.

* cited by examiner

Enterprise Computing Framework
Request Submission Console

Request Submission Console

Framework Settings
- Request Type
- Connection String
- Break Down Policy File
- User Name
- Thread WF Service URL Policy Description Script
- BreakDown Logic ▶
- Process Monitor Interval
- Time Out ☒ Enable Mailing Alert
Alert
- Mail Services URL
- Mail Server IP
- Mail Receipients
- From Address
- Max No. of Try
- Error File Push Request Status Console Storage Settings
- Select Storage Type ▶

MQ Settings
- Request Queue Name
- Job Queue Name
- Queue Manager
- Channel Name
- Protocol
- Queue Host DB Settings
- Connection String Handlers Settings
- Request Assembly Name
- Job Assembly Name
- Request Class Name
- Job Class Name Select Existing Request | Submit Request | Clear All

ENTERPRISE COMPUTING PLATFORM WITH SUPPORT FOR EDITING DOCUMENTS VIA LOGICAL VIEWS

CROSS REFERENCE TO RELATED APPLICATIONS

This application claims the benefit of Indian Application No. 2818/CHE/2011, filed in India on Aug. 18, 2011, which is incorporated by reference herein.

BACKGROUND

Software development is a complex task. Typically, requirements are obtained, and software is developed to meet the requirements. To increase efficiency, programmers frequently re-use code from previous projects or from libraries to avoid having to re-write significant portions of the software.

However, re-using software in such a manner can be complicated. In practice, programmers often find pieces of software from various projects and libraries that need to be stitched together to work. Such integration takes time and may introduce errors in the software, thereby reducing efficiency and causing issues with reliability.

Accordingly, there is still a need to address the complexities of software development.

SUMMARY

A variety of techniques can be used for developing software via an enterprise computing platform.

A enterprise computing platform can be applied to a variety of domains to accomplish rapid and efficient development of a platform for providing computing services.

A variety of features such as configurable parallel computing, configurable distributed computing, logical documents, document transformation, space visualization, software as a service, and others can be supported.

The frameworks provided are flexible enough to work in a variety of domains and cooperate with a variety of external software.

In many cases, configuration can take the place of coding. Thus, while code can be reused or new code written, in many cases, a new level of software development is achieved by bypassing the coding process.

Considerable efficiency improvements in the software development process can be realized.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 35 is a screen shot of an exemplary user interface for accepting a job request in an enterprise computing framework.

FIGS. 36, 37, 38, 39, and 40 are screen shots of exemplary user interfaces for providing information to an enterprise automation framework configured for a retail domain task.

DETAILED DESCRIPTION

Example 1

Exemplary Explanation

Figure 1:
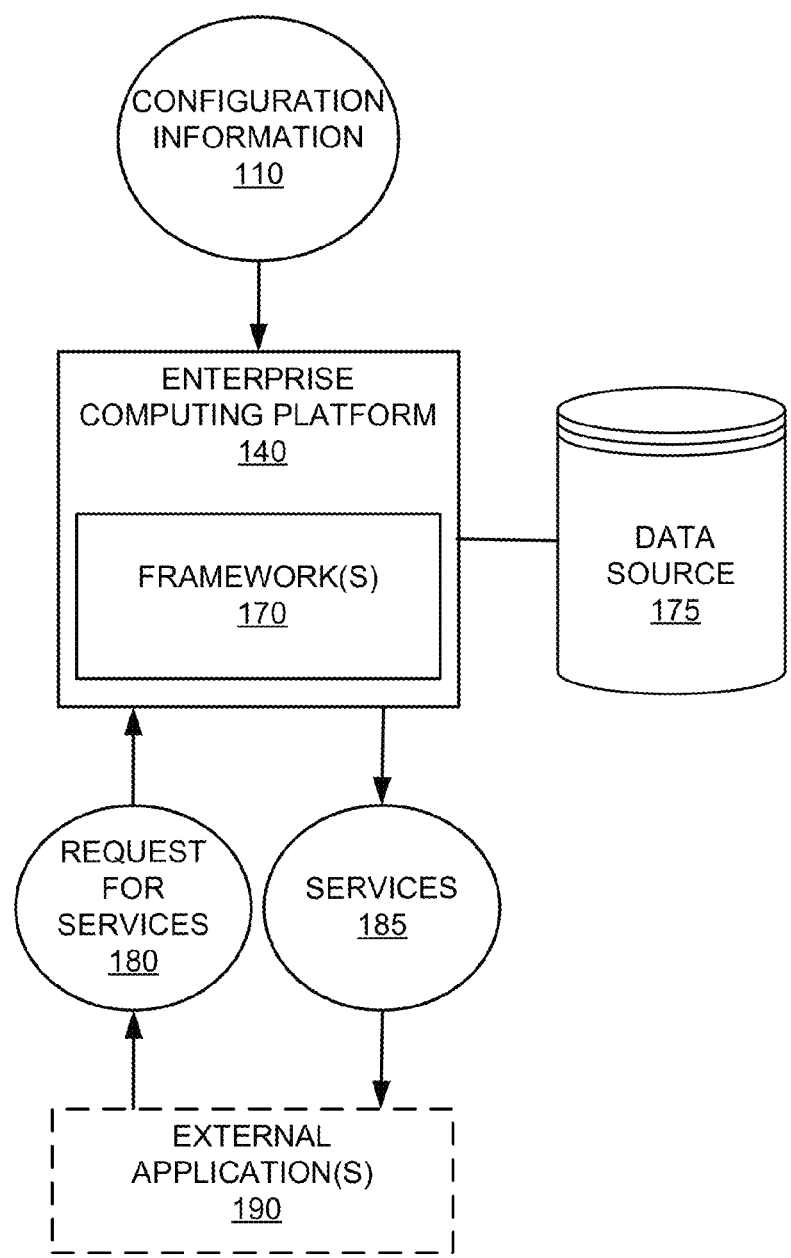
FIG. 1 is a block diagram of an exemplary system implementing the enterprise computing platform technologies described herein.

Often large applications have to be run as part of business processes, with processing volume surging at selected windows of time. End-of-day or period data processing in banks, seasonal message dispatch during holidays, billing cycle processing, committing merchandising policies to outlets, inventory and work-in-progress valuation for large multi-site manufacturers, and the like, are typical cases with such processing needs. They reflect typical mainframe class load for sustained periods of time, with need to minimize the losses due to crashes and recovery.

Online applications also pose similar workload patterns that are accommodated by load balancing across multiple instances of servers seamlessly through some provisions and applications. However, such workloads can be effectively managed by suitable partitioning for parallel execution, sequencing, synchronization, and the like, of the tasks that make up the entire suite of work. The tasks can be processed among several computers and systems in a network effectively without intervention by suitably stating the policies and options to an enterprise computing platform.

Example 2

Exemplary Overview

The technologies described herein can be used for a variety of enterprise computing platform scenarios. Adoption of the technologies can provide an efficient technique for developing and deploying applications in a variety of domains.

The frameworks are targeted to architects, designers, and developers, who will appreciate the design approach. However, users greatly benefit from the frameworks because they enjoy applications targeted to their specific business domains.

Example 3

Exemplary Capabilities

The technologies described herein can be implemented in a domain-independent fashion. So, the various frameworks can be applied in a wide variety of domains to accomplish rapid development and deployment of applications providing a rich set of features in a variety of scenarios. So, for example, applications supporting parallel processing, distributed computing, software as a service, and other features can be developed with a minimal or no code development.

Instead, configuration can be used to provide such features. Accordingly, many benefits can arise as described herein.

The frameworks can incorporate best practices from a variety of computer science disciplines to provide superior performance, resource conservation, and an enhanced user experience. Thus, a team developing an application can benefit from such best practices without having to be concerned with the details of software development. Instead, focus can be on the business process and business logic of the application. Accordingly, the resulting application can be more geared to user experience, resulting in a more focused and intelligent overall design.

Example 4

Exemplary Combinations of Frameworks

Although some of the examples show the frameworks used in combination, it is also possible to use different combinations of the frameworks, or a framework by itself to advantage.

Example 5

Exemplary System Employing a Combination of the Technologies

FIG. 1 is a block diagram of an exemplary system 100 implementing the enterprise computing platform technologies described herein. In the example, one or more computers in a computing environment implement enterprise computing platform 140 that accepts as input platform configuration information 110.

The enterprise computing platform 140 can include one or more of the frameworks 170 as described herein. The enterprise computing platform 140 can receive requests 180 for services (e.g., from the external application(s) 190) and respond by providing services 185.

The enterprise computing platform 140 can access a data source 175.

The external application(s) 190 can take the form of thick clients, desktop applications, mobile applications, web browsers, and the like.

In practice, the systems shown herein, such as system 100 can be more complicated, with additional functionality, more complex frameworks, and the like.

In any of the examples herein, the inputs, outputs, and data source 175 can be stored in one or more computer-readable storage media.

Example 6

Exemplary Method of Applying a Combination of the Technologies

Figure 2:
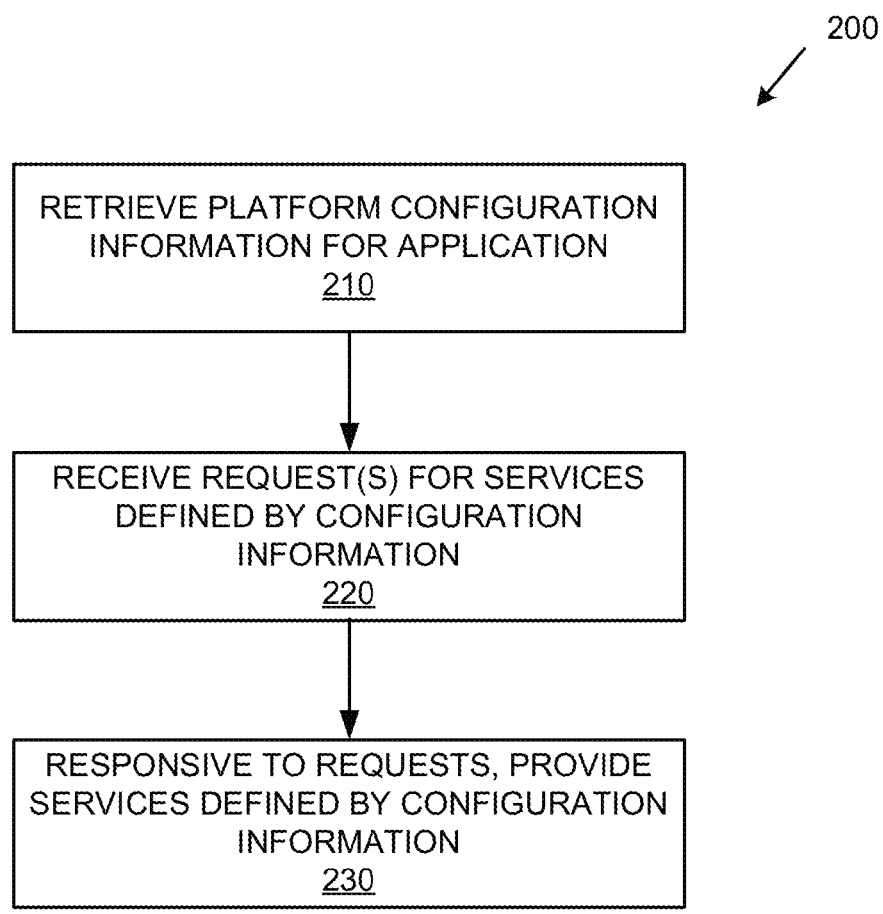
FIG. 2 is a flowchart of an exemplary method of implementing the enterprise computing platform technologies described herein.

FIG. 2 is a flowchart of an exemplary method 200 of implementing the enterprise computing platform technologies described herein and can be implemented, for example, in a system such as that shown in FIG. 1. The technologies described herein can be generic to the specifics of operating systems or hardware and can be applied in any variety of environments to take advantage of the described features.

At 210, platform configuration information for an application is received. For example, the specifics of a particular domain can be incorporated into the configuration information has described herein.

At 220, requests for services defined by the configuration information are received. For example, services such as viewing documents, implementing business rules, distributing a request among a plurality of servers, and the like can be received.

At 230, responsive to the requests, the service as defined by the configuration information can be provided.

Configuration of the platform and usage of the platform can be performed by the same or different parties. For example, an entity desiring an application can employ a software development service entity to develop an application via the platform and then use it. Ongoing maintenance can similarly be performed by the user or an outside entity, as desired.

The method 200 and any of the methods described herein can be performed by computer-executable instructions stored in one or more computer-readable media (e.g., storage or other tangible media) or one or more computer-readable storage devices.

Example 7

Exemplary Services

In any of the examples herein, the services provided by the enterprise computing platform can be customized as appropriate for the business domain. As described herein, the services can implement a wide variety of useful features, including parallel processing, distributed computing, software-as-a-service computing, and the like.

Example 8

Exemplary Business Domains

In any of the examples herein, the enterprise computing platform can be applied to any of a variety of business domains, including retail, banking, health care, medical (e.g., hospitalization), transportation and logistics, warehousing and inventory management, real estate management, manufacturing, entertainment, or the like. Business domains (sometimes called simply "domains" herein) can be any industry business segment.

As described herein, a variety of hierarchical problems can be resolved in any number of business domains via the frameworks. The frameworks can address spatial hierarchical relationships between represented items (e.g., physical objects or locations) in such hierarchical problems.

The frameworks can be constructed to be generic, reusable, scalable, flexible, and extensible throughout such business domains. Reference implementations for one or more domains can be included with the framework to further assist developers.

Example 9

Exemplary Data Sources

In any of the examples herein, data relating to an application can be stored in one or more data sources. Such data sources can be used to represent logical documents, which can be stored as assembled documents for presentation to users (e.g., in one of a plurality of views).

A data source can take any of a variety of forms, such as one or more databases, spreadsheets, delimited text files (e.g., comma-separated variables), XML, and the like. A data source can contain a mixture of such forms.

As described herein, the frameworks can abstract away the details of how the data is stored in the data source so that such details are transparent to a user, who is presented what appears to be a convention document, even if the document is an assembled document based on a logical document definition.

For some business domains, the data source can represent data from a plurality of entities, such as destinations, store locations, or the like.

Example 10

Exemplary System Employing a Combination of the Technologies

Figure 3:
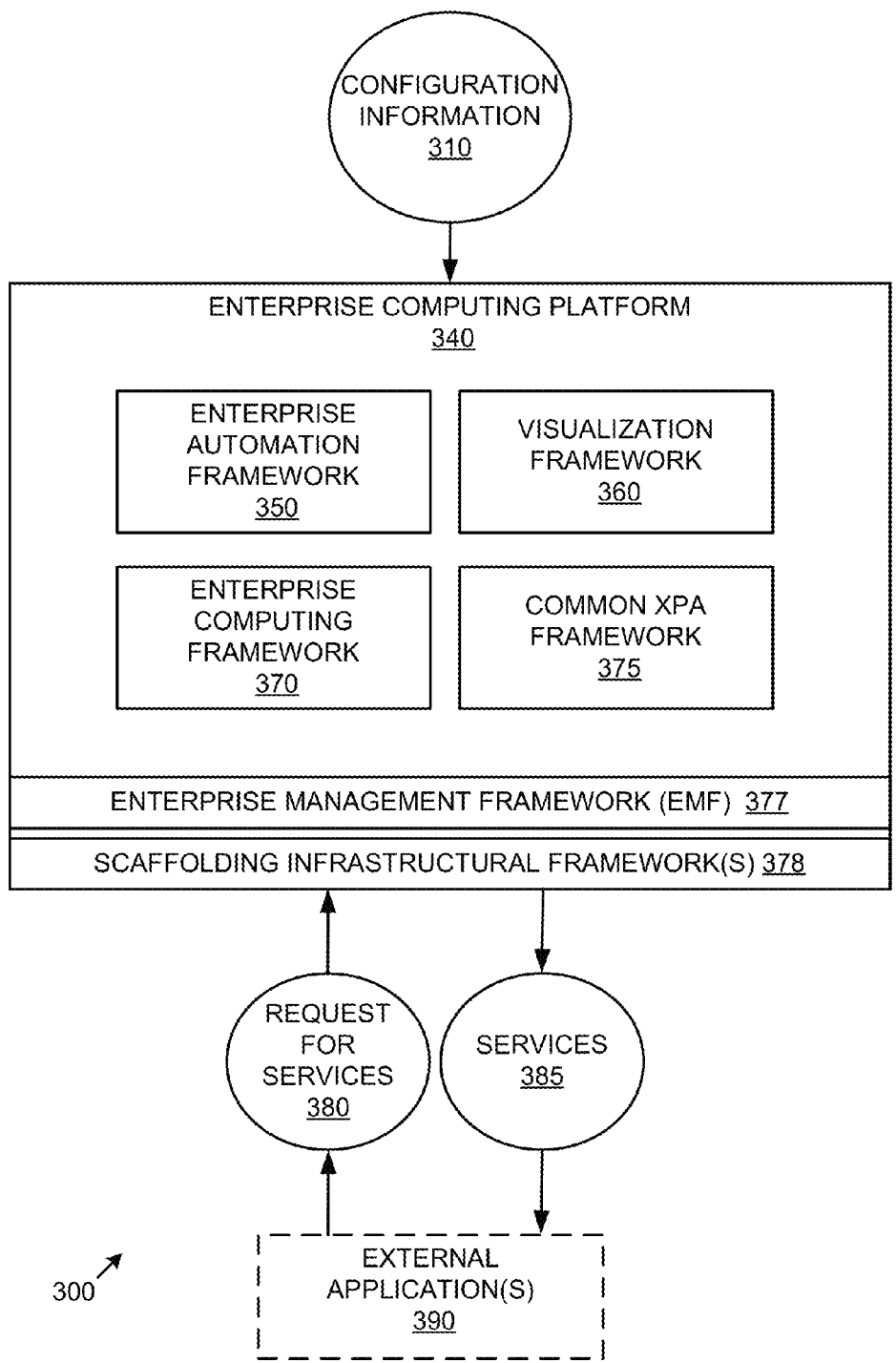
FIG. 3 is a block diagram of an exemplary system implementing the enterprise computing platform technologies described herein for use by external applications.

FIG. 3 is a block diagram of an exemplary system 300 implementing the enterprise computing platform technologies described herein for use by external applications. In the example, one or more computers in a computing environment implement an enterprise computing platform 340 that accepts configuration information 310. The exemplary platform 340 comprises an enterprise automation framework 350, a visualization framework 360, an enterprise computing framework 370, and a common extensible pattern framework 375 (e.g., an extensible view architecture framework, smart proxy, or both). In practice, any one or more of the frameworks described herein can be used to benefit. For management purposes, the platform 340 can also include an enterprise management framework 377. Scaffolding infrastructural frameworks 378 can also be included.

Similar to the system shown in FIG. 1, requests 380 for services and services 385 can be exchanged with the external applications 390.

Example 11

Exemplary Method of Applying a Combination of the Technologies

Figure 4:
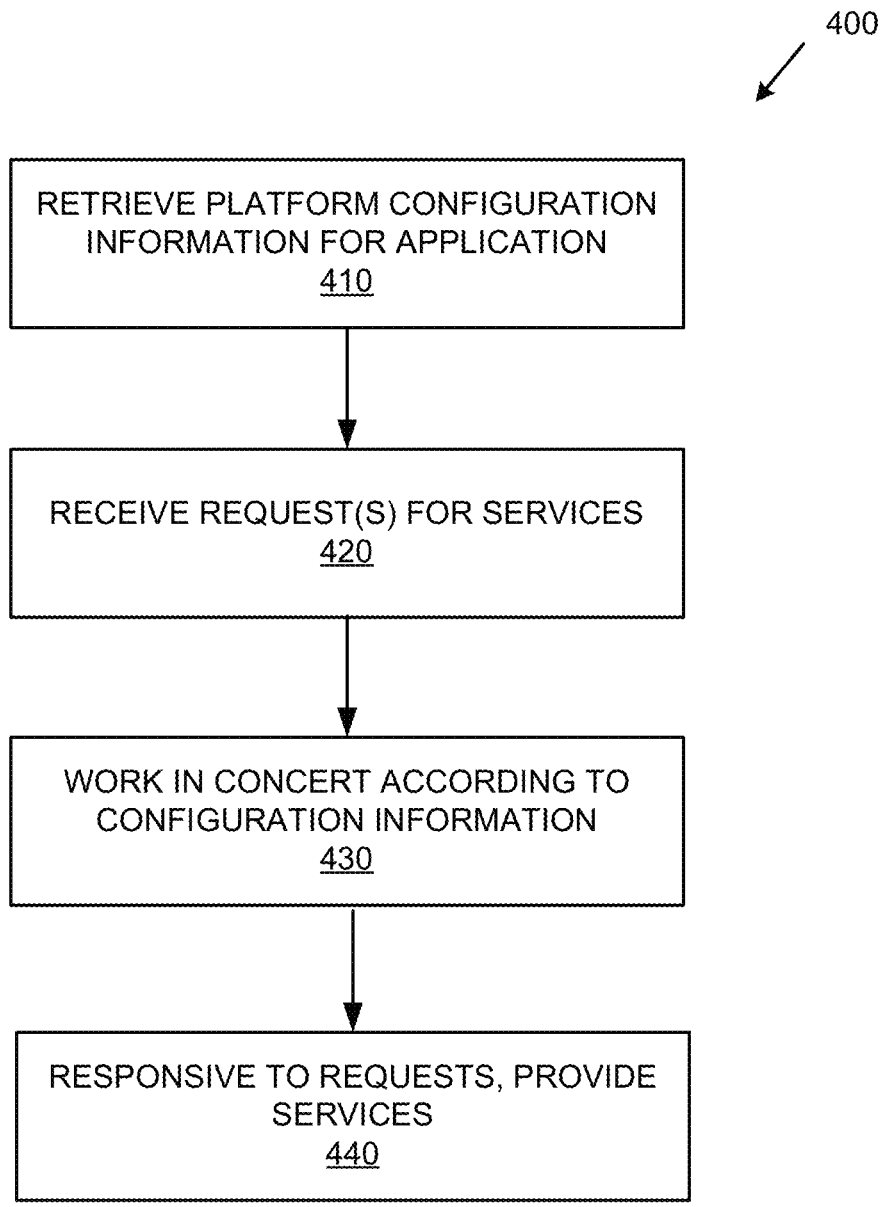
FIG. 4 is a flowchart of an exemplary method of implementing the enterprise computing platform technologies described herein via platform configuration information.

FIG. 4 is a flowchart of an exemplary method 400 of implementing the enterprise computing platform technologies described herein via platform configuration information and can be implemented, for example, in a system such as that shown in FIG. 3.

At 410, platform configuration information for an application is received. For example, such configuration information can comprise domain-specific configuration information.

At 420, request for services are received.

At 430, the frameworks work in concert according to the configuration information to fulfill the service requests.

At 440, responsive to the requests, the services are provided.

Example 12

Exemplary Technique of Developing an Application

Figure 5:
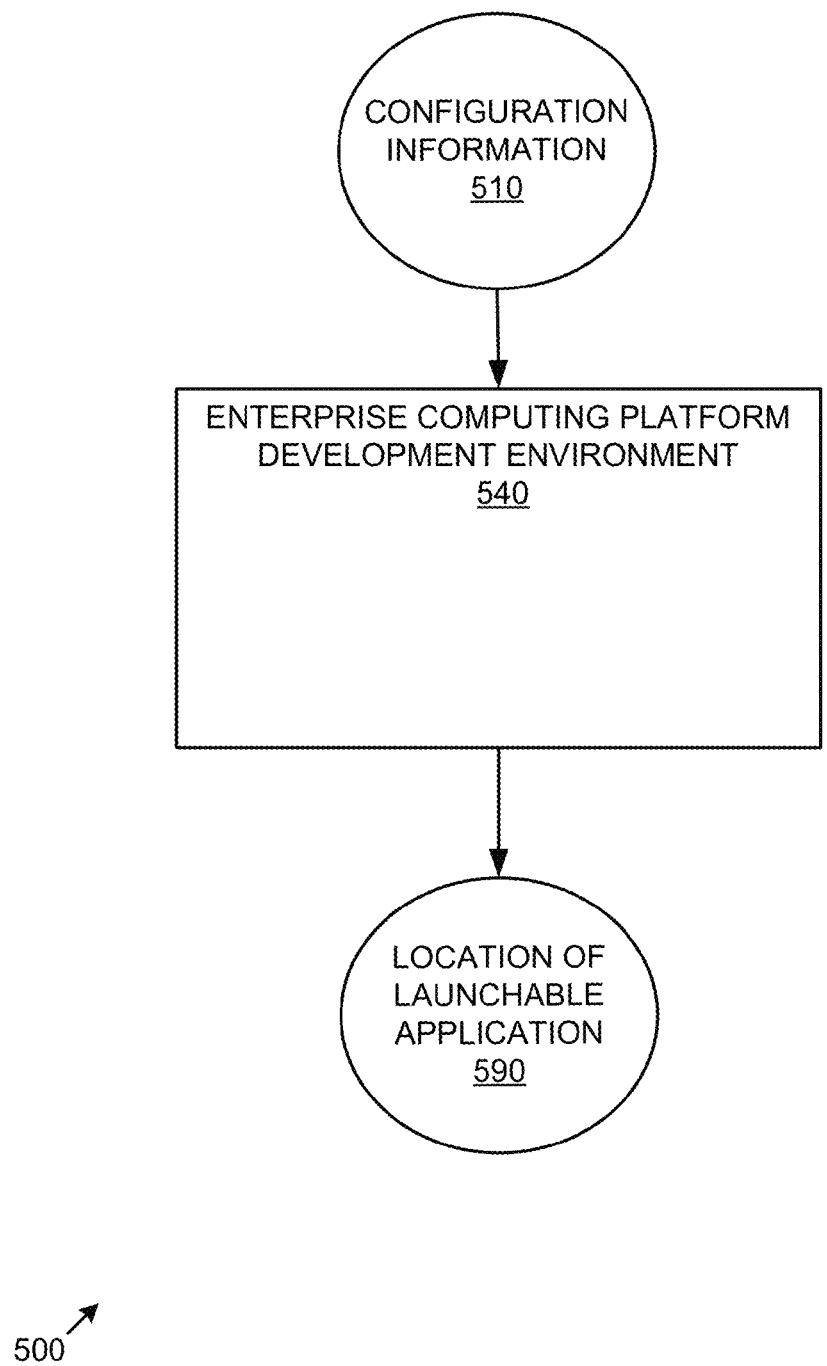
FIG. 5 is a block diagram of an exemplary system for developing an application using the enterprise computing platform technologies described herein.

FIG. 5 is a block diagram of an exemplary system 500 for developing an application using the enterprise computing platform technologies described herein and can be implemented in any of the examples herein. In the example, the configuration information 510 is used to generate the location of a launchable application 590.

The enterprise computing platform development environment 540 can be provided as part of the enterprise computing platform or as a separate environment. In practice, the developers can develop the application on behalf of another entity or for internal use.

The location 590 of the launchable application can take the form of a web address, offering access to the application via any web browser. The frameworks can also support desktop applications if desired. Mobile applications can also be supported.

Example 13

Exemplary Method of Applying a Combination of the Technologies

Figure 6:
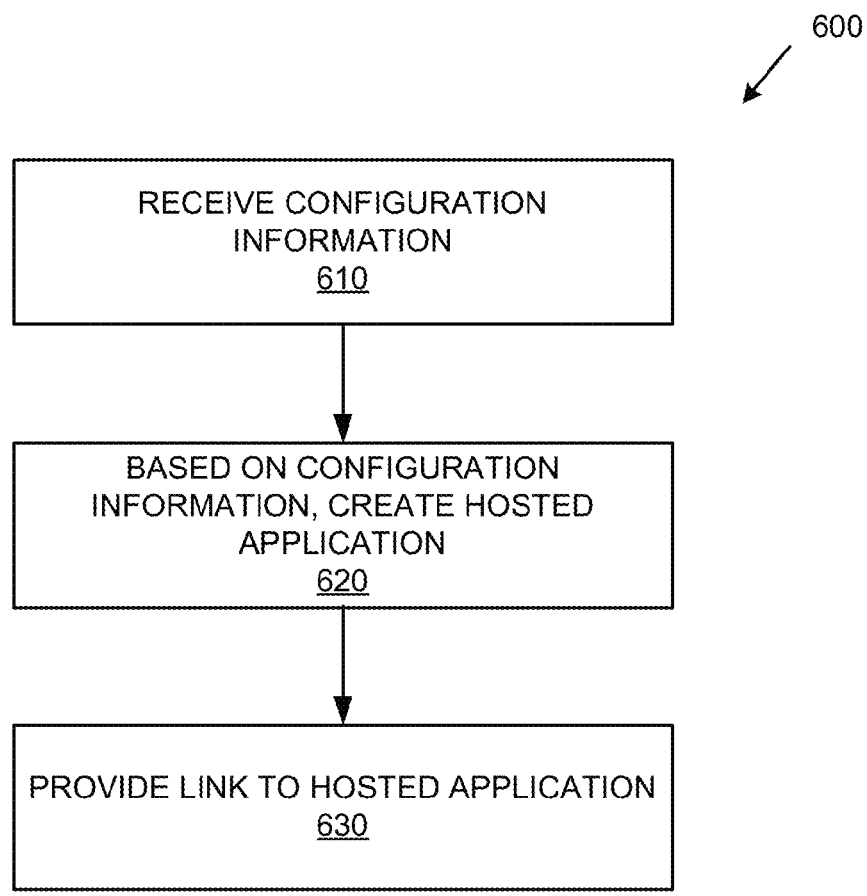
FIG. 6 is a flowchart of an exemplary method of developing an application using the enterprise computing platform technologies described herein.

FIG. 6 is a flowchart of an exemplary method 600 of implementing the enterprise computing platform technologies described herein via platform configuration information and can be implemented, for example, in a system such as that shown in FIG. 6.

An enterprise computing platform development environment can provide a rich set of options for creating, developing, and maintaining applications implemented via the platform. For example, a user can create a new application, name it, select various frameworks, and then continue with the development process.

At 610, configuration information is received. For example, various configuration files can be supplied, menu options can be chosen, and the like. Links to custom code can also be provided as appropriate.

At 620, based on the information, a hosted application is created.

At 630, a link to the hosted application is provided.

Subsequently, the application can be used (e.g., executed to fulfill requests) as described herein (e.g., by visiting the link, retrieving documents from the link, or the like).

Example 14

Exemplary Configuration Information

The configuration information supports references to domain-specific object classes that derive from domain-independent object classes. Such references can take a variety of forms, including DLLs or other executable formats.

Example 15

Exemplary Entities

In any of the examples herein, an entity can take the form of a document, view, use case, business object, or other entity to be represented in the framework. Any of the entities herein can be presented by domain-independent object classes (e.g., by a base class or a domain-independent object class inheriting from such a base class).

Although some of the examples herein describe documents, the technologies can be equally be applied to situations involving any of the other entities described herein. Thus, any of the framework can support entities other than documents (e.g., represented as programming objects), and the entities other than document can inherit from a base entity class.

The frameworks can thus take an entity-centric approach, where the entity can be any of the examples described herein. Although a document-centric application can be developed via the frameworks, it can do so by relying on an entity-centric approach, where the document is represented as an entity.

Example 16

Exemplary Framework Extensibility

Figure 7:
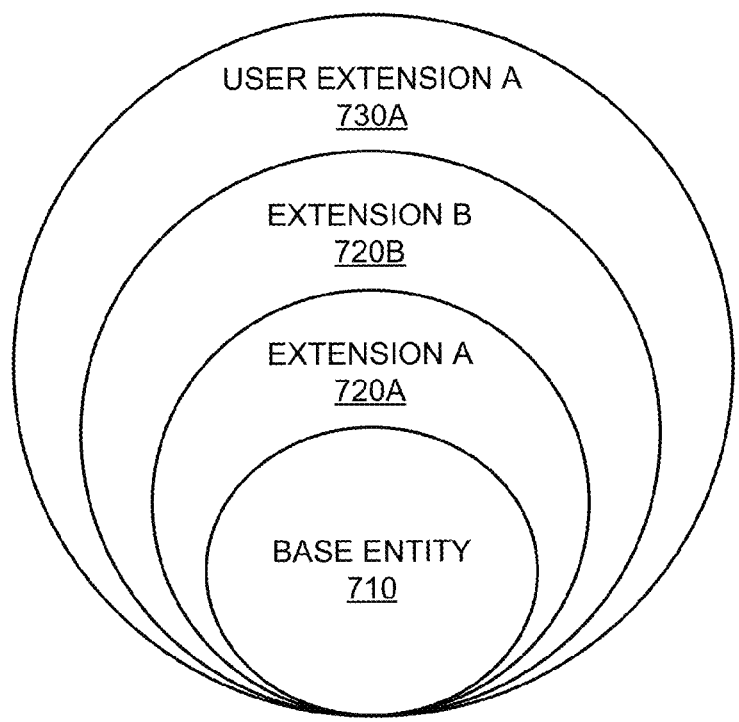
FIG. 7 is a block diagram of an exemplary extensible entity class system.

FIG. 7 is a block diagram of an exemplary extensible entity class system 700. In the example, a domain-independent base entity class 710 contains the attributes, operations, and methods which can be used by any entity represented in the framework. Basic operations such as create, load, edit, and delete any included as part of the entity class 710. Other functionality, such as query and search, can also be included. Basic attributes, such as the entity ID, name, and description can be included as part of the entity class 710. The base entity class 710 can serve as a kernel where reusability starts.

For example, the base entity class 710 can implement load functionality by loading from a data persistence (e.g., in a data source) and displaying the loaded content.

The framework by default can provide the base entity class 710 as a base that can be further derived, abstracted, or extended. In the example, the class 710 has been extended by extension A 720A, extension B 720B, and user extension A 730A. In practice, there can be one or more framework-provided extensions and one or more user-provided extensions. The extensions can be abstract classes if desired. Extensions can take the form of more specific methods, functions, attributes, call graphs, or other specificities. In some cases, the extensions can be domain-independent, or they can be directed to specificities shared between a few domains, or they can be directed to domain-specific functionality.

In the case of domain-specific functionality, entities herein can be represented by an object class having domain-specific features, and such an object class can be derived from a domain-independent entity object class.

To facilitate further flexibility, any of the framework-provided extensions can be customized by a developer as well. To further facilitate reusability, the framework can provide reference implementations of user extensions for various domains, which a user can choose to use as-is or with further customization to implement domain-specific functionality.

An example of extending the base entity class 710, is first extending to a "Base Document:Abstract" framework-provided class, then extending to a "simple or compound document" framework-provided class. Finally, a domain-specific extension (e.g., "Micro planogram document" or the like) can be provided by the user. In this way, a domain-specific class (e.g., for handling documents) can be supported by the framework.

Another example of extending the base entity class 710, is first extending to a "Base Document:Logical" framework-provided class, then extending to a "Visio Document:Physical" framework-provided class. Finally a domain-specific extension (e.g., "Micro planogram document" or the like) can be provided by the user. In this way, various framework-provided extensions can be combined with a user-provided extensions to support the functionality needed in a domain-specific application.

Yes another example of extending the base entity class 710, is first extending to a "Base Document" framework-provided class, then extending to a "Space Planning Document: Logical" framework-provided class. Finally, a domain-specific extension (e.g., Micro planogram document:physical,logical" can be provided by the user.

On a general level, the functionality starts at a generic level, and moving toward the top of the system 700, the functionality becomes more specific. So, if an entity is extended to a document, it provides document functionality. If it is further extended to a retail document, it behaves as a retail document. So, in any of the examples herein, a document can be represented by a class derived from a domain-independent entity class, and the derived class can contain domain-specific callable methods for processing domain-specific aspects of the document.

As described herein, domain mappers can take advantage of the described arrangement.

Typically, a user is prevented from modifying the base entity class 710 because it provides functionality there is relied on for basic operations of any software application. However, derivations and extensions are fully supported, whether by the framework or user.

Example 17

Exemplary Functionality Included in Classes

Figure 8:
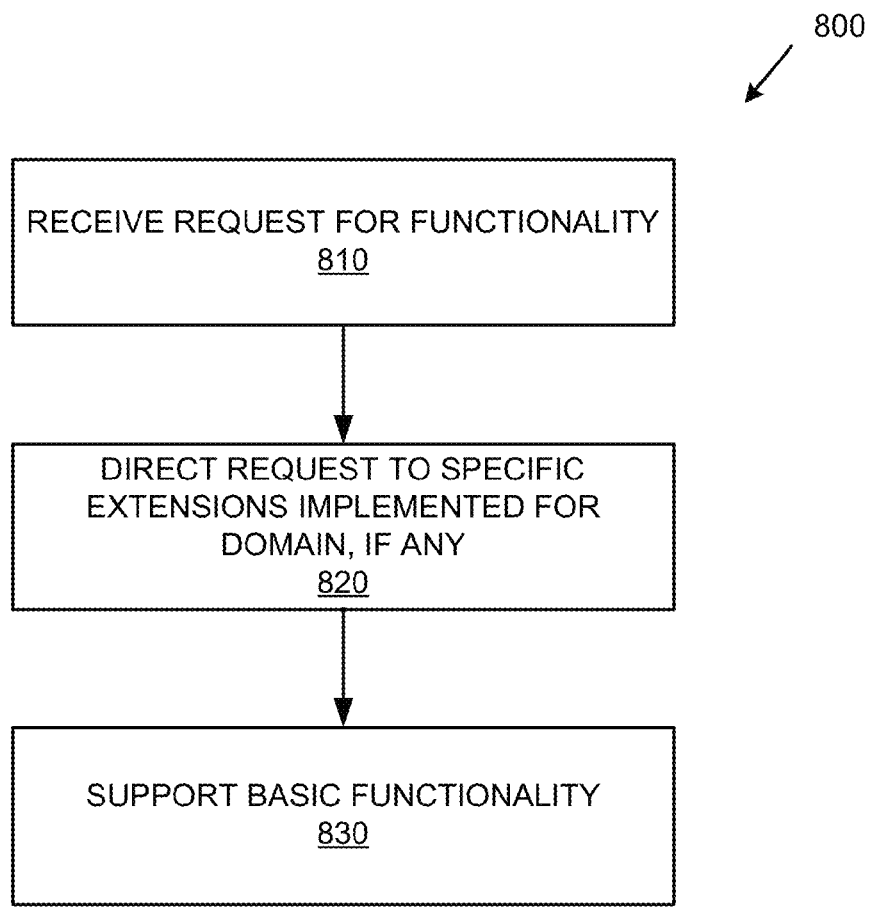
FIG. 8 is a flowchart of an exemplary method of providing functionality according to base functionality extended by domain-specific functionality.

FIG. 8 is a flowchart of an exemplary method 800 of providing functionality according to base functionality extended by domain-specific functionality.

At 810, a request for functionality is received.

At 820, responsive to the request, the request is directed to domain-specific extensions implemented for the domain, if any.

At 830, basic functionality can continue to be supported, even if domain-specific extensions are implemented.

Example 18

Exemplary Entity Attributes

In any of the examples herein, programming object classes can take a variety of attributes, any of which can incorporated by a framework into a base entity to provide domain-independent functionality.

Exemplary attributes can be divided into sections. A general section can comprise one or more of the following attributes:

An "ID" attribute can indicate an identifier of the instantiated entity.

A "Meta type" attribute can take the values fat or lean and can indicate whether the entity is to be given full or reduced treatment under the framework.

A "Meta type 2" attribute can take values indicating whether the entity is a document, view, business object, or use case.

A "Simple/compound" attribute can take values indicating whether the entity is a simple or compound entity.

A "type" attribute can indicate whether the entity represents a physical or logical entity.

A "logical type" attribute can indicate the type of logical entity the entity represents and also the domain in which the entity is being used.

A "Template Type" attribute can indicate a template source for the entity.

A "name" attribute can indicate a description of the entity.

A serializability and storage section can comprise one or more of the following serialization attributes:

A "source type" attribute can indicate a type of source for the entity (e.g., database, file, or the like).

A "source id" attribute can identify the data source for the entity (e.g., where the content comes from).

A "serialization class URL" attribute can identify an URL from where a class implementing serialization functionality for the entity can be found.

A security section can comprise one or more of the following security attributes:

A "security type" attribute can identify a type of security to be implemented for the entity.

A "security ID" attribute can provide a security identifier for the entity.

A "Security class URL" attribute can specify an URL from where a class implementing security functionality for the entity can be found.

An "encryptability" section can comprise one or more of the following attributes:

An "encryption algorithm type" attribute can indicate a type of algorithm to be used when encrypting the entity.

An "encryption level" attribute can indicate a level of encryption to be used when encrypting the entity.

An "encryption key" attribute can specify an encryption key for the entity.

Other possible attributes comprise the following:

A "preferred provider type" attribute can indicate a preferred view provider for the entity.

A "preferred view type" attribute can indicate a preferred logical view for the entity.

An "operations bundle" attribute can indicate operations performable on the entity and where such functionality can be found.

An "attribute bundle" attribute can indicate further attributes in bundles (e.g., type, name, value, length, validation URLs, and the like).

Such attributes can be specified in XML according to an XML schema. If the attributes are included as part of base entity functionality, they can be further extended by document, view, use case, or business object classes.

Example 19

Exemplary Storage of Attributes and Assignment of Attributes

In any of the examples herein, the attribute values of an entity can be stored as (e.g., persisted as) XML, according to an XML scheme, in a database, and the like.

Assignment of values for the attributes (e.g., at creation of the entity object) can be based on configuration information indicating the default attributes for a particular entity type.

Example 20

Exemplary Fat/Lean Configuration

In any of the examples herein, an entity attribute can indicate whether an entity will be given full treatment under the framework, or some reduced treatment. For example some data types in the framework can be indicated as "lean," meaning that the framework does not force all functionality on the user in the base classes. For example, in a light weight implementation, it may be desirable to forgo some of the frameworks' functionality in one or more areas.

Accordingly, when an entity is designated as "lean," the frameworks can omit processing for one or more features ordinarily provided to all entities under the framework. Such an approach can be desirable for performance reasons.

Further, a configuring user can take advantage of the flexibility provided by selecting some or all of the features as needed and extended over those provided. And, by providing a minimum basic feature set in the basic (e.g., lean) configuration, standardization can be provided.

Example 21

Exemplary Client Type Functionality Included in Classes

In any of the examples herein, object classes (e.g., a base entity class or other class) can include functionality for interacting with thick clients (e.g., an application or rich client), web clients (e.g., web browser), or mobile clients (e.g., PDA, mobile phone, etc.). Reference implementations can be provided with the framework to provide guidance on how to support a variety of such clients in any domain.

Example 22

Exemplary Domain Mappers

Figure 9:
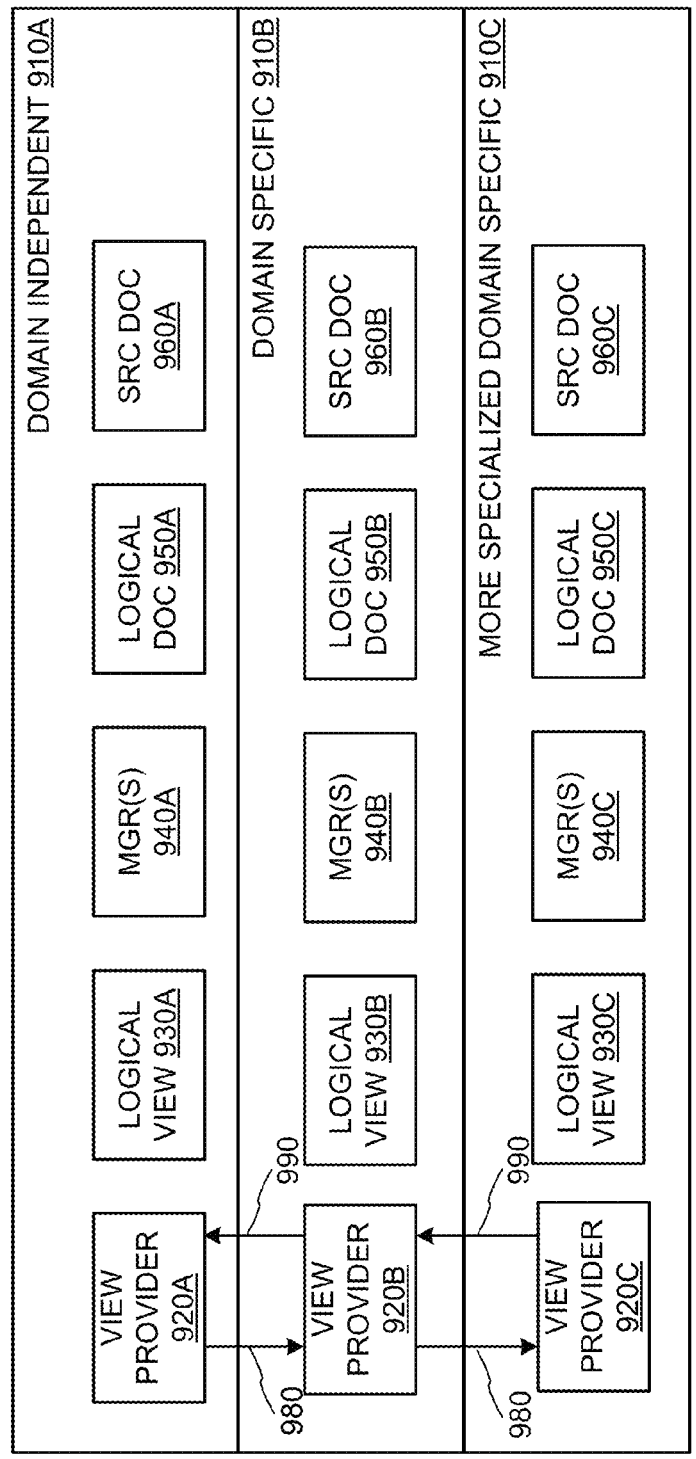
FIG. 9 is a block diagram of an exemplary domain mapper system.

FIG. 9 is a block diagram of an exemplary domain mapping system 900, which can be used in any of the examples herein. In the example, there are three layers 910A-C of functionality. In addition to the domain-independent layer 910A, there is a domain-specific layer 910B and a more specialized domain specific layer 910C, which serve as domain mappers.

Each layer can have one or more programming object classes 920A-960C to implement functionality of the framework. Such classes can inherit from the entity base class or other domain-independent classes. Other classes (e.g., for a rendered view or the like) can be included in the layers. The domain-independent functionality in the most generic layer 910A can be extended by adding other layers as shown. In practice, a developing user can implement such a layering for n levels of what is needed, based on how complex their entities are. The example shows an entity as a document, but other entities can be used.

In the example, going down the layers increases the domain-specificity. Therefore, in a document-centric approach, the bottom layers will provide functionality for domain-specific documents. So, the middle layer provides functionality for somewhat domain-specific documents, and the bottom layer provides functionality for very domain-specific documents.

Thus, for example, any of the items (e.g., a logical document) can be represented by a more domain-specific object class having more domain-specific features, and the object class can be derived from a lesser domain-specific object class having lesser domain-specific features. The lesser domain-specific object class can be derived from a domain-independent entity object class. The more domain-specific can also inherit (e.g., indirectly) from the domain-independent entity object class.

In software development situations involving complex scenarios (e.g., a huge retailer), there are typically more abstractions. The three layers shown can be supported by default. A user can extend beyond the three layers.

In the system 900, both up calling 980 and down calling 990 can be supported. Up calling handlers to more specific classes can be provided via a derived class (e.g., with tight enforcement). In practice, only one call need be executed in an up calling scenario. Down calling can be supported by a derived domain specific class calling the more generic object (e.g., free kernel approach).

In addition to the pictured layers, scaffolding infrastructure frameworks can be provided. Such scaffolding frameworks can provide authentication, authorization, a document management, cache management, entity management, and the like.

Example 23

Exemplary Intermediate Reference Implementation Layer

In any of the examples herein, the framework can provide reference implementations. Such reference implementations can assist a developing user by providing functionality that can be used or referred to when developing a domain-specific application with the frameworks.

Such reference implementations need not be completely domain-specific. For example, the reference implementation can serve as an intermediate reference implementation layer, such as the layer 910B of FIG. 9, which is situated between a domain independent layer and a more specialized domain-specific layer.

Such an intermediate layer can be provided as part of a reference implementation to provide functionality that is common to a plurality of domains, but not completely domain-independent. For example, such an intermediate layer can provide functionality for a floor plan, whether that floor plan be in a retail or real estate context. Accordingly, the intermediate layer can be of great use to a developing user who wishes to implement floor plan functionality in some other business domain. In some cases, the functionality may be sufficient. However, if desired, the user can further derive the programming objects in the intermediate layer to provide more specialized domain-specific functionality.

Such a layered approach can provide reusability of the intermediate layers.

Example 24

Exemplary Domain Mapping

In any the examples herein, domain mappers can provide the domain business logic to the generic framework. For example, the framework can support generic load and save functionality. Make such functionality slightly less generic, programming object classes can be derived from generic components. A domain mapper for a particular domain thus may contain one or more classes derived from more generic classes (e.g., rendered view, view manager, use case manager, document manager, and the like). For example, in some implementations, perhaps functionality need be added to only one of the classes. In such a case, the domain mapper may contain only that one class. Four remaining classes that are not further extended, the generic functionality is still available.

Thus, in any of the examples herein, domain mapping can be accomplished by one or more domain mapping the layers, including intermediate reference implementation layers as described herein.

Although many of the examples herein extend classes by adding functionality, a layer can also filter out functionality, override generic functions, or the like.

A domain mapper can provide the domain business logic to a framework, which is generic. The functionality supported by a domain mapper can include any of the following:

Business logic can be provided to determine which business document is to be loaded (e.g., the location of the document, its hierarchical relationship to other documents, what kind of business resource it represents, and the like).

The domain mapper can provide functionality for determining when the document needs to be opened (e.g., during traversal of a hierarchy, upon start up, upon selection of a business resource, and the like).

The domain mapper can provide functionality for determining what views can be realized from the business document and provide a reference to configuration information for achieving such views.

The domain mapper can provide functionality for determining what operations can be performed on the business document (e.g., open, delete, copy, clone, display, and the like) and provide functionality for achieving such operations.

The domain mapper can provide functionality for determining who can do the operations on the business document (e.g., role-based access control).

The domain mapper can provide functionality for determining how many views can be realized.

The domain mapper can provide functionality for determining what type of filters can be applied over a document to realize the various views.

The domain mapper can provide functionality for determining how to display the output view (e.g., refer to a view provider and provide view provider extensions).

The domain mapper can provide functionality for determining how changes to a document will be saved (e.g., as part of the document, as a separate list of changes to a base document, and the like).

The domain mapper provide functionality for determining how changes to views will be saved (e.g., in what format, how named, and the like).

Accordingly, the domain mapper can enable a generic framework to work with particular domain-specific business processes and documents, and it can integrate the document view manager of the framework with domain-specific view providers.

Figure 10:
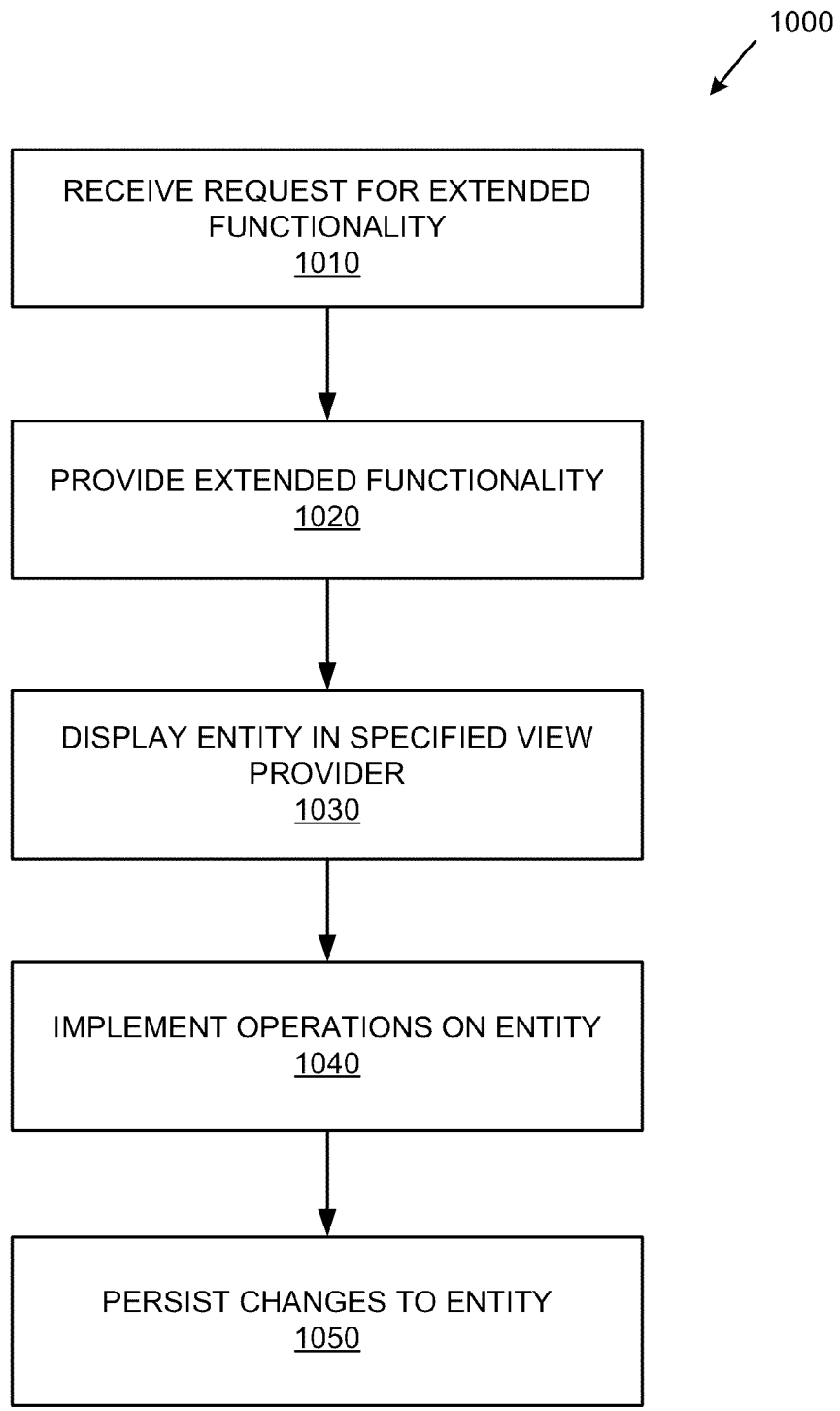
FIG. 10 is a flowchart of an exemplary method of implementing domain mapping.

FIG. 10 is a flow chart of an exemplary method 1000 of implementing domain mapping. The described functionality can be provided by a combined package of software in the form of a domain mapper. Various functionality can be achieved by interacting with the domain-independent framework via calls to application programming interfaces that enable domain-specific functionality to be provided by the domain mapper without having the alter the framework architecture.

At 1010, a request is received to implement extended functionality for a specific domain has implemented by the domain mapper. Such a request can be responsive to internal processing, interaction with a user interface, and the like.

Configuration information can also be retrieved from the base framework as appropriate.

At 1020, the extended functionality implemented by the domain mapper is provided. For example, any of the functionality described above can be provided. Such functionality is over and above the base functionality provided by the framework.

At 1030, the involved entity (e.g., business document) is displayed in the specified a view provider. Such display can include an indication of the functionality provided.

At 1040, operations on the entity as per the functionality implemented in the domain mapper are processed. Again, such functionality can be internal processing, interaction with the user interface, and the like.

At 1050, the entity as altered by the operations is persisted to the database. Persistence can take the form of saving an altered document, saving changes to a view, and the like. Coordination with the framework is implemented so that framework supported functionality (e.g., security, auditing, etc.) takes place.

Example 25

Exemplary Reference Implementation User Interface

Figure 11:
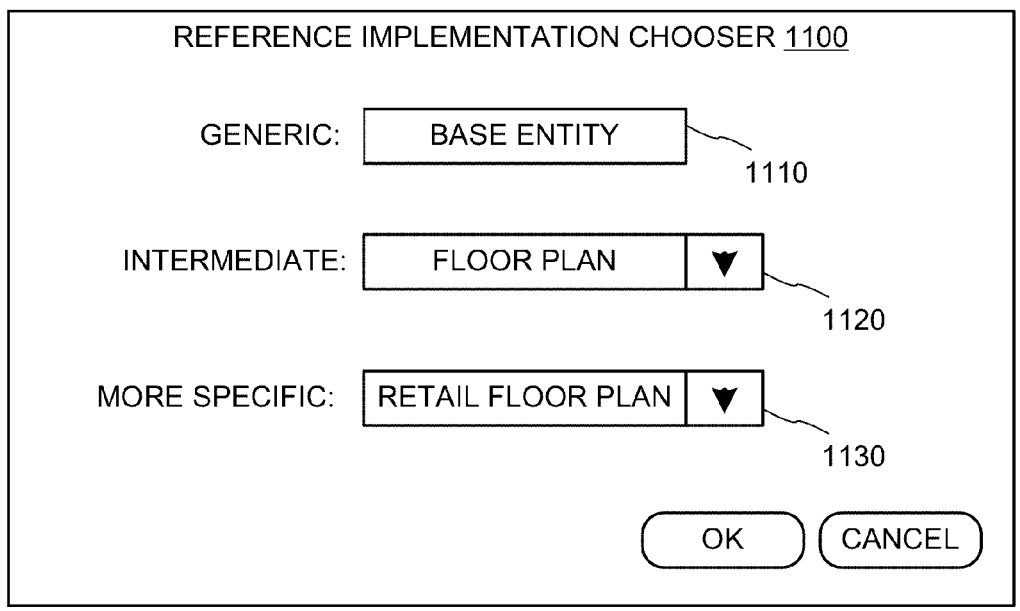
FIG. 11 is a screen shot of an exemplary user interface for choosing reference implementation layers.

FIG. 11 is a screen shot of an exemplary user interface 1100 for choosing reference implementation layers and can be used in any of the examples herein. The user interface 1100 can be provided as part of a reference implementation chooser tool for the frameworks.

The frameworks can have access to a variety of reference implementations, including intermediate layers for use as domain mappers. In the example, a user interface 1100 presents three layers. However, additional layers can be supported.

The generic layer 1110 is typically fixed. However, it can be configured to present generic entity types such as document, use case, view, business object, or the like.

A user interface element 1120 can present a plurality of choices, and accept a selection therefrom. The choices can be available intermediate reference implementation layers that apply to more than one domain. Upon selection of an intermediate layer, another user interface element 1130 can present a plurality of choices, and accept a selection therefrom. The choices can be more specialized domain-specific layers that further refine the intermediate layer. A special choice for no layer (e.g., "custom" layer) can be provided. In such a case, a developing user can use the intermediate layer either as is or as a starting point to further derive classes and provide additional functionality independent of the reference implementation chooser.

Still further specific layers can be supported. In the example shown in FIG. 11, a more specific retail floor plan layer (e.g., for a specific retail chain) can be included with appropriate user interface elements.

Additionally, the frameworks can support use of configuration information to specify the desired layers. For example, an XML file can specify various layers.

Example 26

Exemplary Configuration Via Reference Implementation

Figure 12:
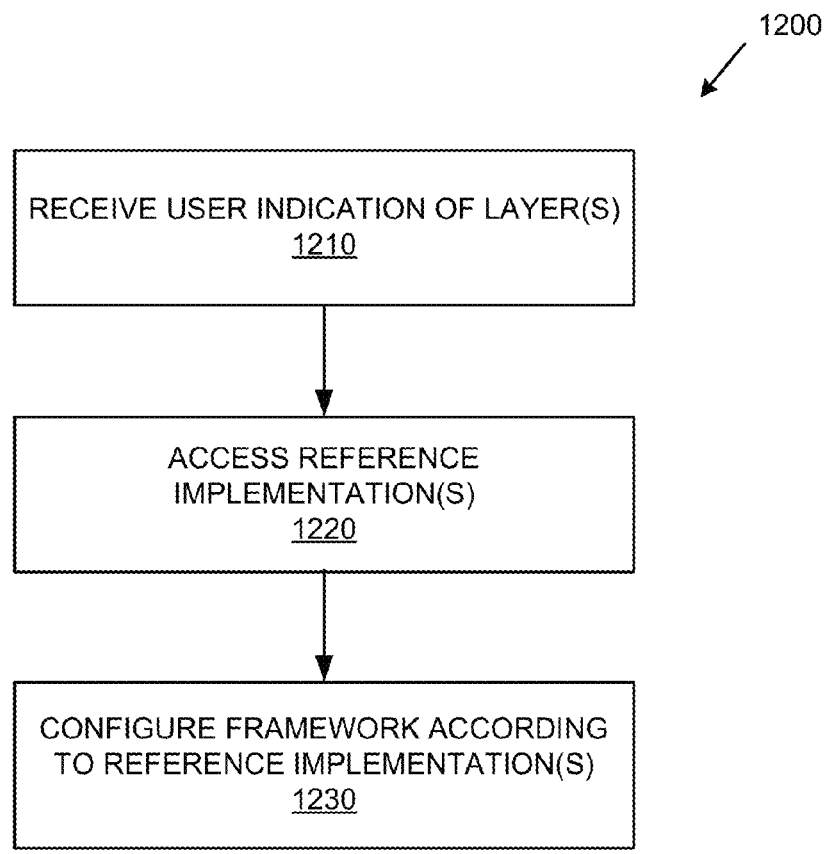
FIG. 12 is a flowchart of an exemplary method of implementing reference implementation layers.

FIG. 12 is a flow chart of an exemplary method 1200 of implementing reference implementation layers and can be achieved, for example via the user interface of FIG. 11. At 1210, a user indication of one or more layers is received.

At 1220, one or more reference implementations corresponding to the user indications are accessed. For example, programming objects, configuration files, and the like can be accessed from reference implementations available to one or more frameworks.

At 1230, the one or more frameworks are configured according to the one or more reference implementations (e.g., to implement functionality contained in the reference implementations). For example, base entity classes can be extended by the programming object class definitions in the reference implementations. In some cases, generic base entity class functionality can remain, even if some functionality is extended.

Having extended the functionality, a developing user can use the application as configured or make additional changes as appropriate. For example, fourth and fifth layers of domain mappers can be added to focus on exact domain specificities.

Example 27

Exemplary Common Extensible Pattern Architecture Framework

In any of the examples herein, a Common Extensible Pattern Architecture Framework ("cXPA") can comprise an Extensible View Architecture Framework ("XVA"), a smart proxy, or both.

Example 28

Exemplary Extensible View Architecture Framework

Figure 13:
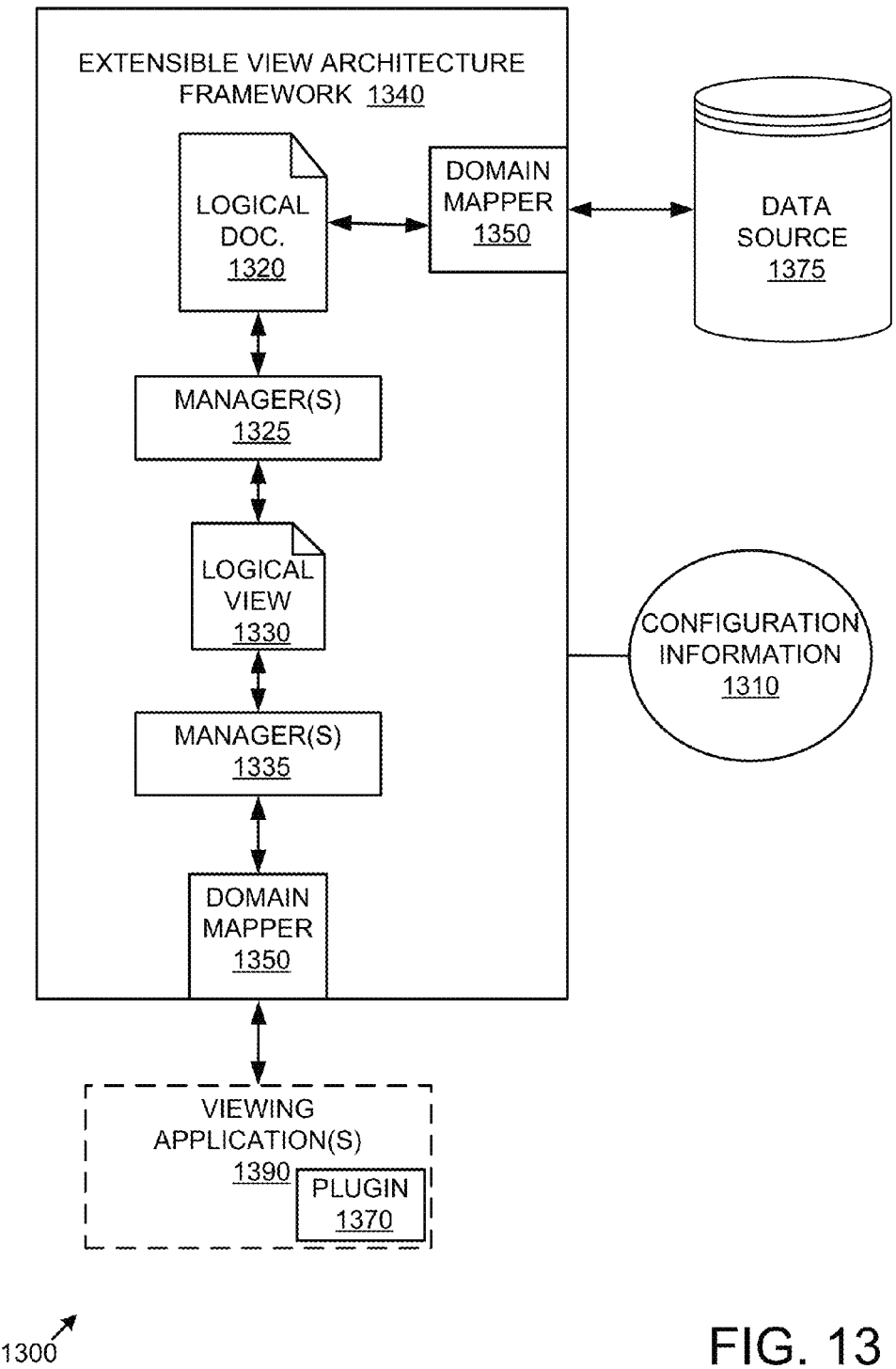
FIG. 13 is a block diagram of an exemplary extensible view architecture framework a system.

FIG. 13 is a block diagram of an exemplary extensible view architecture framework system 1300 and can be used in any of the examples herein. The framework 1340 and any of the other frameworks herein, can be domain independent. In the example, the extensible view architecture framework 1340 has access to configuration information 1310 and a data source 1375. Viewing applications 1390 (e.g., view providers) can include respective plug-ins 1370 to accomplish viewing by users.

The framework 1340 can provide an entity-centric platform. In the example, entities are extended to documents, and the framework 1340 provides a document-centric platform by which data in the data source 1375 are created, loaded, viewed, updated, deleted, and the like. Data from the data source 1375 can be assembled according to a logical document definition to form a logical document 1320. When stored in the data source 1375, the document is sometimes called a "physical" or "real" document because it is typically stored as a document or serialized data stream, unlike the logical document, which is typically implemented as business objects.

One or more managers 1325 (e.g., entity manager, document manager, use-case manager, etc.) can provide a view 1330 of the logical document 1320. A view manager 1335 can manage the view life cycle. In practice, the view 1330 takes the form of a logical view, which is of a format that accommodates a plurality of viewing applications. The viewing applications ultimately provide real or physical views.

The logical view 1330 can be viewed by one or more viewing applications 1390, by which a user can interact with the view 1330 as described herein. Depending on the implementation, when a user saves the logical view 1330, the original document content in the data source 1375 can be left unchanged. Instead, the logical view 1330 is saved to the data source 1375. However, the user need not be aware of the internal workings of the application.

In the example, the configuration information 1310 can include indications of classes, callable methods, or the like to implement functionality specific to a particular business domain. In some cases, the extensible view architecture framework can consult such configuration information (e.g., at runtime) to determine which functionality is to be invoked.

A domain mapper 1350 can be provided to accomplish mapping for a particular business domain. A single domain mapper 1350 can be used for both framework-data source interaction and framework-viewing application interaction. Or, separate mappers can be used as appropriate. As described herein, the domain mapper 1350 can take the form of an extended class that derives from a domain-independent base entity class.

Although not shown, a smart proxy can be used to provide distributed computing functionality.

Example 29

Exemplary Method of Providing a View of a Document

Figure 14:
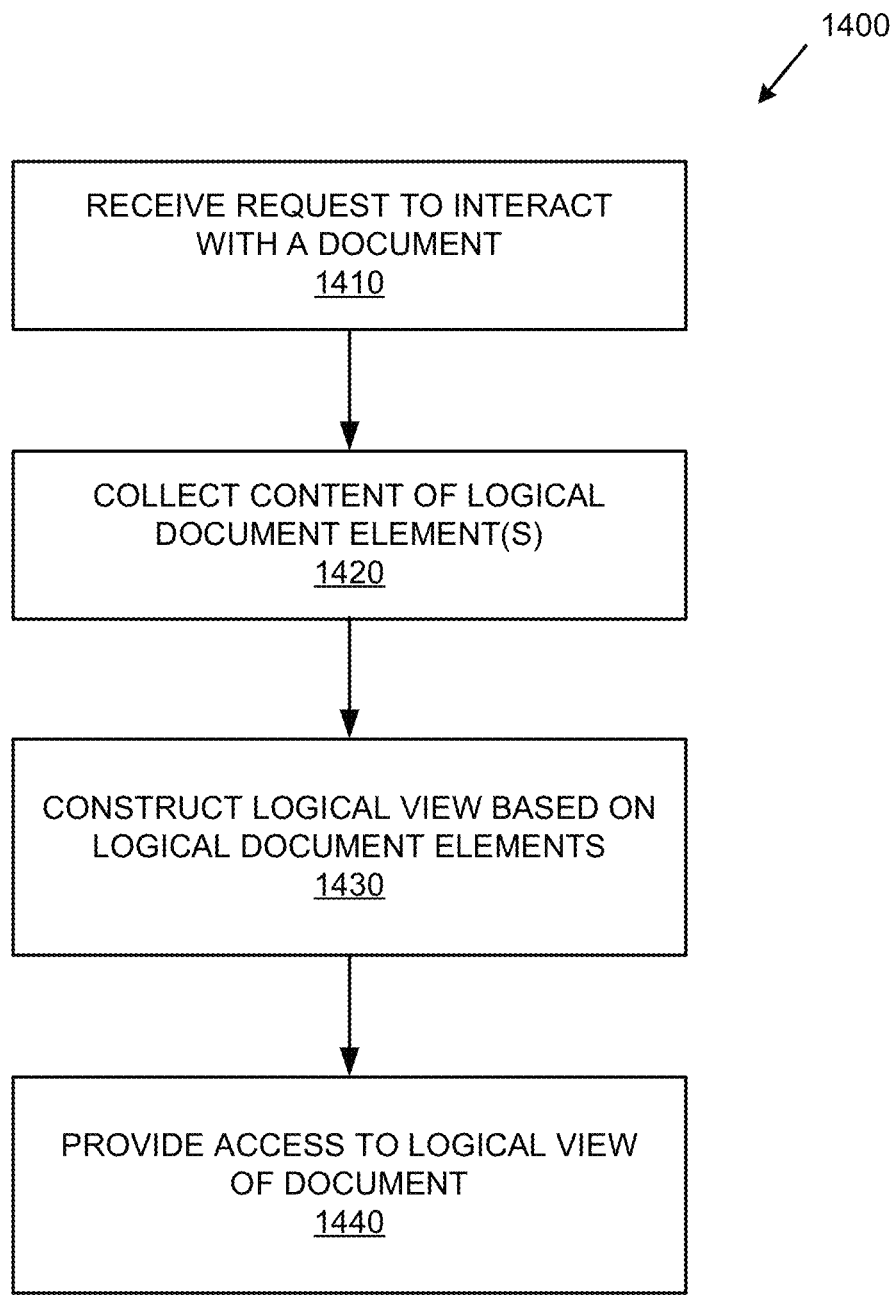
FIG. 14 is a flowchart of an exemplary method of providing a view of a document.

FIG. 14 is a flowchart of an exemplary method 1400 of providing a view of a document and can be implemented, for example, in a system such as that shown in FIG. 13.

At 1410, a request to interact with a document is received. For example, any number of operations can be performed (e.g., create, load, edit, delete, or the like). Such operations can be performed responsive to a request received via a user interface (e.g., in a view provider) to render a document for viewing. However, a request to interact with a document can also come from another application or that wishes to interact with the document. Or, the request can come from another framework (e.g., EAF) (e.g., to transform the document according to rules).

Responsive to receiving the request, the request can be processed according to configuration stored in a framework (e.g., an extensible view architecture framework). For example, method calls can be directed to a programming object of an object class specified in the configuration information.

At 1420, content of logical document elements is collected (e.g., into a logical document). For example, such content can be collected from one or more locations (e.g., source documents) in a data source (e.g., according to a logical document definition). As described herein, the logical document elements can be drawn from one or more source document, and the content can be filtered (e.g., a logical document need not have all the content of the associated source documents in the data source). In practice, the logical document elements can be represented as a logical document. Such a logical document can be are encapsulated in one or more programming objects of an object class (e.g., that contain the logical document elements). Such an object class can be a base entity domain-independent class or a class derived from domain-independent class.

At 1430, a logical view is constructed based on the logical document (e.g., the one or more logical document elements).

At 1440, access to the logical view of the document is provided (e.g., for consumption by a view provider or other application). In practice, a view provider can access the logical view and convert it into a rendered view for presentation in a user interface (e.g., to a user). The logical view can be of a format for consumption by a plurality of different view provider types.

Example 30

Exemplary Extensible View Architecture Framework

Figure 15:
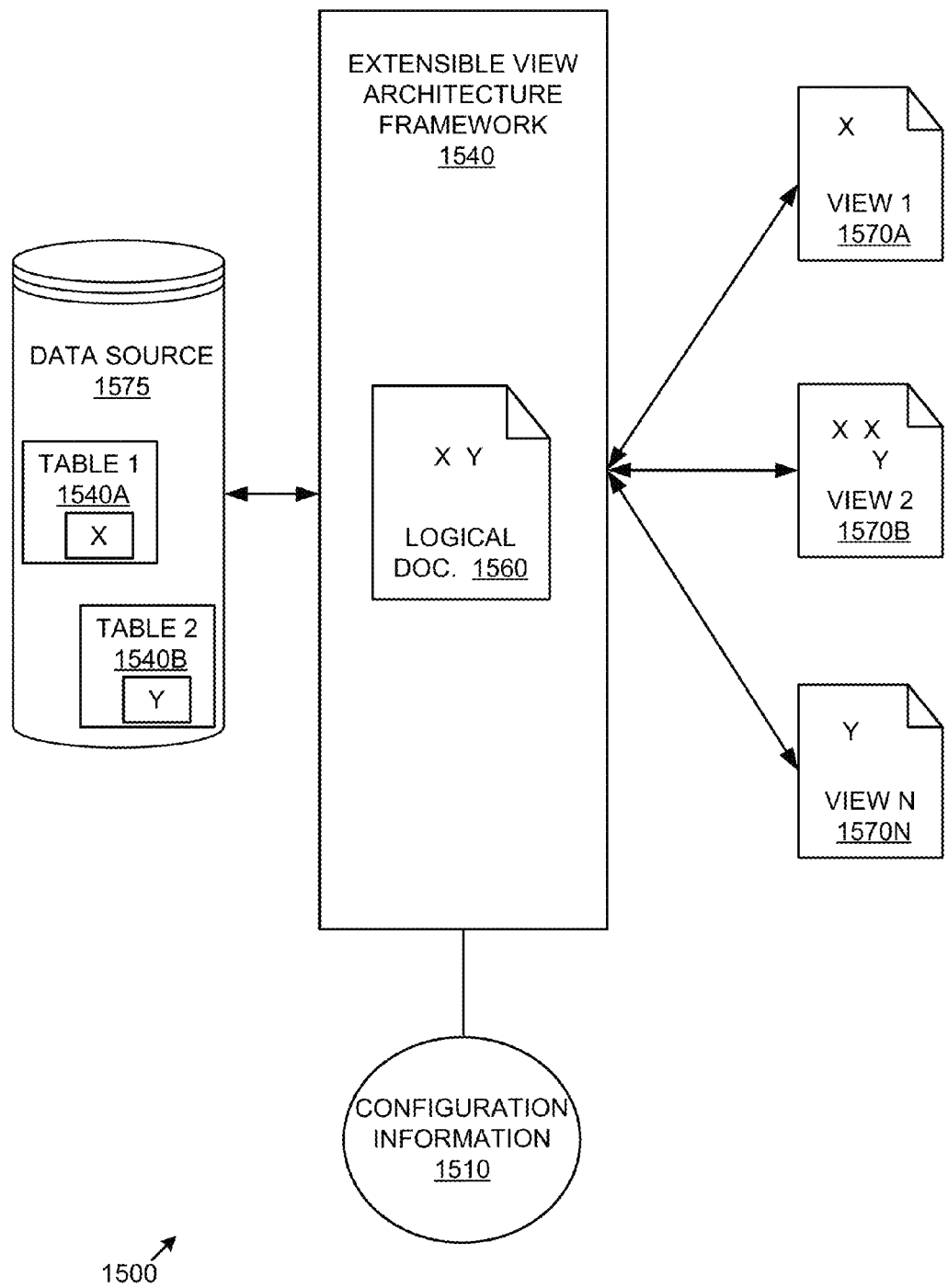
FIG. 15 is a block diagram of an exemplary extensible view architecture framework providing a plurality of views of a logical document.

FIG. 15 is a block diagram of an exemplary extensible view architecture framework system 1500 providing a plurality of views 1570A-N of a logical document 1560 and can be used in any of the examples herein. In the example, the extensible view architecture framework 1540 has access to configuration information 1510 and a data source 1575. Although viewing applications (e.g., view providers) are not shown, they can be used to display the views to a user.

In the example, a logical document definition indicates which logical document elements in the data source 1575 are to be retrieved to assemble the logical document 1560. For example, such logical document elements can include different elements in different tables 1540A and 1540B. Thus, the logical document elements can be scattered among different sources (e.g., at scattered locations) in the data source 1575. Although two tables 1540A and 1540B are shown, the sources can be of different source types (e.g., a spreadsheet and a database table).

Based on the configuration information 1510, the extensible view architecture framework 1540 can provide a plurality of views 1570A-N for viewing via viewing applications. Such views can incorporate one or more of the logical document elements appearing in the logical document 1560. As described herein, the views can be provided as logical views that are ultimately displayed as rendered views. Similarly, any number of reports can be based on the logical document 1560.

The extensible view architecture framework can store the logical document 1560 throughout the duration of providing a plurality of views, reports, or the like. So, for example, requests for multiple views of the assembled document 1560 can be based on a locally stored version of the document 1560 without having to retrieve data from the data source 1575.

Example 31

Exemplary Method of Providing a View of a Document

Figure 16:
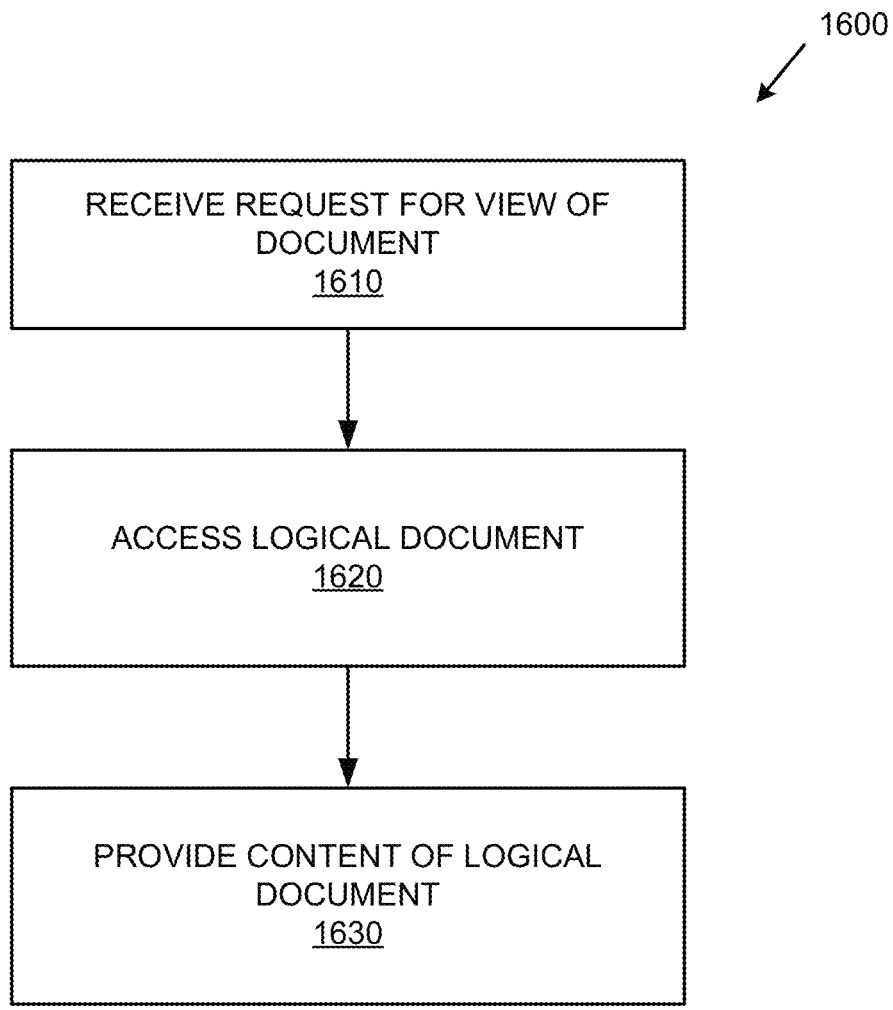
FIG. 16 is a flowchart of an exemplary method of providing a view of a logical document.

FIG. 16 is a flowchart of an exemplary method 1600 of providing a view of a logical document and can be implemented, for example, in a system such as that shown in FIG. 15.

At 1610, a request for a view of a document is received. As described herein, such requests can be managed by a document manager, a view manager, or the two working in conjunction.

At 1620, responsive to the request, a logical document (e.g., comprising one or more logical document elements of the document) is accessed (e.g., from a data source). Such access can comprise calling one or more callable methods on at least one programming object representing the logical document. Such a programming object can be configured to provide the content of the document.

At 1630, responsive to the request, the content of the logical document is provided. For example, the content as represented by the programming object representing the logical document can be provided.

In practice, content can be provided as a logical view of the logical document; there need not be any apparent difference between the document and the view to a viewing user; however, a logical view can offer filtering of the logical document content if desired.

To accomplish rendering, one logical view out of a plurality of logical views can be represented with a programming object representing the logical view. Access to the programming object can be provided.

A method call on the programming object to provide the logical view (e.g., to a view provider for display as a rendered view) can be received. Responsive to the method call, content in a view-provider-independent format can be provided for display (e.g., by the view provider).

A logical document can have one or more (e.g., n) views. As described herein, a user can switch between views, and the new view can be based on a locally stored copy. Therefore, additional access to the data source is unneeded.

Example 32

Exemplary Source Documents

In any of the examples herein, the frameworks can store information as source documents. Such documents are sometimes called "physical" or "real" documents because they can take the form of a single conventional document by itself (e.g., a Microsoft® Word® document that is stored on a file server). However, source documents can also be serialized (e.g., a binary large object, BLOB, or the like) and stored in a database. Or, source documents can take the form of XML (e.g., the content is attribute/value pairs organized according to a hierarchical schema).

Example 33

Exemplary Logical Documents

In any of the examples herein, the frameworks can support logical documents. The logical document is in an abstraction of document content, which is contained in one or more source documents. As an abstraction, the logical document can be treated as a single unit, regardless of the content source, filtering applied to the content, or the ultimate view provider. The logical document can be implemented as one or more containers that provide content from one or more source documents. What is understood as a document by a user can be represented internally as a logical document having one or more logical document elements; the content of the one or more logical document elements can be stored as source documents in one or more locations within a data source. The logical document can comprise one or more logical document elements comprising content drawing from a plurality of source documents stored in a data source.

As described herein, documents can be simple stored files. By contrast, a logical document is a representation within the framework. For a source document having document content, the framework will fetch the information, deserialize it if necessary, and create objects (e.g., value objects and business objects that are used within the source code). The logical document objects are filled (e.g., the content of the source document(s) is stored in memory as a logical document). The logical document need not have any exactly corresponding corollary in the data source.

In some cases, a source document may have a multiplicity of information. A logical document which draws upon such a source document can filter the information in the source document as appropriate according to the logical document definition.

So, for example in the case of a floor plan that has information about walkways, departments, cubicles, tables, chairs, restrooms, conference halls, etc., perhaps the application is only concerned with the location of the cubicles. In such a case, only the parts of the source document which are of interest need to be read and loaded into the logical document objects. This is configurable through method signatures. Parameters that are passed as part of the framework, when the objects are derived from the base class, can filter out as much as they require. So the objects can load the logical documents to be a subset of the content in the source document.

A document manager can manage the life cycle of the logical documents.

Example 34

Exemplary Document Views

In any of the examples herein, the frameworks can support views. The frameworks can support logical views and rendered (or "physical") views. A logical document can have n views. The logical view can provide what requesting view providers need for purposes of displaying rendered views. The logical view can serve as a content holder. In practice, a logical view of a document is based on the logical document associated with the document.

For example, the functionality to display a document is desired, first the content is taken from the source document, red, and loaded into logical document objects. Then, a view manager can be invoked (e.g., by a logical document object) to manage the view (e.g., the logical view's life cycle). A view manager can be instantiated as a view manager programming object. As in any of the other examples herein, such an object can be of an object class derived form a domain-independent object class. The class can include definition of a callable method creating a programming object representing the logical view. Again, such an object can be derived from a domain-independent class.

At the request comes to the view to manager to display something, the view manager takes a request and starts a workflow to accomplish the display. The view manager coordinates loading the logical document objects into logical views.

Between the logical document object and the logical view object, content can be exchanged. The data can be filtered into various views, or all content from the logical document can be included in the view. Again, based on the method signature, the various parameters that each of the methods of the various functions supported by the framework support, the content is selected.

The logical view has the content of the view. The class definition can include a callable method for drawing the logical view, a callable method for capturing the logical view, and the like.

The logical view can be of a view-provider-independent form. The framework can include an object representing a view provider. The logical view can interact with the view provider to accomplish presenting a view to a user.

The logical view is presented as a rendered view by the view provider. The choice of view provider can be based on those that are available, which is preferred, which is the default, etc.

Example 35

Exemplary Viewing Applications

In any of the examples herein, rendered views of the documents managed by the framework can be provided by a viewing application (sometimes called a "view provider"), which can be any of a variety of applications that provide a displayed user interface to a user. Typically, such applications adopt a document-centric approach, which can be accommodated by the frameworks as described herein; however, any entity-centric approach can be supported.

For example, applications such as word processing, spreadsheet, drawings, computer automated design programs, or the like, can provide rendered views of documents managed by the framework. Examples include Microsoft® Word® software, Microsoft® Excel® software, Microsoft® Visio® software, the Windows® Presentation Foundation (WPF) software, and the like.

View providers can be thick clients (e.g., desktop applications), web applications (e.g., web browsers, mobile applications, or the like.

In practice, plug-in functionality can provide customization within the view provider to allow access to business domain-specific functions, and accomplish create, revise, update, and delete (CRUD) functionality for managed documents. Such plug-ins may or may not manifest themselves within the user interface.

Example 36

Exemplary Rendering of Logical View by View Provider

In any of the examples herein, a view provider can contain the logic to render a logical view. Such a rendered view is sometimes called a "physical" view because it is physically manifested for viewing by the user. The view provider consumes the logical view. The view provider can consume the entire logical view, or it can filter it.

The view provider can include functionality for reading the content from the logical view objects, converting them, and then rendering them in the view provider's user interface. Such functionality can be provided as a plug-in. The functionality can manifest itself as a tool bar, or can be a configuration file. For example, in xml file can specify that for particular application, the view provider is a particular application. Internally, the framework can invoke that application. Plug-in functionality for a wide variety of view providers can be provided as part of the framework. Such functionality can transform the logical view into a physical view.

Example 37

Exemplary Space Visualization

In any of the examples herein, the frameworks can support space visualization. For example, a visualization framework can be implemented as a space visualization framework (SVF). Space visualization can provide a visual view of any hierarchical spatial data. For example, in the retail context, such data can relate to store clusters, stores, departments, fixtures, and the like.

Example 38

Exemplary Domain Mapper

In any of the examples herein, a domain mapper can be configured to extend domain-independent functionality of any of the frameworks herein to domain-specific functionality.

In practice, the various layers beyond a base layer can be implemented via domain mappers. In practice, a domain mapper can take the form of objects derived from a base entity class.

Although some examples herein show a domain mapper that extends retail user interface functionality, application to any of a plurality of other business domains can be supported.

Example 39

Exemplary Smart Proxy

In any of the examples herein, a smart proxy can manage local storage of documents to prevent excessive accesses to a data source. The smart proxy can also continue to provide access to logical documents or logical views, even in a mobile environment, where connectivity may be intermittent.

Figure 17A:
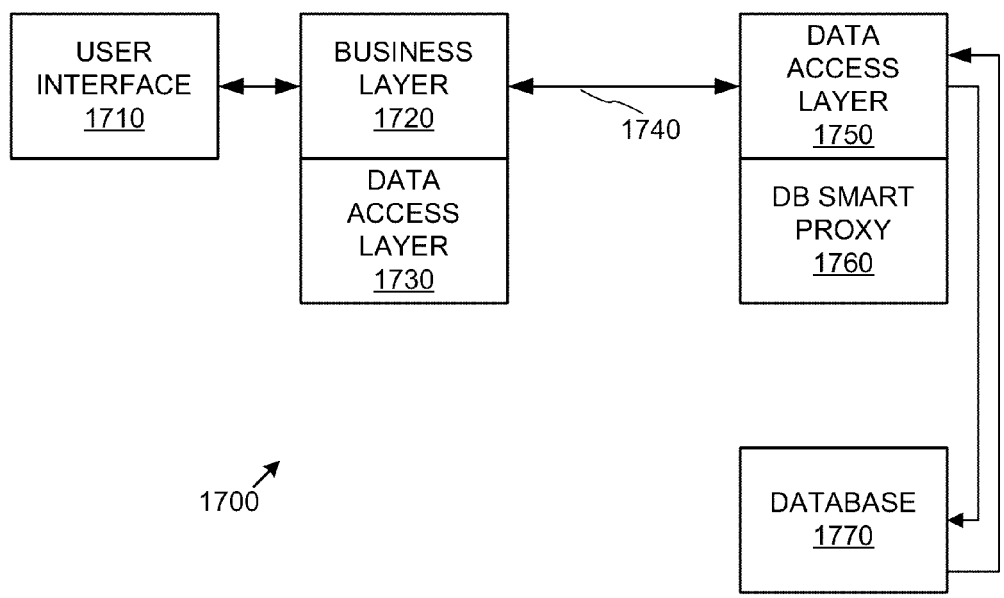
FIGS. 17A-B are block diagrams of an exemplary smart proxy system.

FIG. 17A is a block diagram of an exemplary smart proxy system 1700. In the example, a user requests data from the business layer 1720 through the user interface 1710. The business layer sends a data access request to the data access layer 1750 (e.g., which can reside on a different server). The data access layer 1750 processes to request, retrieves the data from the database 1770, and sends it back to the business layer 1720. The business layer 1720 then sends the received a data back to the user interface 1710, where the user can see it.

Figure 17B:
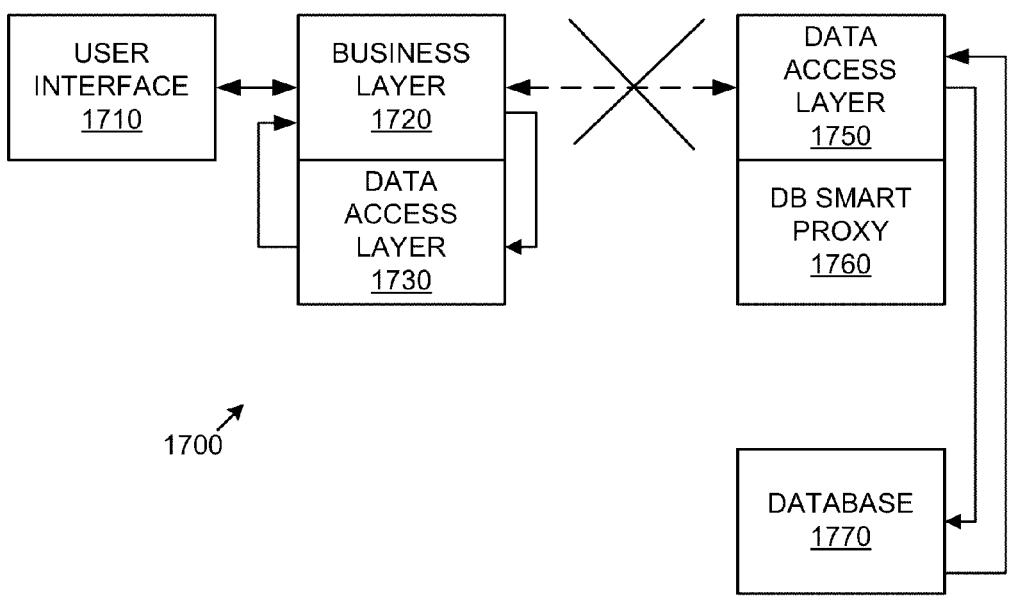

FIG. 17B is also a block diagram of an exemplary smart proxy system 1700; however, in the example the connection 1740 between the business layer 1720 and the data access layer 1750 is not available. In such a scenario, a user requests data from the business layer 1720 through the user interface 1710. The business layer 1720 checks for the availability of the data access layer 1750. Responsive to determining that the connection 1740 is not available, the business layer 1720 instead connects to the data access layer copy 1730 (e.g., a DLL proxy) residing locally on the same server. The local copy 1730 processes the request locally, and prepares the data as the response to the request. The response is then sent back to the user interface 1710, where the user can see it.

The user is unable to distinguish whether the data has come from the server on which the data access layer 1750 resides or from the server on which the business layer 1720 resides. Therefore, the underlying complex architecture is hidden.

Similarly, a database smart proxy 1760 can provide what appears to be information from a database 1770, even if the database 1770 is unavailable.

The frameworks can support configuration settings that specify whether and how the smart proxy can be used. For example, it may be desirable for certain entities to use the smart proxy, while others do not.

In this way, the smart proxy provides for location independence (e.g., components within or extending the framework can reside on different servers without regard to whether a connection is currently available). Components can therefore continue to operate even when a connection is not available. Operations can be logged and then executed subsequently when a connection is available. A local copy of data can be stored in anticipation of requests when a connection is no longer available. Therefore, extensible view architecture components can be distributed across servers, and thick client applications can be implemented regardless of their location and connectivity to the data access layer 1750.

Example 40

Exemplary Enterprise Automation Framework

Figure 18:
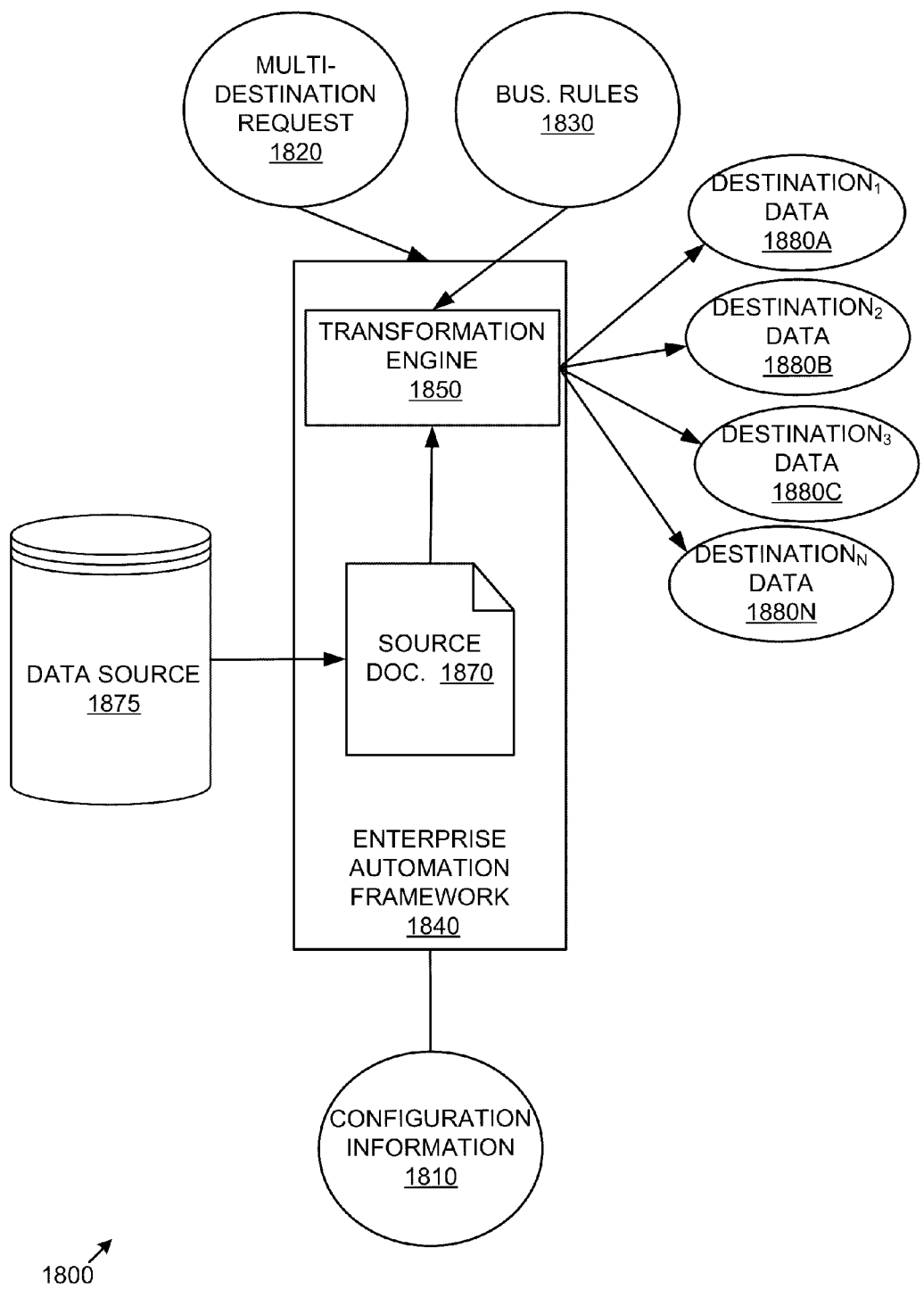
FIG. 18 is a block diagram of an exemplary enterprise automation framework system.

FIG. 18 is a block diagram of an exemplary enterprise automation framework system 1800 and can be used in any of the examples herein. In the example, the enterprise automation framework 1840 has access to configuration information 1810 and a data source 1875. The framework receives a multi-destination request 1820 and fulfills the request with reference to the data source 1875, and outputs destination data 1880A-N (e.g., a plurality of transformed entities). Although destination servers are not shown, the transformed entity data can be distributed to respective different destination servers.

The framework 1800 can employ a document-centric approach to data stored in the data source 1875, which can contain logical data elements. For example, a source document 1870 can be used as a starting point, and the data therein can be transformed to transformed documents with reference to business rules 1830, drawing on the data source 1875. As described herein, other entity-centric approaches can be supported. The source document 1870 can be implemented as a logical document, a logical view, or a template.

A rules engine (not shown) can be used to edit rules, apply rules, and the like. The transformation engine 1850 can invoke the rules engine to take advantage of such functionality. Other engines, such as optimization engines, can be invoked.

Although the example shows a single transformation engine 1850, in practice, execution can be accomplished via distributed processing, parallel processing, and the like. So, there may be multiple transformation engines 1850 (e.g., and associated engines for applying rules) at multiple locations executing together to accomplish the request 1820. In such a case, transforming a source document can involve transforming the source document at two different servers having separately executing local transformation engines.

The enterprise automation framework can be configured to transform one or more documents to a plurality of transformed documents according to business rules. As described herein, the enterprise automation framework can send a request to an enterprise computing framework to accomplish such transformation. Such a request can take a variety of forms (e.g., transform a particular source document into a plurality of transformed documents for a plurality of destinations, according to rules associated with respective of the destinations).

Example 41

Exemplary Method of Transforming Documents

Figure 19:
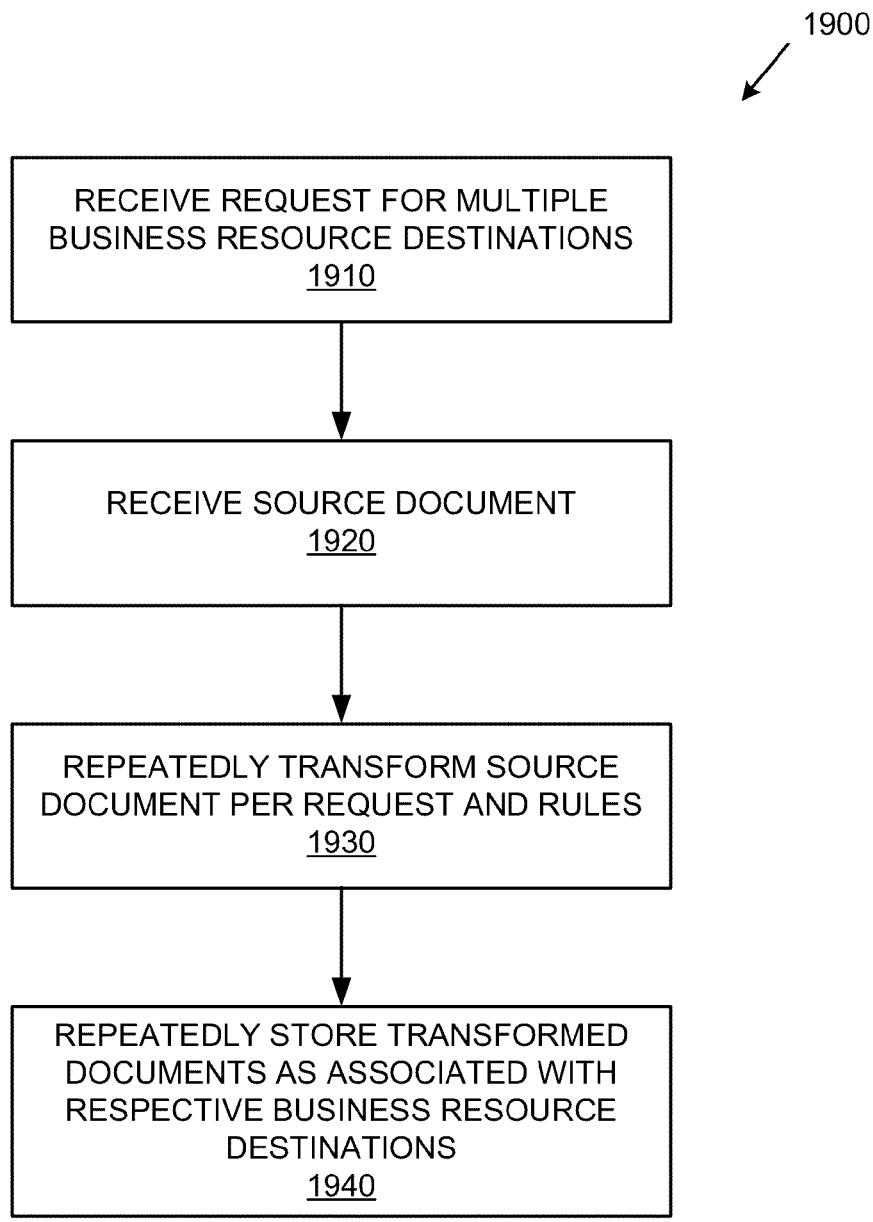
FIG. 19 is a flowchart of an exemplary method of transforming documents.

FIG. 19 is a flowchart of an exemplary method 1900 of transforming documents and can be implemented, for example, in a system such as that shown in FIG. 18.

At 1910, a request to generate a plurality of transformed documents for a respective plurality of destinations is received.

At 1920, a source document is received. A source document can represent a business resource. In practice, the source document can represent a standardized (e.g., hypothetical, optimized, or the like) business resource. To increase efficiency of processing, time and effort can be spent on developing an optimized source document, which is then intelligently transformed to a plurality of destinations according to respective rules of the destinations.

At 1930, the source document is repeatedly transformed per the request and the business rules. Different rules can be associated with different destinations. During transformation, data from the data source can be incorporated. The transformation can generate the plurality of transformed documents per the request.

At 1940, the transformed documents are stored as associated with respective destinations. Documents can be sent to different locations (e.g., different servers) if desired. Documents can be stored as logical documents (e.g., in a database).

The transformation 1930 and the storage 1940 of documents can include enforcing transaction discipline (e.g., atomicity, consistency, isolation, and durability properties) on any involved database operations. Operations can be logged (e.g., with an indication of the responsible executing user) so that a user can subsequently view audit trail and error logs based on the logged activities.

When used to process a particular document in conjunction with an extensible view architecture framework, rules for document transformation can be stored for a plurality of entities. In the enterprise automation framework, rules for respective of the entities can be applied, generating a plurality of transformed documents (e.g., comprising the particular document and other documents). Logical document and/or logical view functionality can be used in conjunction with the enterprise automation framework so that transformation can take place on logical views on logical documents. The transformed document can be saved back to the data store as logical documents for further processing.

Subsequently, a user can employ the extensible visualization framework (e.g., space visualization framework or the like) to view the document. Responsive to a request to view a transformed document, it can be presented in a user interface provided by a visualization framework.

Example 42

Exemplary Source Documents and Destinations

In any of the examples herein, a destination can be any business resource. The entity associated with the resource can represent the business resource.

So, for example, in a retail domain, destinations can take the form of retail locations (e.g., stores). In such a case, an entity (e.g., a document) associated with the destination can represent a particular store. Other business resources can be stores, store clusters, floors (e.g., floor plans), and fixtures (e.g., represented by planograms). Points of sale (e.g., checkout stands), distribution points in channel processing, merchandise points in merchandising processing, and the like can be destinations.

The framework can thus support a scenario where a standardized source is intelligently copied to plural destinations. For example, information for a standardized store can be intelligently copied to plural stores. Such information can represent spatial aspects of the store such as its physical layout. Similarly, a standardized planogram can be propagated to other stores. Rules can include adjacency and other constraints that result in planograms in the stores that are customized according to the rules associated with the particular store.

In other business domains, destinations can represent other business resources. For example, in an energy domain, energy processing sites can be destinations. In a telecom domain, call centers can be destinations. In the banking domain, automatic teller machines (ATMs) can be destinations, and the like.

The transformation can take hierarchical relationships into effect. For example, a business resource may be hierarchically related to another business resource. For example, a store may have multiple floors represented by respective floor plans. A store floor may have multiple fixtures represented by respective planograms. A request to transform a planogram for a standard store can be applied to destination planograms that are also associated with destination floors and destination stores. Rules can be drawn according to business resources in other levels of the hierarchy (e.g., store or floor rules can be applied to the planograms).

Example 43

Exemplary Requests for Enterprise Automation Framework

In any of the examples herein, a request can specify a large amount of work to be performed. For example, a large number of transformed documents can be specified. In practice, such a request can take the form of "generate document for n destinations by applying rules associated with the destinations to template documents associated with the destinations."

The enterprise automation framework can then identify the appropriate template documents, business rules, generate the transformed documents, and associate them with the respective destinations.

Example 44

Exemplary Standardization Achievement

In any of the examples herein, an enterprise automation framework can be used to achieve standardization across business resources. For example, if a particular entity represents a standard within the business, the standard entity can be transformed across plural destinations. Although rote (e.g., blind) copying can be applied, the framework supports application of business rules to transform the standard entity to respect the rules, which can vary from destination to destination. In such a way, the framework can intelligently copy the standard entity to plural destinations (e.g., stores or the like) by application of the rules.

The enterprise automation framework can orchestrate transformation of the data, and the ultimate copying (e.g., and process related to ensuring accurate copying) to destinations can be orchestrated by the enterprise computing framework.

Example 45

Exemplary Enterprise Computing Framework

Figure 20:
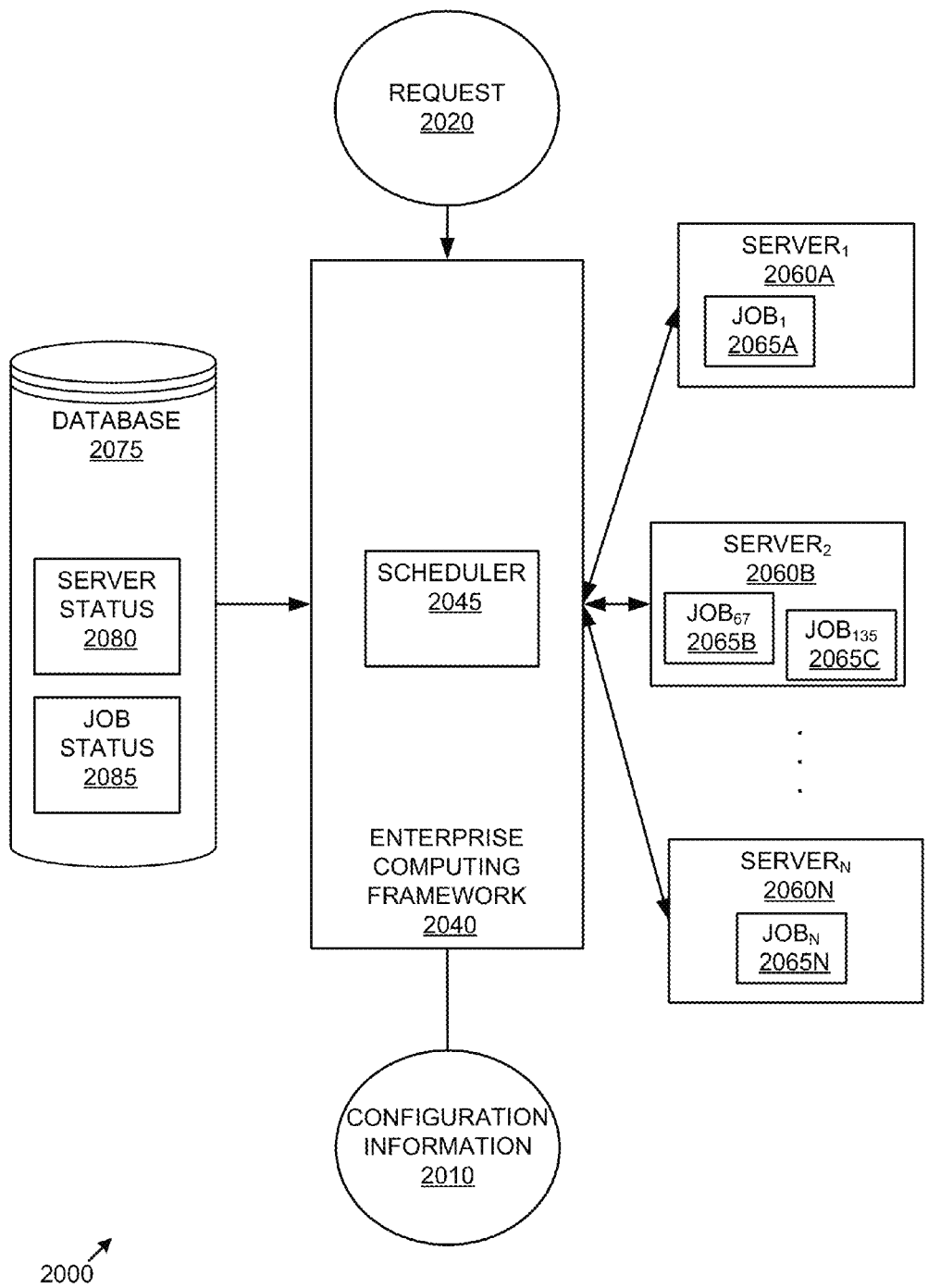
FIG. 20 is a block diagram of an exemplary enterprise computing framework system.

FIG. 20 is a block diagram of an exemplary enterprise computing framework system 2000 and can be used in any of the examples herein. In the example, the enterprise computing framework 2040 has access to configuration information 2010 and a database 2075.

The framework 2040 can store the status of the various servers 2060A-N in the database 2075. For example, the server status (e.g., availability, capacity, and the like) and job status (e.g., pending, completed, failed, aborted, and the like) can be stored and updated in real time (e.g., on a periodic basis before and during processing of the request 2030).

The framework 2040 can break the request 2020 into a plurality of jobs, which can be sent for execution on the various servers 2060A-N according to the scheduler 2045 (e.g., according to server availability and capacity). For example, the scheduler can distribute jobs 2065A-N among the servers 2060A-N to accomplish parallel processing.

The configuration information 2010 can customize the framework 2040. For example, policy description information as described herein can be stored as part of the configuration information 2010. Such policy description information can indicate how a request is broken down into a plurality of jobs and other information as described herein.

The results of the jobs 2065A-N can be monitored by the framework 2040, which can take care of rescheduling in the case of job failure. Job retries can be configured by changing a configuration setting in the configuration information 2010 (e.g., in the policy description information) and can be specified by job type.

Jobs that are ultimately aborted can be noted as such. The request 2020 may be able to continue even if jobs are aborted if so indicated by the configuration information 2010. For example, failure of some jobs may result in aborting the entire request 2020, but others may not.

The enterprise automation framework can include configuration information informing the enterprise computing framework indicating where the results of document transformations are to be stored.

A dashboard user interface can be provided to indicate the status of the various jobs.

Logical document and/or logical view functionality can be used in conjunction with the enterprise computing framework so that jobs process logical views, logical documents, or both.

Example 46

Exemplary Method of Fulfilling Request

Figure 21:
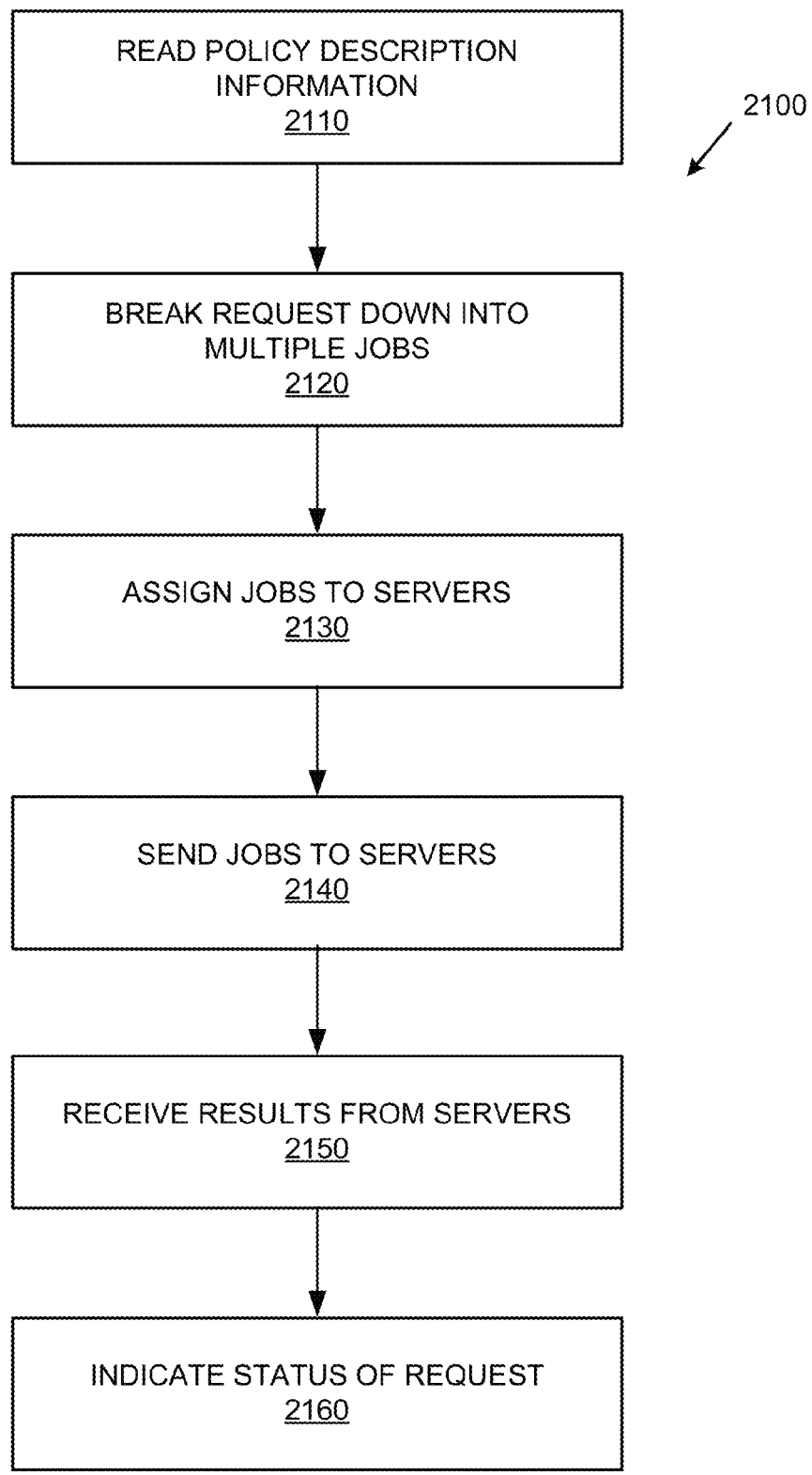
FIG. 21 is a flowchart of an exemplary method of fulfilling a request via execution of a plurality of jobs at a plurality of servers.

FIG. 21 is a flowchart of an exemplary method 2100 of fulfilling a request by execution of a plurality of jobs at a plurality of servers and can be implemented, for example, in a system such as that shown in FIG. 20.

The acts shown can be performed responsive to receiving an enterprise computing request.

At 2110, policy description information for the request is read. Such policy description information can read from configuration information as described herein. The policy description information can be received from a programming object as described herein.

At 2120, the request is broken down into multiple jobs (e.g., according to the policy description information). Various managers (e.g., request workflow manager, job workflow manager, and thread workflow manager) for handling the request and accomplishing execution are described herein. Managers can have respective policy information (e.g., files) specifying how to break down or schedule a request into jobs and assign to threads.

At 2130, the jobs are assigned to servers. Although not shown, the availability and processing capacity of servers can be monitored (e.g., via the enterprise resource config as described herein). Assignment can be based on the resource requirements of the jobs and the availability and capacity of the servers.

At 2140, the jobs are sent to the servers. The progress of the jobs can be monitored.

At 2150, results are received from servers. For example, results can indicate successful completion of the job.

At 2160, the status of the request is indicated. For example, if the jobs were successfully completed without any fatal errors, success of the request can be indicated. As described herein, recovery management, response management, and process monitoring and management can be supported.

When used to process a particular document in conjunction with an extensible view architecture framework and an enterprise automation framework, availability and capacity information for a plurality of servers can be stored. Based on the availability and capacity information, a job can be sent to the server in an enterprise computing framework. The job can generate a transformed document comprising the particular document. Based on the availability and capacity information, other jobs can be sent to other servers (e.g., to perform generating for other documents).

The enterprise computing framework can handle automated recovery management, workflow management, process monitoring, resources identification and allocation for execution. Providing such functionality in a domain-independent framework allows programmers to focus on the particulars of the business domain rather than having to re-use code to achieve such infrastructure functionality.

Example 47

Exemplary Computing Request

In any of the examples herein, an enterprise computing request can take the form of a request to perform computing tasks (e.g., one or more job bundles). Because such tasks are typically substantial in nature, the request can be associated with policy description information, which can indicate how to break the request down into smaller pieces (e.g., jobs). Requests can also be associated with a source (e.g., so the same request can be used for different sources), which can indicate a data source or a location within such a data source from which data for the request is drawn.

The request can take a simple form, and the framework can rely on associated configuration information rather than specifying all the configuration information in the request itself.

Typical requests can include any task which has the potential to be broken down into smaller tasks. For example, any form of processing that uses hardware/software to provide output. A request can take a variety of forms, such as "print 1000000 documents," "do beginning of day processing," "implement web transactions at end of day," and the like.

Example 48

Exemplary Detailed Enterprise Computing Framework

Figure 22:
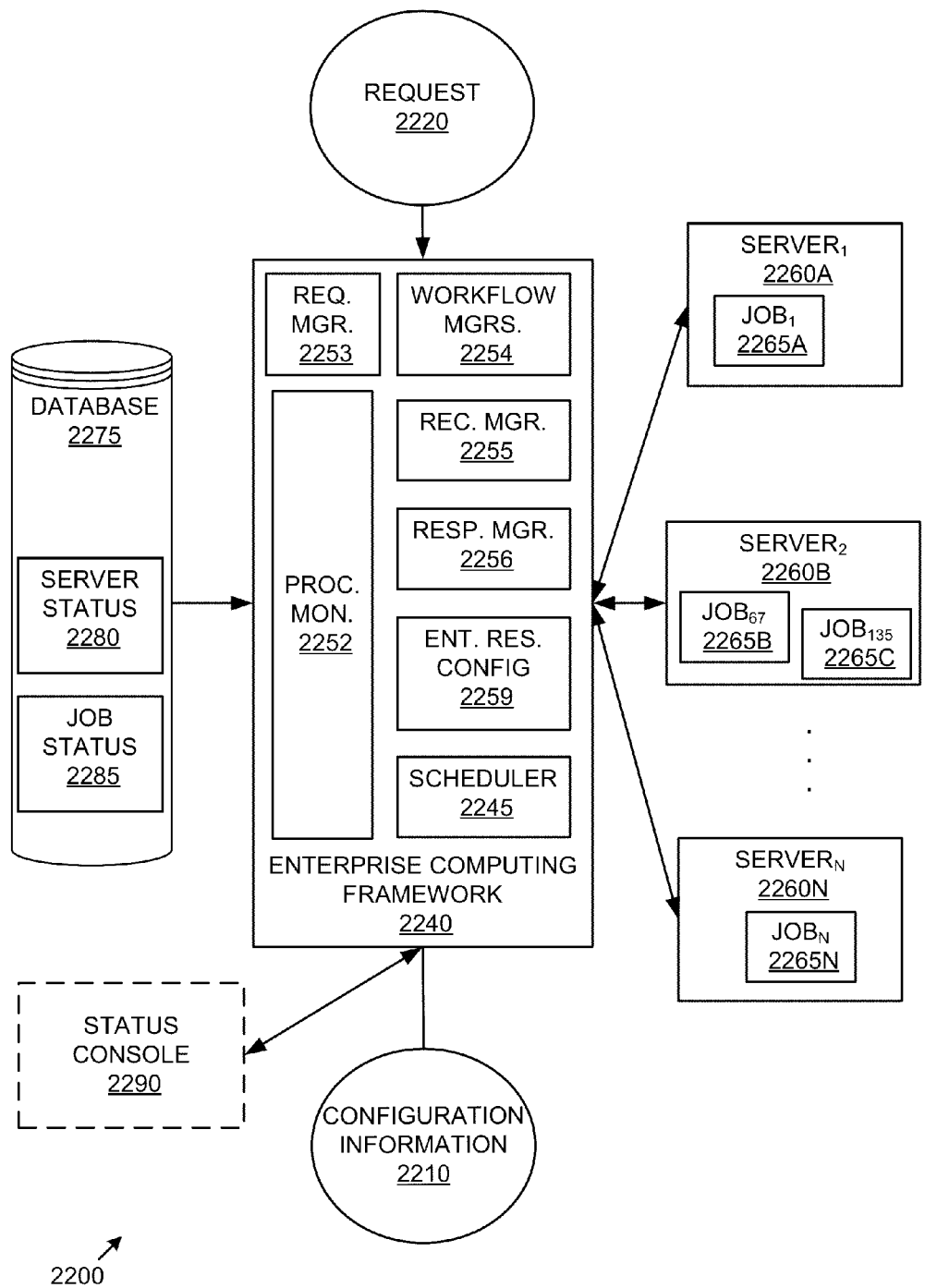
FIG. 22 is a block diagram of an exemplary enterprise computing framework system with detail concerning managers.

FIG. 22 is a block diagram of an exemplary enterprise computing framework system 2200 with detail concerning managers. In the example, the configuration information 2210, request 2220, enterprise computing framework 2240, scheduler 2245, servers 2260A-N and jobs 2265A-N, database 2275, server status 2280, and job status 2285 can function similarly to counterparts shown in FIG. 20. Additional detail is shown regarding various managers and the like.

The process monitor 2252 can monitor (e.g., continuously) status of jobs. Failed jobs can be handed over to the recovery manager 2255. The process monitor 2252 can direct retry requests to the recovery manager 2255.

A request manager 2253 can handle the lifecycle processing for the request 2220 and can interpret policy description information. A request manager can interact with assemblies or a user interface as described herein to obtain policy description information. The request manager 2253 can track how many jobs there are, how many retries are to be done, and specifics regarding the request. The request manager 2253 can send information regarding jobs to the other mangers in the framework 2240.

Other managers include workflow managers 2254, which can include a request workflow manager, a job workflow manager, and a thread workflow manager. For example, the request manager 2253 can use the services of the managers 2254 (e.g., a request workflow manager) to manage the workflow life cycle of the request (e.g., the jobs in the request) in a hierarchical delegation scenario. Other managers 2254 (e.g., the job workflow manager) can be used by the request workflow manager to manage the life cycle of a single job. The job workflow manager can take care of a job from end to end, whether it is successful or failing. So, for example, a separate workflow manager can be instantiated for respective jobs in the framework 2240 (e.g., x workflow manager instantiations for x jobs).

The request workflow manager can manage the job workflow managers. A job queue can track the jobs, their priority, when they came in, what is their sequence, and the like. The job workflow manager can use the services of a thread workflow manager, which causes the external servers or processes to process the request. The scheduler 2245 can assist.

The thread workflow manager can locate the job request, track the job request, complete the job request, and hand it back over to the job workflow manager, which hands it back to the request workflow manager, in concert via services of the scheduler 2245.

A recovery manager 2255 can manage failure and retries for jobs, respecting information in the policy description information (e.g., number or permitted retries) associated with the request 2220. Responsive to detecting hat a job failed, the recover manager 2255 can manage, with assistance from the process monitor 2252, retries. Sometimes a particular thread indicates failure or does not respond (e.g., after a timeout). In such a case, the process manager 2252 can send an alert to the recover manager 2255 indicating that a thread (e.g., a job executing on the thread) has failed. If there are no retires left, the recover manager can send an alert to the request manager 2253 saying that it failed. If there are interdependencies, the other jobs can fail, too. On the other hand, if recovery is attempted and successful, the recovery manger 2255 can send an alert to the request manager 2253 indicating that the job was successful.

A response manager 2256 can manage the responses from servers 2260A-2260N and detect completion of the request and update a response queue with request completion status.

When jobs are split among servers, the response manager can declare a request as completed based on the status of completion of the jobs.

The enterprise resource config 2259 can hold details (e.g., server name, server IP address, credentials, capacity, concurrent threads supported, and the like) of the servers 2260A-2260N in the network. Thus, the enterprise resource config 2259 can store data regarding which servers are on the network which are available for execution, and within each of the servers, what is capacity that is available, how many threads are available, and the like. Such information can be used by the scheduler 2245 when making scheduling decisions.

The scheduler 2245 can act as an intermediary between the thread workflow manager and the enterprise resource config 2259. The scheduler 2245 can take the details from the enterprise resource config 2259 and allow the thread workflow manager to locate (e.g., assign) the job to available servers.

A status console 2290 can provide a user interface that serves as a dashboard for monitoring progress of the request 2220. Such a status console 2290 can indicate to an administrator which job failed, why it failed, at what time, who was logged in as the executing user. Such information can be logged in a database as well. The process monitor 2252 can provide such information for the status console 2290.

A thread execution provider can be provided by client applications in the form of a handler. In this way, any domain-specific issues related to execution can be addressed. Execution at the thread can be achieved by invoking the handler. The handler then addresses details related to execution (e.g., configuring an appropriate execution environment, and the like).

Example 49

Exemplary Servers

In any of the examples herein, a serve can be used to execute jobs. Such servers can typically execute a plurality of processes, and a plurality of threads can execute with a respective process.

The enterprise computing framework can monitor the threads on the servers. For example, the framework can determine how many threads are available, what is the capacity (e.g., available computing resources) of a particular thread, the workload of a particular thread. Based on such information, it is possible to determine which threads are heavily loaded, which are available for processing jobs, and the like. Assignment of jobs to threads can be based on such determinations. So, the workload at servers can be evaluated, and jobs can be assigned to respective servers according to the workload.

Example 50

Exemplary Configuration Information for Enterprise Computing Framework

The configuration information for the enterprise computing framework can control a wide variety of functionality to provide a rich set of domain-independent features. Request-level configuration information can be used to specify values to framework attributes at the request level. For example, queue settings can include the queue manager, the protocol for managing the queue, the network address of the queue host, a connection string for connecting to the queue host, and the like can be included.

Client side settings can include reference to a request object assembly, a request object class, a job object assembly, job object class, and the like.

Other framework settings can include the request type, a connection string for the framework, time out interval, maximum number of retries, a process monitor interval, whether alerts are enabled, an error file path, breakdown policy file path (e.g., where policy description information can be found), a user name, a thread workflow service URL, a mail service URL, mail recipients, a mail from address, and the like.

Example 51

Exemplary Policy Description Information

In any of the examples herein, policy description information can be used to guide request processing by the enterprise computing framework. Such information can include information for partitioning jobs into job bundles, configuration for such job bundles, configuration for individual jobs, and the like. Rather than coding such information into the enterprise automation framework, the framework can accept such information or references to objects that generate such information.

The enterprise automation framework can support a variety of sources for policy description information. For example, a policy description file, database entry, or assembly (e.g., a programming object that provides such information) can be provide the policy description information 2300. The format of the information can be an open format available for use by users executing jobs from any of a variety of domains. For example, an XML policy description schema can define the expected format and arrangement of the policy description information.

Such policy description information 2300 can be organized into one or more job bundles, with configuration information for jobs associated with a respective bundle.

Figure 23:
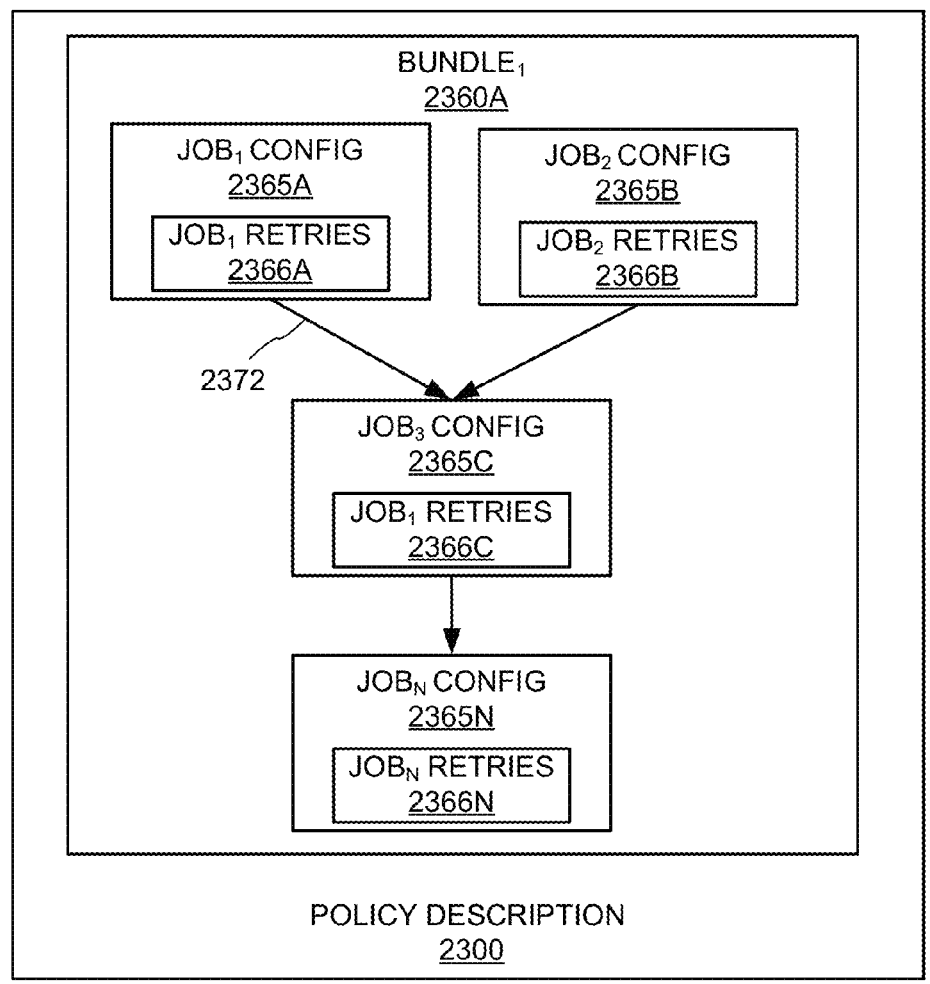
FIG. 23 is a block diagram of exemplary policy description information.

FIG. 23 is a block diagram of exemplary policy description information 2300. In the example, the description 2300 includes information for a job bundle 2360A having job configuration information 2365A-N for a plurality of respective jobs. Such configuration information can include the number of retries 2366A for respective of the jobs in the bundle. Other information can indicate whether jobs are dependent on one another, or can be executed in parallel. In the example, $job_1$ and $job_2$ have been defined in the bundle as executable in parallel. Such dependency information can be included by concurrency relationships 2372 (e.g., job dependencies) indicated in the configuration information that relate one job to another (e.g., in a directed graph).

The policy description information can indicate how to break down the request in a number of ways. For example, starting and ending points for respective jobs can be specified.

Policy description information can be generated in a variety of ways. For example, a user can edit such a job using a text or XML editor and specify appropriate tags. For example, if a first job covers records 1-1,000 and a second job covers records 1,001-2,000, the user can specify such starting and ending points, the number of retries, and the like. Such an approach is typically acceptable for a developer for requests that are not too complicated.

To facilitate entry of the policy description information, a policy description generation graphical user interface tool can be provided. Such a user interface can guide a user through the process of filling in policy description information. Internally, the tool can generate the appropriate configuration information (e.g., XML), fill in predecessor information, and the like based on what the user enters into the user interface.

Another option is to include a reference to an object or simply use programming objects to generate the policy description information. So, if there are a large number of jobs (e.g., 10,000) with detailed information, it may be cumbersome for a user to enter such information manually or even with assistance of a user interface tool. As described herein, assemblies can be so used to generate the policy description information.

Example 52

Exemplary Format for Policy Description Information

Although other formats can be supported, any of the attributes described herein as configuration information can be indicated by a related XML tag. For example, an XML tag can indicate the number of retries to be implemented for a particular job. A tag can specify how to process an job error (e.g., where to write job error information). Tags that can be supported are indicated below:

| Tag | Meaning |
| --- | --- |
| Job Header (e.g. Job1) | Can be used to enclose configuration information for the job identified |
| JobID | Identifier for a job. Can be used to identify the job in configuration information for other (e.g., dependent jobs) |
| JobName | A user-friendly name for the job. Can be used to identify the job in a console or dashboard |
| JobPredecessor | Indication of one or more jobs on which the present job depends |
| Timeout | A threshold period. If time elapses beyond the period after the job is started, it is considered to have timed out (e.g., a type of failure) |
| Jobprotocol | A network protocol (e.g., TCP) for the job |
| JobBreakHandlerPolicyClasses | Specifies plug-in logic for further breaking down jobs. Can include a method, class, assembly, or combination thereof. |
| JobErrorFileName | A location at which error information related to starting the job can be written. |

-continued

| Tag | Meaning |
|---|---|
| JobSuccessFileName | A location at which success information related to starting the job can be written |
| JobExecutionHandlerPolicyClasses | Specifies plug-in logic for handling specifics for execution of jobs. Can include a method, class, assembly, or combination thereof. |
| JobExecutionErrorFileName | A location at which error information related to executing the job can be written. |
| JobExecution SuccessFileName | A location at which success information related to executing the job can be written |
| JobNumberRetries | Specifies the number of retries to be done before job is considered to have failed. Retries can be specified on a per-job basis (e.g., one job can have a different number of retries than another job) |
| JobFork | Specifies branching for parallel processing of jobs |

Example 53

Exemplary Job Bundles

In any of the examples herein, a job bundle can comprise one or more jobs. A plurality of jobs in a bundle can be treated as a single unit for concurrency purposes. For example, a first bundle can comprise a first set of jobs, and a second bundle can comprise a second set of jobs. The second job bundle can be designated as dependent on the first job bundle. Responsive to detecting such a designation, the second bundle (e.g., execution of jobs in the second bundle are deferred) can be deferred until completion of the first bundle (e.g., execution of jobs in the first bundle is completed).

Likewise, job bundles can be designated as independent. Responsive to detecting such a designation, the bundles can be executed in parallel (e.g., jobs in the bundles can run at the same time, and jobs in one need not be completed before starting jobs in the other).

Jobs within bundles can be likewise designated as dependent on or independent from one another. For example, a fork designation (e.g., XML tag) can indicate parallel processing. Thus, a rich set of concurrency management can be implemented.

Example 54

Exemplary Job Concurrency Relationships

Concurrency relationships between jobs can be indicated in the policy description in a variety of ways. For example, a directed graph can indicate the next job (or job bundle) that is to be executed after a job (or job bundle) completes.

The configuration information for a job can indicate an identifier of a predecessor job (e.g., an other job on which the job depends). Execution of the job can be deferred until execution of the other job completes successfully. Multiple predecessors can be used for multiple dependencies.

Execution of the jobs (e.g., sending them to servers) can respect job concurrency relationships specified in the policy description information.

Example 55

Exemplary Processing of Policy Description Information During Job Processing

Figure 24:
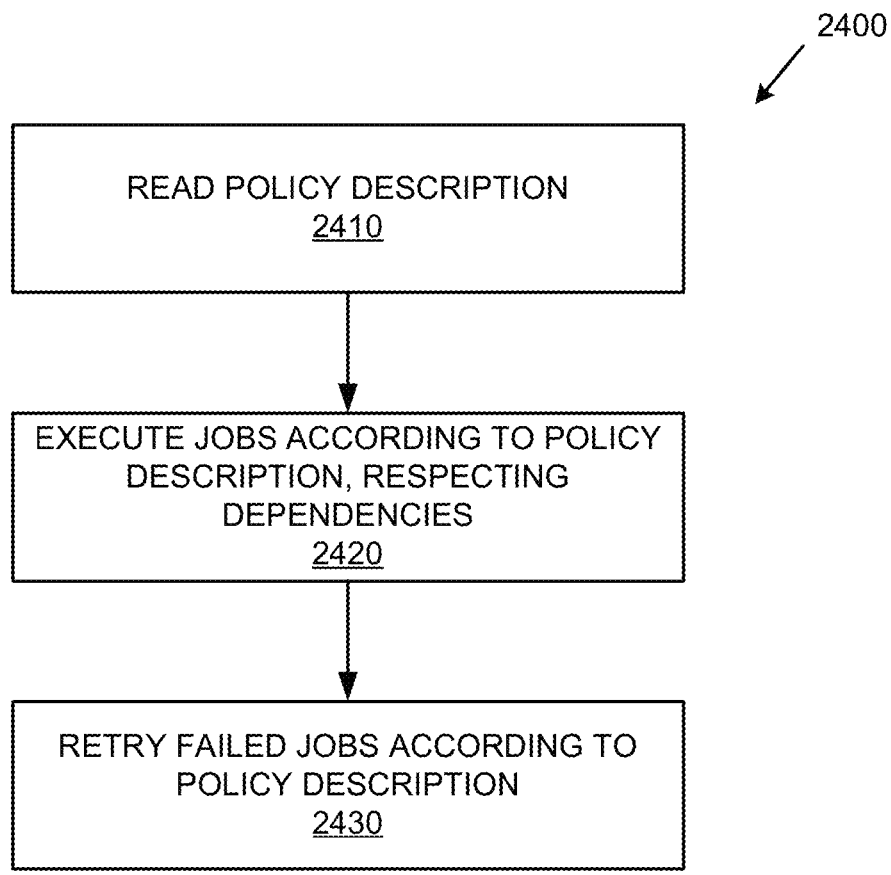
FIG. 24 is a flowchart of an exemplary method of processing policy description information during job processing.

FIG. 24 is a flowchart of an exemplary method 2400 of processing policy description information during job processing.

At 2410, policy description information is read. As described herein, the policy description information can be stored in a file, a database, be output by a programming object, or the like.

At 2420, jobs are executed according to the policy description information. During execution, dependencies are between jobs are respected. For example, if a dependent job is designated as dependent on an other job, execution of the dependent job is deferred until successful completion of the other job.

At 2430, failed jobs are retried according to the policy description information. For example, responsive to determining that retries remain according to per-job retry information designed for a particular job, the job is retried (e.g., a message is sent to the server to retry, the job is sent to another server, or the like). If no retries remain (e.g., the number of retries is beyond the per-job retry threshold specified for the particular job), the job is designated as failed.

Example 56

Exemplary Object References in Policy Description Information

Figure 25:
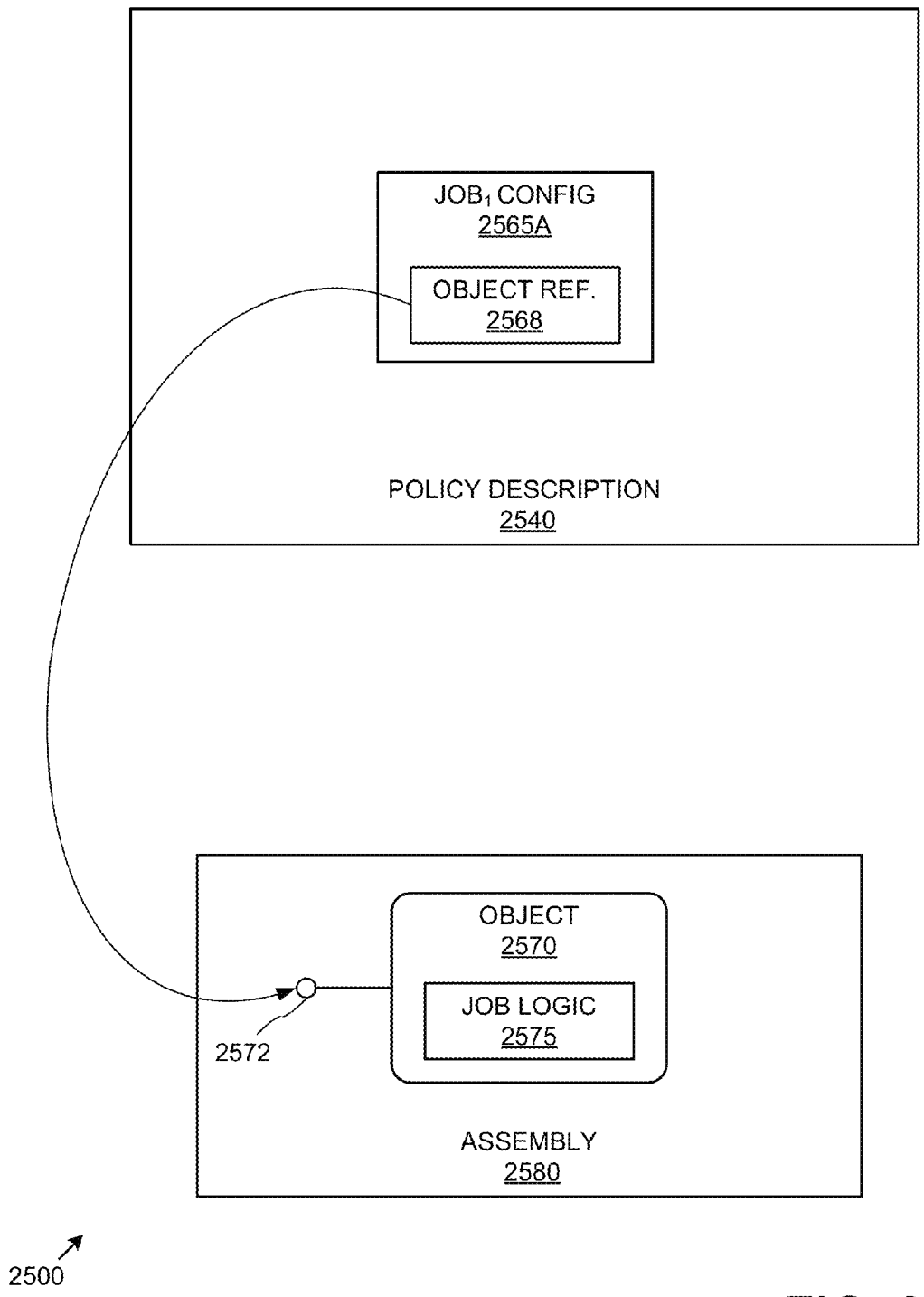
FIG. 25 is a block diagram of an exemplary system supporting object references in policy description information.

FIG. 25 is a block diagram of an exemplary system 2500 supporting object references in policy description information. Such a system can be implemented in any of the examples herein using policy description information.

In the example, the policy description information 2540 includes configuration information 2565A for a particular job, and the configuration information 2565A includes a reference 2568 to a programming object 2570

Such a programming object 2570 can be includes as part of an assembly that has programming class definitions for the object 2570 and associated objects (e.g., objects for handling other aspects of job processing in the framework for a same request).

In practice, access to the object 2570 can be accomplished via the interface 2572. For example, a class can be defined that specifies a plurality of method calls and attributes of the interface 2572. The interface 2572 can be defined to have sufficient functionality so that the framework can interact with any object supporting it and accomplish communication with the object to obtain sufficient information to process a wide variety of jobs.

The programming object 2570 can output policy description information according to job logic 2575 contained within the object 2570 (e.g., defined by the object class of the programming object 2570). The policy description information can supplement that contained in the policy description information 2540 and be processed in the same manner (e.g., to specify configuration information for jobs, and the like).

Associated objects of the assembly 2570 can cooperate to accomplish outputting policy description information for a particular job. The assembly 2580 can share object classes with assemblies for other jobs, thereby facilitating reuse in the framework.

Such an arrangement can be of particular benefit to large-scale operations that include thousands of jobs that have interrelationships that can be specified according to logic (e.g., loops, conditional statements, and the like), rather than being specified manually or according to a user interface.

The policy description 2540 can also specify file names in place of object references 2568 to accomplish similar functionality. Such files can be generated by programming objects or any other arbitrary mechanism.

References to other objects in the policy description 2540 can be supported, such as references to various handlers (e.g., execution handler, exception handler, break handler). Such an arrangement can further support customization of the framework to handle a wide variety of jobs execution scenarios with rich support for exceptions, breaks, and the like.

Example 57

Exemplary Processing of Object References in Policy Description Information

Figure 26:
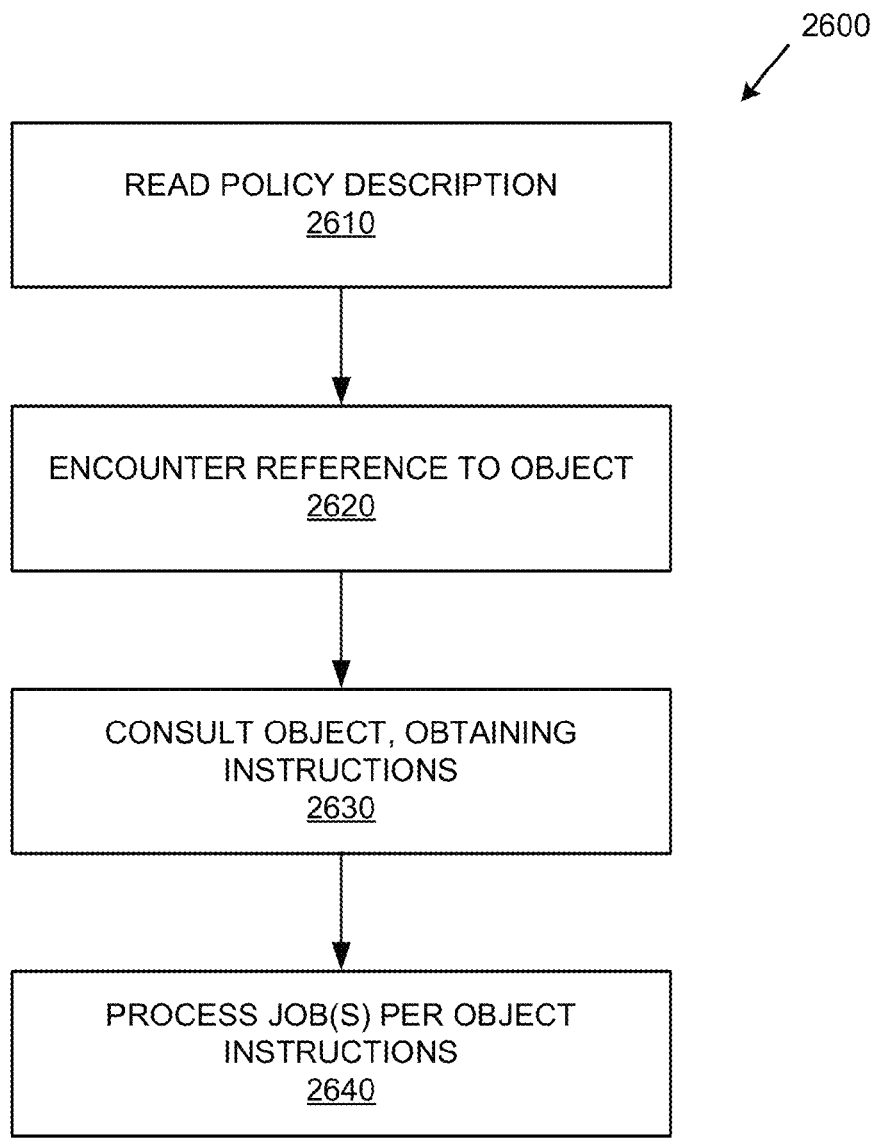
FIG. 26 is a flowchart of an exemplary method of processing object references in policy description information during job processing.

FIG. 26 is a flowchart of an exemplary method 2600 of processing object references in policy description information during job processing and can be used, for example, in the system shown in FIG. 25.

At 2610, policy description information for a request is read. As described herein, such information can come from a variety of sources.

At 2620, a reference to an object is encountered in the policy description information. Such a reference can be to a class name, a class definition, an assembly, or the like.

At 2630, responsive to encountering the object reference, the object is consulted, such consulting can include obtaining instructions from the object. A standard programming interface can be constructed by which the framework can interact with objects to exchange information regarding jobs.

At 2640, the jobs associated with the request are processed per the instructions from the object.

In place of obtaining instructions, a handler can be defined to include action for taking actions in light of certain events (e.g., exceptions, failure, success, and the like).

The object can include logic for generating policy description information. For example, if a request is to be broken down into jobs, logic in the object can indicate a starting point and then execute loops or conditional statements to generate the appropriate configuration information (e.g., break up the request at every n jobs or the like).

In practice, reference implementations can be provided as part of the framework that include assemblies including logic for breaking down requests. In this way, a developer can re-use such reference implementations by selecting them from a menu and/or customizing them to meet specific requirements.

Example 58

Exemplary Assemblies

In any of the examples herein, an assembly can take the form of a definition of programming object classes and can be of a format compatible with the platform on which the framework executes (e.g., a DLL, package, or other form).

The programming objects can include a standardize set of methods according to the framework by which configuration information can be retrieved from the objects.

Example 59

Exemplary Relationship to the Cloud

In any of the examples herein, the enterprise computing framework can interact with cloud computing. The framework can be a cloud service provider, could service consumer, or a cloud service choreographer.

In a cloud service provider scenario, the enterprise computing framework can reside in (e.g., be hosted in) the cloud and accept requests into the cloud. For example, the enterprise automation framework can reside outside the cloud and requests can be submitted to the enterprise computing framework hosted in the cloud. So, for example, a user may wish to pay per usage of the enterprise computing framework in such an arrangement. In this way, the services provided are enterprise computing, including parallel computing, in the cloud.

In a cloud consumer scenario, data centers can be made available in the cloud. The enterprise computing framework (e.g., the thread workflow manager, schedule, etc.) can interact with the servers in the data center available in the cloud. The framework can discover the resources that are there and assign work to them, and get the work done.

Example 60

Exemplary Management Framework

Figure 27:
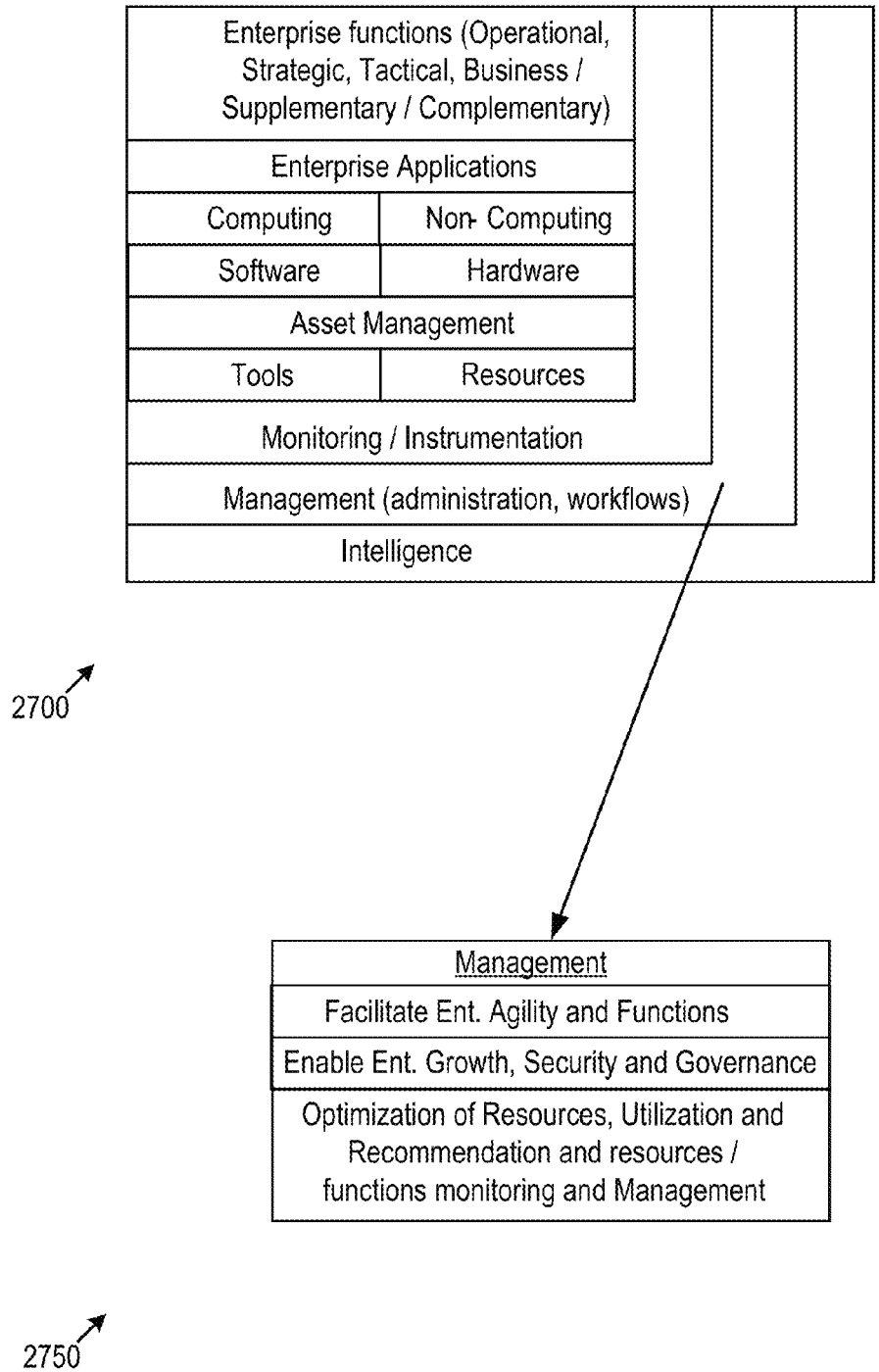
FIG. 27 is a block diagram of an exemplary enterprise management framework system.

FIG. 27 is a block diagram of an exemplary enterprise management framework ("EMF") system 2700. The framework can be used to manage, monitor, measure, capture, provide intelligence, or combinations thereof, as applied to any one or more of the frameworks described herein. The EMF can store configuration information a plurality of any of the frameworks.

The EMF can serve as an Enterprise Resource and Services Management Framework, an Enterprise Universal Administrative Management, Monitoring and Control Framework, or the like.

A single point of management of enterprise resources across a plurality of frameworks can be provided. For example, the framework can provide a services dashboard. Management can be across a plurality of computing tiers.

The framework can support a variety of Management protocols & standards of management (e.g., JMX and the like) via adapters. The framework can support business application and infrastructure services as well as resource administration and monitoring.

The framework can support both software and hardware management. On the software side, different application servers, LDAP servers, database servers, and the like can be supported. On the hardware side, routers, servers, hand held devices, and the like can be supported.

The framework can support wireless, distributed, or centralized management. The framework can support instrumentation of custom software for monitoring, metric, or other purposes.

The framework can support alerts, workflows, and the like.

The framework can be based on a plug-and-play scenario and be agent driven. It can support different levels of abstraction or hierarchies (e.g., enterprise, business unit, or the like).

Supported protocol can include JMX, WMI-WBEM, SNMP, SMS, and the like. Supported vendors can include WEDM (IBM), HP open view. Protocols can be wrapped to work in conjunction with a general solution.

The hardware management can include Computing and Non-Computing Assets. Enterprise Management intelligence ("EMI") can be supported. In the drawing, "Ent" stands for "enterprise." EIP=Enterprise Integration Portal/Framework ("EIP") can be supported. An enterprise portal ("EP") can be supported.

Enterprise management activities can include, control, monitoring status, user administration and management, functionality administration and management, metrics/measurement, instrumentation, and the like.

Example 61

Exemplary Visualization Framework

Figure 28:
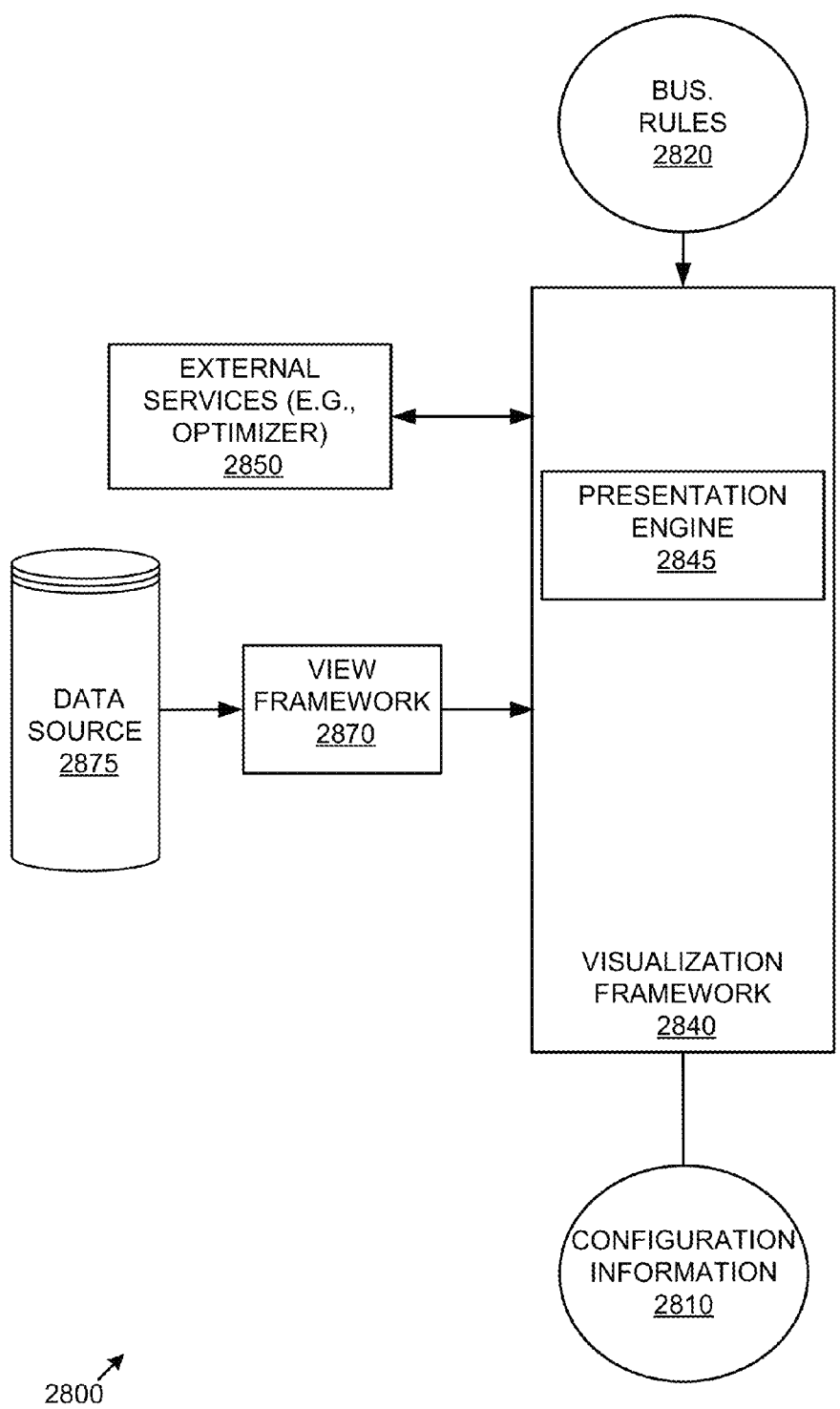
FIG. 28 is a block diagram of an exemplary visualization framework system.

FIG. 28 is a block diagram of an exemplary visualization framework system 2800 and can be used in any of the examples herein. In the example, the visualization framework 2840 has access to configuration information 2810 and accesses a data source 2875 via a view framework 2870 (e.g., any of the view frameworks described herein, and associated viewing applications). The visualization framework 2840 can also take advantage of external services 2850 if desired. In addition the visualization framework 2840 has access to business rules 2820. Although shown separately, the business rules 2820 can be included in the data source 2875 if appropriate. The business rules can store different rules for different represented entities in the visualization framework.

The visualization framework 2840 can include a presentation engine 2845, which can enforce the business rules 2820 during presentation of document views via the view framework 2870.

The visualization framework 2840 can take advantage of external services 28 50 (e.g., optimizers and the like). For example, in a spatial context, an external service can perform what-if scenarios to determine optimal placement of items in a defined space.

Example 62

Exemplary Hierarchical Visualization Framework

In any of the examples herein, the visualization framework 2840 can take the form of a hierarchical visualization framework ("HVF"), where the framework 2840 is adapted to process entities having hierarchical relationships between them. A variety of hierarchical patterns can be supported. The hierarchical visualization framework can support user interface manipulation of hierarchically-arranged entities.

Hierarchical relationships can be stored within a document, and the hierarchical relationships can then be output to a view provider for presentation by the view provider. The view provider can also be used to create, load, edit, or delete such relationships between presented entities.

Examples of hierarchical relationships include organizational charts, user profiles, and the like. For example, the framework can be used to build an office application that represents the professional hierarchy. For example, at the top is a CEO representation, and then under that one or more respective vice president representations, and then under that, one or more respective associate vice president representations, and under that, one or more respective group project manager representations, and then under that, one or more respective project manager representations, and so on. The visualization framework can visualize and display such relationships, supporting creation, reading, editing, and deletion of the representations as an entity (e.g., a document). If desired, components of the hierarchy can be stored as compound entities comprising a plurality of other entities at lower levels in the hierarchy.

The hierarchical visualization framework can avail itself of (e.g., sit on top of) the functionality of the extensible view architecture.

Example 63

Exemplary Space Visualization Framework

A more specialized case of a hierarchical visualization framework is a space visualization framework, where spatial hierarchies are represented. Spatial hierarchical visualization can be implemented. For example, representations of physical space can be organized by representations of space containing smaller representations of space.

Such examples can include a retail context, such as a hierarchy that is organized, by store clusters which contain one or more stores, which contain one or more floor plans, which contain one or more departments, which contain one or more categories, which contain one or more planograms (e.g., representations of store fixtures).

Example 64

Exemplary Method of Fulfilling a Request to Display a Document

Figure 29:
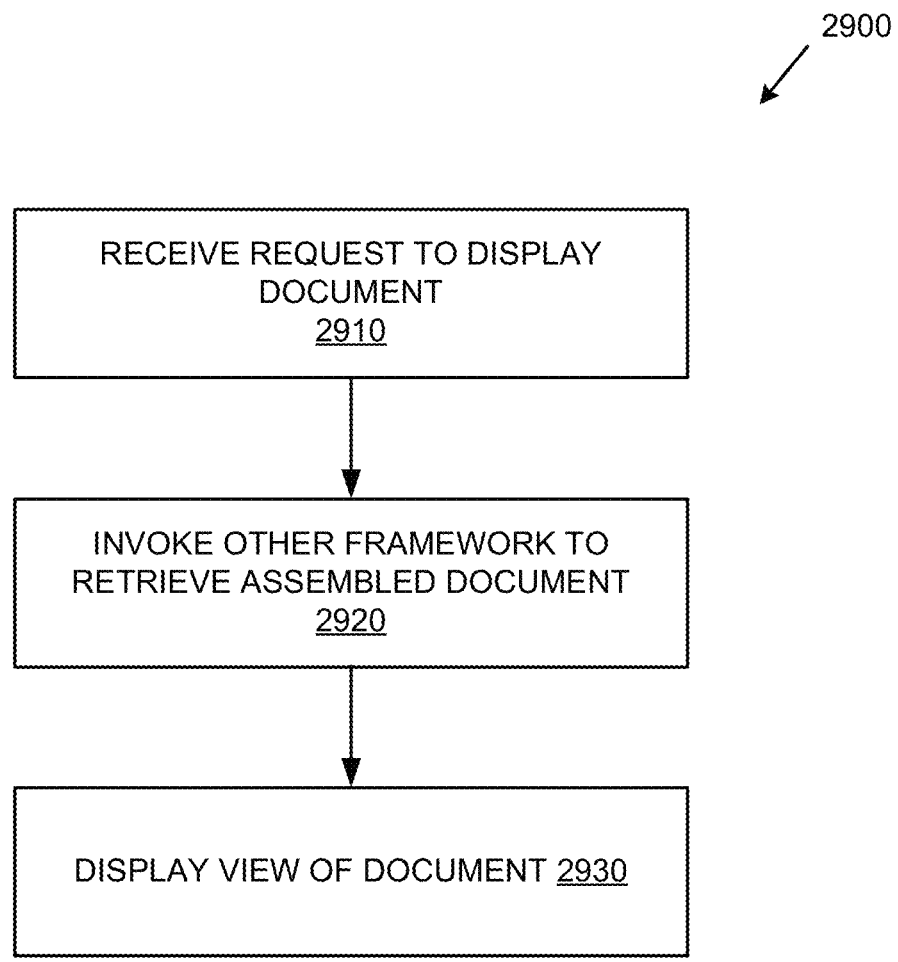
FIG. 29 is a flowchart of an exemplary method of fulfilling a request to display a document.

FIG. 29 is a flowchart of an exemplary method 2900 of fulfilling a request to display a document and can be implemented, for example, in a system such as that shown in FIG. 28.

At 2910, a request to display a document (e.g., according to a view) is received.

At 2920, another framework is invoked to retrieve the assembled document.

At 2930, the document view of the document is displayed via the visual framework.

As described herein, external services can be available during presentation.

During presentation, validation against business rules can be enforced. So, for example, if a user drags an item to an impermissible location or attempts to delete an essential item, a rule can prevent the action or require approval (e.g., of a manager).

Example 65

Exemplary Document Hierarchy

Figure 30:
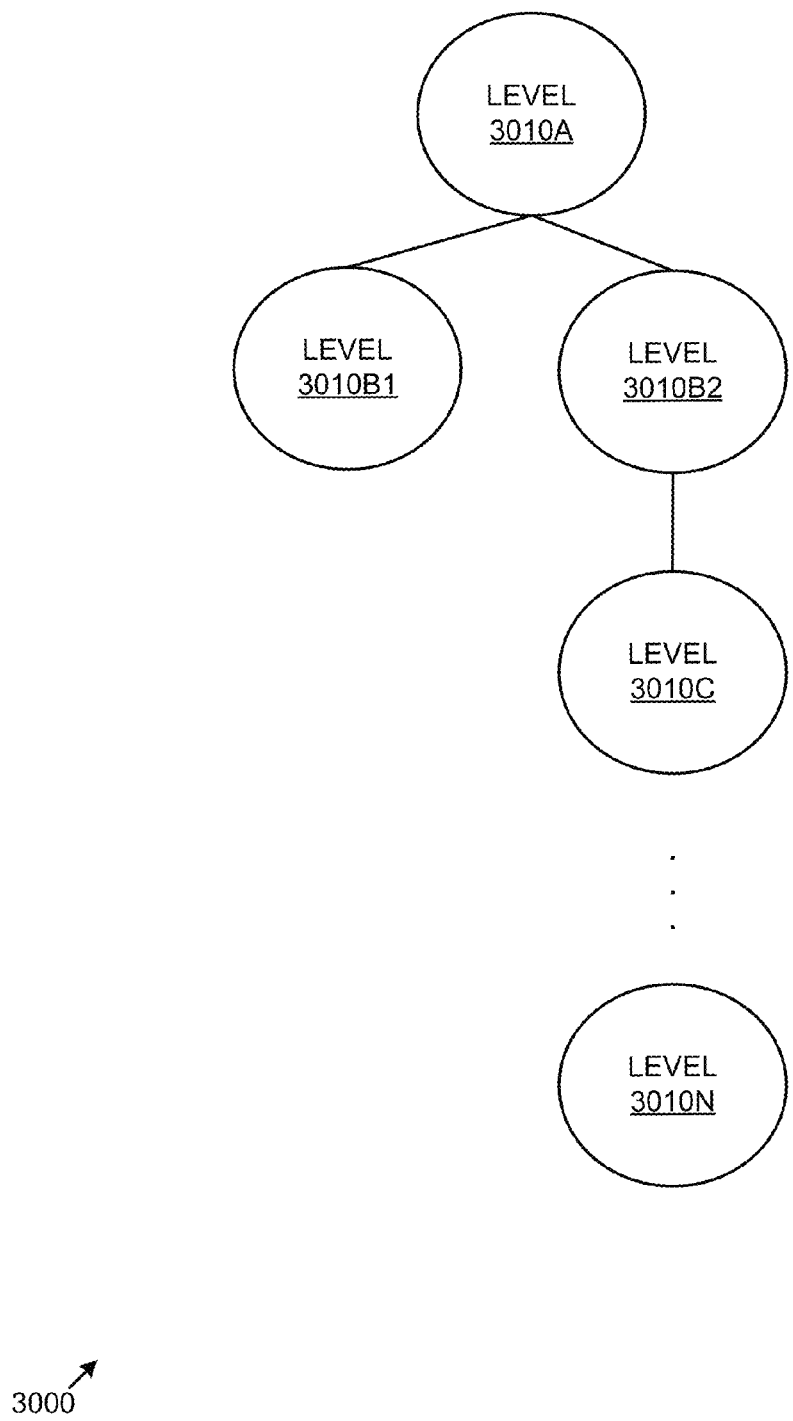
FIG. 30 is a block diagram of an exemplary document hierarchy.

FIG. 30 is a block diagram of an exemplary document hierarchy 3000 and can be used in any of the examples herein. In the example, there are a plurality of entities 3010A-3010N.

As shown, a top 3010A of the hierarchy can represent a highest level in the hierarchy (e.g., a CEO, store cluster, root object, master use case, or the like). Any entity can have one or more other respective entities underneath it in the hierarchy.

Relationships between entities in the hierarchy can be maintained by the visualization framework without adding additional code. If special functions are required, the visualization framework can be extended as needed. Reference implementations can be included with the framework for other business domain contexts as described herein.

Spatial hierarchies can be supported. For example, in the retail domain, a reference implementation can support store clusters, stores, etc. An implementation for a spatial hierarchy can apply to multiple business domains and become more specific for the particular business domain.

Example 66

Exemplary Business Rules

In any of the examples herein, business rules can support a rich set of functionality, including workflows. For example, approval of changes in documents can be escalated to managers for online approval, or the like.

Example 67

Exemplary Document Types

In any of the example herein, a document can be of one of a plurality of document types. Features can be provided for the document (e.g., in its logical document form) by any of the configurable frameworks described herein according to configuration information stored as associated with the document type.

Features can be specified by setting attributes to respective values (e.g., to indicate whether a document is a compound document, encryption features, and the like) as described herein.

Document types can be defined to accommodate both generic and domain-specific processing. For example, various type attributes can be associated with the type. A type attribute can indicate whether the document is physical or logical. A type attribute can indicate the domain/subdomain based document type (e.g., retail, space planning, macro floor flan, etc.) A type attribute can indicate a domain/subdomain type. A type attribute can indicate whether the document is internal or external. A type attribute can indicate whether the document is encoded or decoded. A type attribute can indicate whether the document is encrypted or non-encrypted. Similar types can be applied to any entities, not just documents.

More type attributes can be added to define a document type. A schema can contain the various type attributes so that they are configurable and mutable. For example, perhaps only the first two type attributes listed above are used when defining a document type in a particular document. Remaining ones can become part of the document meta data class or document information object.

The system can also support document templates (e.g., a partially filled document type with instance and correlated to a particular type of preferred view for the document type).

Example 68

Exemplary Document User Interface

Figure 31:
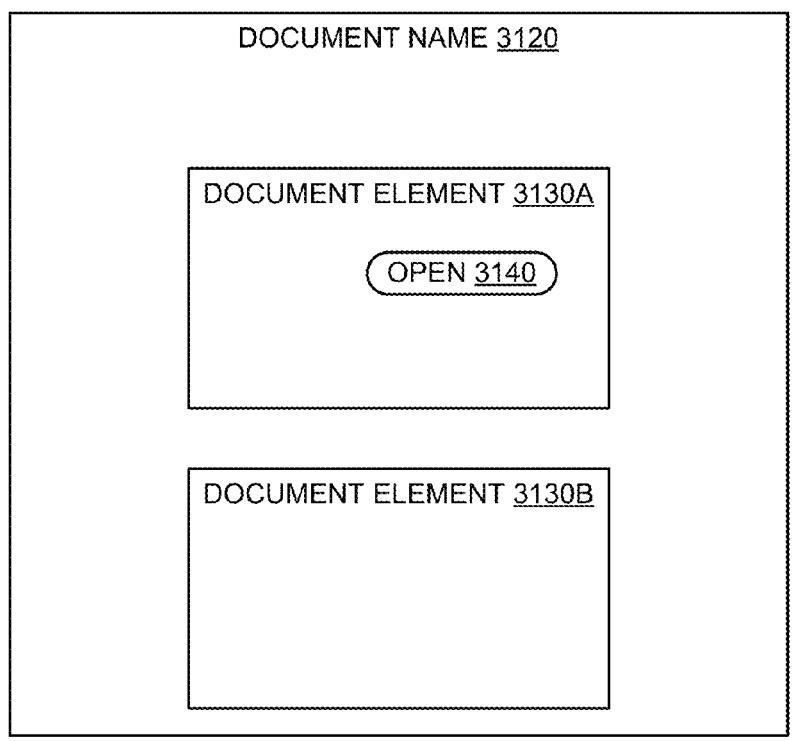
FIG. 31 is a screen shot of an exemplary user interface for displaying a document in a document hierarchy.

FIG. 31 is a screen shot of an exemplary user interface 3100 and can be used in any of the examples herein.

The example is suitable for editing hierarchically arranged document elements in a spatial context. A document name 3120 specifies a name of the document that contains a plurality of document elements 3130A-B. Elements within the document are depicted as spatially within the document.

To further proceed along the hierarchy, the interface can accept activation of a document element (e.g., via the open user interface element 3140). Responsive to detecting activation, the document element 3130A can be opened. The document element 3130A itself may contain further sub-elements which can be depicted as spatially within the element.

Example 69

Exemplary Method of Navigating to Different Level

Figure 32:
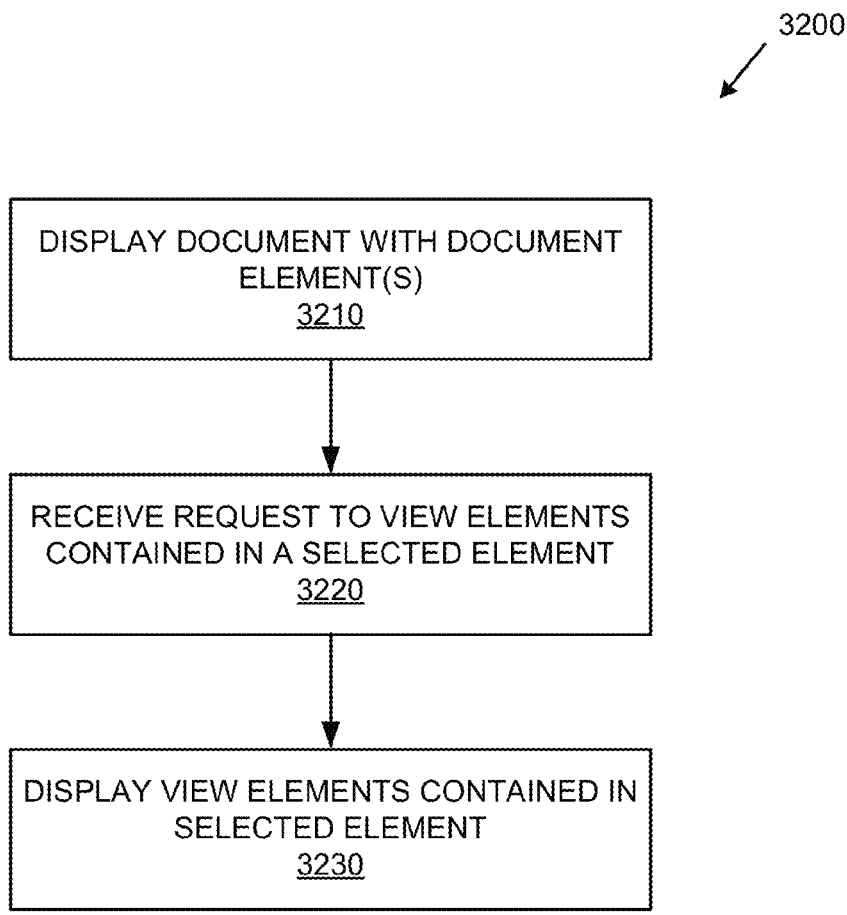
FIG. 32 is a flowchart of an exemplary method of navigating to a different level in a document hierarchy while a document in the hierarchy is being displayed.

FIG. 32 is a flowchart of an exemplary method 3200 of navigating to a different level in a document hierarchy while a document in the hierarchy is being displayed and can be implemented, for example, to display a user interface such as that shown in FIG. 31.

At 3210, the document is displayed with its document elements.

At 3220, a request to view elements contained in a selected element is received. Selection can be received via a user interface element, right-click, etc.

At 3230, responsive to the request, the view elements contained in the selected element are displayed.

Navigation in the other direction of the hierarchy can be achieved by a user interface element, right-clicking, etc.

In a spatial context, the hierarchy can represent finer level of spatial detail. For example, in a retail contact, levels of the hierarchy can be store cluster, store, floor, and fixture. Accordingly, the user interface can be used to pull up a planogram representing a particular fixture in floor plan of a store.

Example 70

Exemplary Domain-Independent Frameworks

Any of the frameworks herein can be implemented as business-domain-independent frameworks (or simply "domain-independent" frameworks) that are independent of any business domain. Such a framework can be adapted to a particular business domain via configuration, reference to custom business-domain-particular code, and the like. The framework can include functions and associated features that are useful across a wide variety of business domains.

Domain independence exhibits itself in that the framework can accept the business rules from a plurality of business domains and provide an application particular to a business domain.

Although the framework is business domain independent, the specifics in configuration information accepted by the framework can be particular to the business domain.

Because domain-specific configuration information can be shared among more than one framework, efficiency can be further realized by avoiding duplication of effort.

Example 71

Exemplary Programming Interfaces

In any of the examples herein, access to entities can be provided by providing a reference to a programming interface (e.g., a collection of callable methods that can be invoked to achieve functionality associated with a programming object representing the entity).

To facility domain independence, such programming interfaces can be defined as standard across domains.

Example 72

Exemplary Implementation of Combination of Frameworks

Figure 33:
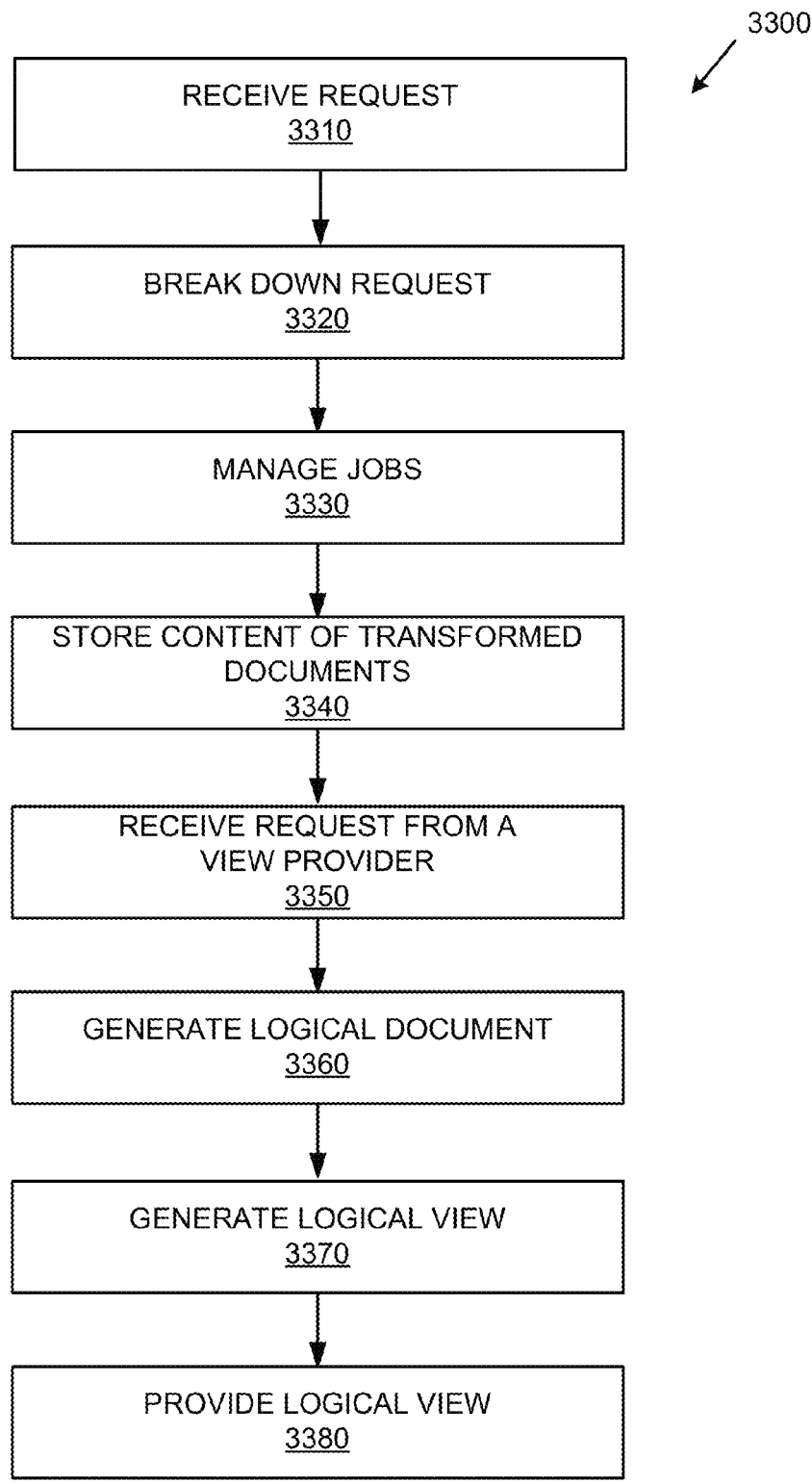
FIG. 33 is a flowchart of an exemplary method of processing documents using a plurality of the frameworks.

FIG. 33 is a flowchart of an exemplary method 3300 of processing documents using a plurality of the frameworks.

At 3310, a request is received to generate a plurality of transformed documents according to business rules associated with a plurality of respective business locations (e.g., retail stores).

At 3320, the request is broken down into a plurality of jobs according to a policy description. The jobs can accomplish transformation of the transformed documents.

At 3330, the plurality of jobs are managed for failure recovery and job dependencies.

At 3340, content of the transformed documents are stored in a data source as one or more source documents.

At 3350, a request is received from a view provider for a view of a document out of the plurality of transformed documents.

At 3360, responsive to the request, a logical document representing the document is generated. The logical document can comprise a plurality of logical document elements drawn from the one or more source documents.

At 3370, responsive to the request, a logical view is generated, based on the logical document. The logical view comprises content from one or more of the logical document elements.

At 3380, the logical view is provided (e.g., a programming interface to the logical view is provided) to a view provider for presentation as a rendered view.

The view provider can then present the rendered view.

Processing of the logical view can be achieved via a programming object of an object class derived from a domain-independent entity object class. The object class serviced from the domain-independent entity object class can comprise domain-specific attributes or domain-specific callable methods.

Example 73

Exemplary Framework Extensibility Implementation: Compound Document

Referring to the description of FIG. 7, an example of an extension to the base entity class 710, is a compound document class. In any of the examples herein, a compound document can be a multiplicity of simple documents. The compound document class can simply represent multiple document IDs to indicate that more than one simple document is contained in the compound document.

Example 74

Exemplary Implementation of Frameworks

Figure 34:
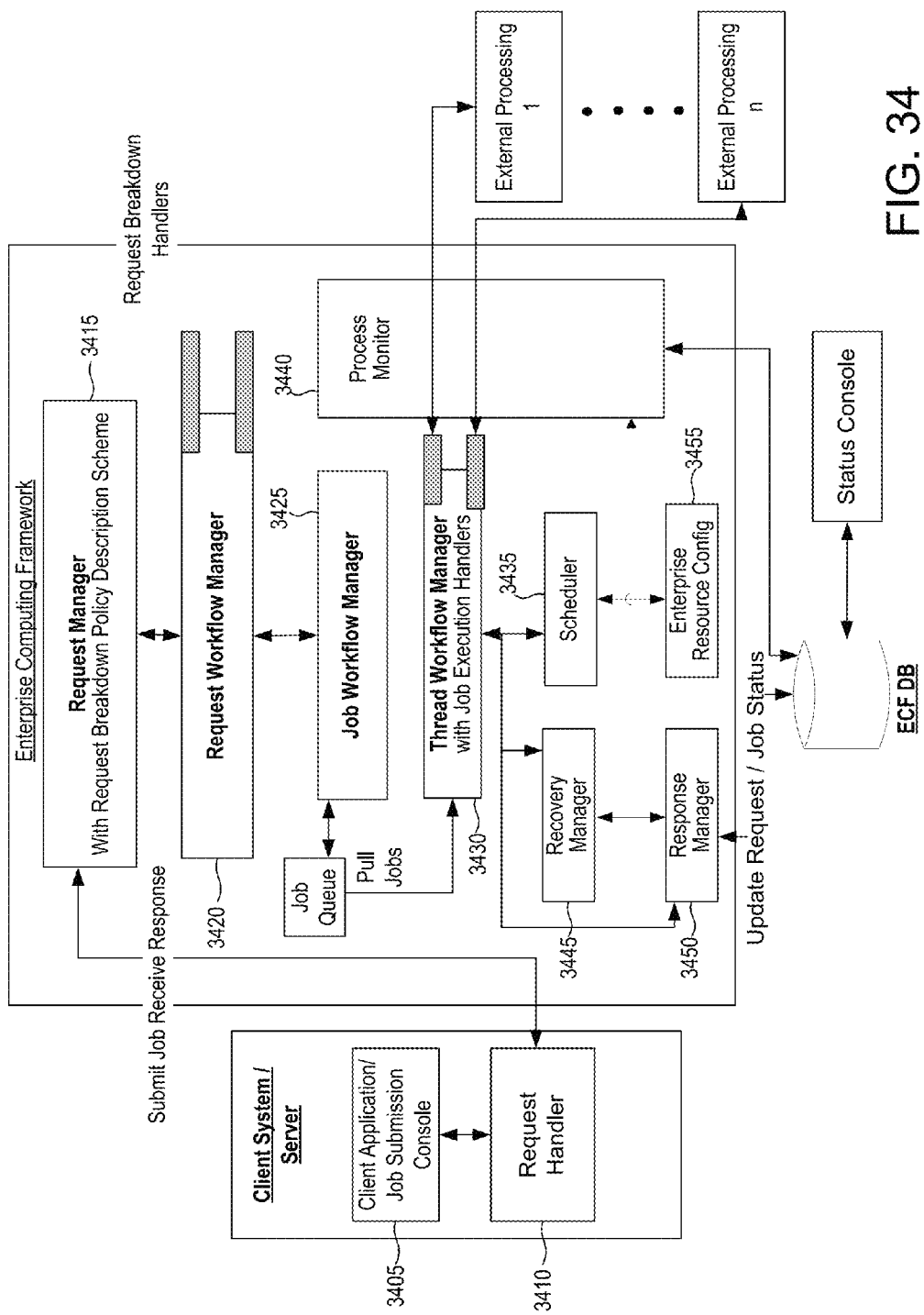
FIG. 34 is a block diagram of an exemplary implementation of an enterprise computing framework system.

FIG. 34 is a block diagram of an exemplary implementation of an enterprise computing framework system 3400.

A job submission console 3405 can accept user input specifying configuration of the attributes/properties of a request. The user can also define jobs and create a policy description sheet (e.g., according to the policy description information techniques described herein). The console 3405 can also accept a request for further break-down and execution.

A client request handler 3410 can accept a request from a client and perform validity checks on the request (e.g., whether the source is valid, where the policy file exists, etc.). The handler 3410 can also write the request to a request queue, enabling asynchronous processing. The handler 3410 can then acknowledge the request back to the client. An alert can be sent corresponding to the request (e.g., based on configuration). The client request handler 3410 can load a message into the queue based on a message policy file.

A request manager 3415 can pick up the request to be split into jobs from the request queue. The manager 3415 can read and parse the request breakdown policy information from a policy file. The request manager 3415 determines how to break down the request into multiple jobs according to the policy as delineated in the policy file.

A request workflow manager 3420 generates a request ID. The request workflow manager can then invoke corresponding handlers to break down the request into jobs based on the policy. As described herein, the policy can also take the form of executable code (e.g., assemblies).

The job workflow manager 3425 generates a job ID. It then serializes and stores jobs in a database or queue as specified by configuration information. The split jobs and corresponding information are saved to the centralized database and request queue (e.g., per user configuration).

The corresponding messages for the split jobs are created in the job queue, enabling the corresponding job workflow manager to pick up and hand over the jobs to the corresponding execution handlers. Request and job data is available in the database for the job processor to process.

The thread workflow manager 3430 picks up the job from the job queue based on priority. It validates the split jobs before signing to the scheduler 3435. The thread workflow manager 3430 also determines the path of the request (e.g., Job Queue→prioritize→schedule→process→bookkeeping→recovery manager→response manager). The thread workflow manager 3430 invokes the scheduler 3435 which in turn invokes the enterprise resource config/Load balancer to get the details of available systems in the grid.

The manager 3430 invokes the scheduler 3435 to prioritize, schedule, and allocate a server and/or resources for the execution of the jobs. The thread workflow manager 3430 invokes the corresponding job handler based on the request type (e.g., which will in turn invoke the intended application-application details are present in the request breakdown policy file) to execute the job. The thread workflow manager 3430 can provide a default handler hook so that any handler can be hooked on to process the job.

Jobs are intended to be executed by respective handlers. Based on completion of each chunk of jobs, a respective handler will pick up the next set of jobs from the job queue and hand over for execution to the respective application.

The manager 3430 retrieves the status from the executing application and updates the status in real-time to the response manager, which in turn updates the database.

The completed job data and status is updated in real time in the database. Therefore, status can be tracked and displayed in a dashboard as desired (e.g., in real-time).

The manager 3430 invokes the recovery manager (e.g., both request-level recovery and job-level recovery) to recover any failed requests and/or jobs in real-time.

The manager 3430 invokes the response manager to provide response back to the client and submit the request and also to update the status in real-time to the database.

The scheduler 3435 handles job scheduling. Job prioritization for execution is based on information in the policy description sheet. Jobs can be scheduled in sequence or parallel based on information in the policy.

The scheduler 3435 can calculate current workload in terms of job threads being executed at respective server resources. The workload determination can be used to decide whether new job processing threads should be spawned by the scheduler 3435 or the existing ones can be used.

Workload calculation can be determined in any number of ways. The scheduler 3435 can get the following details from the enterprise resource config: a list indicating availability of servers, and if the server is available, relevant details (e.g., address, credentials, etc.); resources and service definition; capacity of the server, capacity availability and the server; how many threads are currently being used on the server; the maximum number of threads to be created in respective servers is available in in message policy configuration file.

Therefore based on the capacity and how many threads are currently being used, the number of threads to be newly spawned on a server to achieve execution can be determined.

The scheduler 3435 can determine the maximum number of threads to be created in each server. It can also decide the number of worker threads recreated. There can be one worker thread instance per job. The server can then be allocated. If the designated resource is not available for processing, then the scheduler 3435 can assign to the next available server.

If no servers are available for processing, the scheduler 3435 can simply wait until one is available.

Base on configuration, if there is a dependency involving a next set of jobs in the waiting jobs, then the waiting jobs are not sent for execution until the prerequisite job in the dependency is completed. Dependencies are thus respected.

A process monitor 3440 can be implemented as a Windows-based service. The monitor 3440 can continuously monitor the status of jobs and hand over failed jobs to the recovery manager for reprocessing (e.g., at both the request-level recovery and job-level recovery situations).

The monitor 3440 can monitor threads and confirm that they are completing successfully. If a thread does not complete successfully, retry functionality can be invoked based on configuration parameters. A number of retries can be specified in the policy description.

Failed requests/jobs can be handled by the recovery manager 3445. The recovery manager 3445 can try for a number of retries, based on the policy description. After the maximum number of retries is reached, the recovery manager 3445 can abandon the request/job and change its status in the database. If a request/job is an abandoned, then further dependent jobs (e.g., based on the policy description) can be abandoned.

A response manager 3450 can receive communications from the process monitor 3440 and the request workflow manager 3420 that indicate the request the status. The response manager 3450 monitors completion of jobs to detect completion of the request and updates the response queue with request completion status. The response manager 3450 can use the recovery manager 3445 to resubmit a request.

The response manager 3450 can declare that a request as completed based on the status of completion of the respective split up jobs.

The enterprise resource config 3455 can serve as controller for allocation of resources for execution. It can hold the details of the respective servers in the network (e.g., storing in a database). Therefore, the database will contain the server name, server IP, credentials, access/permissions, capacity, concurrent threads supported, etc. The config 3455 can poll the resources (e.g., servers) continuously, asynchronously to determine the status of respective nodes (e.g., servers) in real-time and update the database on the status of availability.

The config 3455 can also send alerts to contacts (e.g., email addresses, pagers, cell phones, etc.) As specified in the configuration file when servers go down. The config 3455 can also take appropriate action to restart a server as required. Services deployed on the servers can be registered with the config 3455 to achieve status monitoring.

Exception in error messages can include the following: an incomplete request is submitted, job details are invalid, a message queue or database is not ready, the job breakdown handler does not exist or is not available, the job execution handler does not exist or is not available, a job fails more than the number of times allowed by the policy description.

Example 75

Exemplary User Interface for Enterprise Computing Framework

FIG. 35 is a screen shot of an exemplary user interface for accepting a job request in an enterprise computing framework. The user interface can serve as a request submission console by which a user can submit a request to the framework for execution.

The interface accepts input indicating a request type, a connection string, a break down policy file, a user name, a thread workflow service URL, breakdown logic, process monitor interval, time out, maximum number of retries (for the request), and error file path setting for the framework.

An alert can be enabled via a checkbox. The user interface accepts input indicating a mail service URL, a mail server IP, mail recipients, and from address for the alert.

Storage settings can be accepted for input, including the storage type (message queue or data base). The message queue settings include the request queue name, job queue name, queue manager, channel name, protocol, and queue host.

Database settings include a connection string.

Handlers settings include a request assembly name, job assembly name, request class name, and job class name.

The request can be submitted via the interface via a user interface element. An existing (e.g., saved or currently executing) request can be selected.

Example 76

Exemplary Implementation of Frameworks in Retail Context

The frameworks can be applied with advantage to the retail context. A particular application of the frameworks described herein relates to merchandizing in the retail context. A space visualization approach can be used to determine product placement on fixtures of retail stores.

The task of determining how to place products on fixtures of a retail store is not a simple one. Due to the complexities of the modern retail environment, a large number of variables such as store size, store location, customer demographics, seasonal product rotation, product availability, vendor promotions, and store aesthetics can be involved. Therefore determining the placement of products on a single fixture can involve hours of planning and layers of management. However, in practice, it is not feasible to have merchandisers work on such product placement on a store by store basis when a retail chain has thousands of stores. Therefore, the quality of product placement can suffer, and the retail chain can lose sales.

The frameworks described herein can be applied to this problem by taking a space visualization framework approach that is supported by the other frameworks as described herein. For example, a fixture can be represented by a planogram. Such planograms can be represented in the frameworks as an entity (e.g., a planogram document). A document storing the planogram can be processed in the framework. The rich set of user interface interactions supported by the extensible view architecture framework can be used by merchandisers to design a standardized planogram. After the standardized planogram is created, read, an updated to be in the desired form, the enterprise automation framework can transform the planogram to destination planograms associated with respective stores. The business resources in such an implementation can be arranged hierarchically. For example, multiple planograms can represent respective fixtures that are organized into a floor plan. Multiple floor plans can represent respective floors that are organized into a store. And, multiple stores can be organized into a store cluster.

After the standardized planogram is transformed, it can be copied, via a customized version of the enterprise computing framework, to different respective locations for the respective different stores. Subsequently, an employee at a particular store can employ the space visualization framework as described herein to view the transform planogram. If desired, a workflow can be provided by which the transform planogram can be further added it as desired at the local store level. The workflow can provide for mandatory approval of the modifications by a manager or other authorized person. If the modifications are not approved, they are not implemented by the system.

Business rules can come into play in a variety of scenarios. For example, when the standardized planogram is being designed, the rules can be applied. Some rules can be specified as critical and cannot be overwritten. However, other rules can be specified as optional. Still other rules can be specified as capable of being overcome with manager approval.

When the standardized planogram is transformed, the business rules can also be applied. The business rules can specify such things as adjacency, height limitations, and the like. Accordingly transformation can result in optimized place then all the products on the fixture in light of the constraints of the particular local store.

For purposes of convenience, space can be divided into a macro level and a micro level. The macro level can represent a space plan such as a floor plan. The micro level space plan can be applied to represent a planogram. The planogram can be a view of products stacked onto fixtures (e.g., store racks).

Implementation of the planogram can take the form of actual workers at the store who are given the planogram in either hard copy or soft form. The workers then place the products on the shelves according to a planogram. In this way, the expertise of a merchandiser can be applied to a large number of stores, and the store will benefit accordingly.

During design of the standardized planogram, the visual view can provide a wide variety of features such as zooming, scaling saving as a template, saving as an instance, generating reports, doing a what-if analysis, etc.

For retailer, space is very important. There is a cost that is associated with each square foot of space. So the retailer wishes to use the space to the optimal extent. The space visualization framework can allow the retailer to optimize the space by applications of various rules. A rules engine can be integrated into the space visualization framework and allows the user to plug-in rules to pursue space visualization. Such rules can be also used to automate placement. For example a user can specify that a large number of what-if runs are to be applied over the visual view. Similarly what-if scenarios can be applied to floor plans.

Of course, in other domains, the What-if scenarios might not relate to placement of products on fixtures, but some other situation (e.g., placement of apartment buildings in a plot of land; allocation of bill denominations in an ATM machine; frequency of shipments; and the like).

Because the frameworks have been constructed to be domain-independent, a wide variety of functionality can be provided after the framework is customized for the retail domain. In many cases, a configuring user can simply select the features that are desired and feed in configuration files to achieve launch of a customized application. In some cases, code changes may be implemented as well. As described herein, wide variety of extensibility mechanisms are supported.

The space visualization architecture is built on top of the extensible view architecture. The extensible view architecture breaks down the logical entity in to documents and allows them to have n number of views. The space visualization framework can use any of a variety of view providers by taking advantage of the intelligence of the extensible view architecture, which implements the interaction between the user in the database.

For example, if a user drags and drops the particular product onto a particular planogram, it is the extensible view architecture that acts on it. It takes a request, retrieves whenever other information it requires from the backend (e.g., database or any other data source), and then feeds the planogram to the space visualization framework to display it, save it, and manage views.

If a user has a planogram being displayed in the space visualization framework, is possible to have any number of views of the planogram. Such views can be particularly useful for intelligence analysis of a large set of data.

For example a merchandise user may ask, "Show me all the products on the racks that are more than $x." Another view could be all the products on the racks that are between $x and $y. Another view could be all the products that have promotions associated with them. From a performance perspective, it may not be desirable to hit the database for each of these views. So the space visualization framework can rely on the extensible view architecture to handle accessing the database. The extensible view architecture can operate in an intelligent manner. Whenever the merchandiser is acting on a single planogram, the extensible view architecture can treat it as a single document, even though there may be many views for the document. Accordingly, the views can be provided without accessing the database for each of the views. In practice, if one user using an application is hitting the database many times, and there are thousands of concurrent users that might likewise be hitting the database, the application will become very slow for every view. However, the extensible view architecture intelligently manages the views to prevent unnecessary accesses to the database and can manage the relationship between the documents and the views. From the user perspective, the performance improvement is seamless. In fact, the user can request 10 times as many views and still not see performance degradation. The extensible view architecture can abstract the complexity so that the user need not be concerned with what is happening internally. It manages itself so that the performance is not hampered from a user perspective and it will be shown to the user very soon in an efficient manner.

Similarly, the smart proxy functionality as described herein can be applied to allow the architecture to be distributed. So, for example a huge application that has components sitting on different servers can be supported by the frameworks.

Example 77

Exemplary Implementation of Frameworks in Retail Context: Enterprise Automation Framework In the retail domain, the enterprise automation framework can automate processing of retail business documents (e.g., floor plans and planograms). Floor plan automation can replicate the prototypical store's subgroup allocation to multiple subject stores. Planogram automation can apply a prototypical store's fixture allocation to multiple subject stores.

Replication can be blind, where the prototypical store's business documents (e.g., entities under the framework) are replicated to multiple subject stores without application of any rules work and constraints. Or, replication can be intelligent where the prototypical store's business documents are replicated to multiple subject stores after application of any rules and constraints.

The entire process of manually replicating and applying a prototypical store's subgroup allocation to multiple subjects stores is highly time consuming, especially when the data is huge (e.g., for a large retail operation) and contains application of many rules and constraints. Therefore, the enterprise automation framework can reduce effort to a great extent in automating the process. The enterprise automation framework can work in conjunction with an enterprise computing framework, which can provide parallel and distributed computing and use available resources in an intelligent way. An extensible view architecture can also be used to load domain business entities such as the floor plan or planogram. A rules engine framework can also be used to assist in managing rules and ultimately providing them to the enterprise automation framework. Such rules are sometimes called a "proration grid."

The enterprise automation framework can invoke any of the other frameworks using handlers. Domain-specific handlers can also be used to replace or extend generic handlers.

In one scenario, the framework is used to copy a logical planogram (e.g., a business document depicting products displayed over shelves and/or racks) from one store to destination stores (e.g., as per user configuration). The copying can be performed blindly (e.g., without any transformation or applying any rules) or intelligently (e.g., by application of rules).

If rules are to be used a configuring user can provide the rules in a format acceptable to the framework. A template can be provided for use in conjunction with the framework. In addition, a reference implementation can provide exemplary rules that can be modified for use in the user's particular circumstance. The template can be of a format that is familiar to the user (e.g., a Microsoft® Excel® spreadsheet, or the like). For example, adjacency rules (e.g., defined by season, workplace, inventory, and the like) can be applied.

After a logical planogram is transformed and copied to the destination, it can be directly displayed with a space visualization tool as described herein. Because the frameworks enforce best computing practices (e.g., transactions), security of the data and data integrity can be supported.

Activities can be logged by the frameworks, enabling a user to view audit trails and error logs.

Thus, the enterprise automation framework can take one optimized planogram from a merchandiser and use it as a standard across multiple stores. The optimized planogram is essentially replicated across the stores. However, the planogram cannot be blindly copied from one place to another because fixtures might not be the same dimensions, for example. Or, the same demographic rules might not apply. For example in a store, the aisles, the bathrooms, the entire structure itself might be different. The enterprise automation framework can take the input of the standardized planogram and transform it according to rules. Rules can include both spatial and demographic rules. In a retail context such rules are called "business rules."

The framework allows the merchandiser to apply the business rules over the input, and it will propagate it to the destinations, which could involve multiple floors and multiple fixtures. The enterprise automation framework can work in conjunction with the space visualization framework in the extensible view architecture to save the date in the database as a logical document, which is deserialized and put into the database into various tables.

Although the source planogram appears to be a visualization, internally it is represented as logical document (e.g., data in database records). The rules can differ for different stores, but some rules can be the same for some stores.

Now that the data has been transformed, it can be placed into a database of the database servers of the associated store. A merchandiser at a store can open the same data using the space visualization framework and view it as it has been transformed. If it is acceptable, it can be left as he is. Changes can be made if desired.

Example 78

Exemplary Implementation of Frameworks in Retail Context: Enterprise Computing Framework The enterprise automation framework can work in conjunction with the enterprise computing framework. A retailer can have thousands of servers at different data centers. The logical planogram data can be sitting on a database server in the database centers. When the planograms change, depending on various rules and the products that are coming in from inventorying, and the like, the transformation of the optimized planogram to the destination locations needs to happen in a short period of time. Sometimes the process needs to finish in one night.

If the process were done sequentially, it would not be possible to finish it. Instead, parallel computing can be used as supported by the enterprise computing framework. The framework has the intelligence to see how many servers there are in the data centers in the network or in the cloud.

The enterprise computing framework can monitor the workload of the individual servers and figure out which ones are available for utilization. The enterprise computing framework can receive a request from the enterprise automation framework and break it down into jobs.

The breakdown can be based on user configuration and wore on the system intelligence itself. The availability and available capacity of the servers can be tracked in real-time. As described herein, job recovery can also be supported. A dashboard can show alerts, allowing a user to monitor the progress of the request in real-time.

The result is that in a short amount of time with fewer resources and fewer human resources, a job can be completed overnight. Accordingly, the next morning when the employees come in, the data is available to them. They can use the space visualization framework to open the planograms and provide them to the floor workers to stack the products.

Example 79

Exemplary Implementation of Frameworks in Retail Context: Design Rules

In the retail domain, the enterprise automation framework can automate processing of planograms and floor plans. An optimization engine can maximize usage of floor and shelf space to allow placement of a greater number of items within a store.

Design rules can be specified for designing the planogram and floor plan. For example, bulky items can be prohibited from being on top shelves.

Such rules can also be applied during the transformation process, such as when an optimized source planogram is transformed to multiple destination planograms for corresponding fixtures in other stores.

Rules enforcing adjacency (e.g., an item must be next to another) can also be enforced. Such rules can be helpful to accommodate promotions (e.g., buy a shampoo and get a toothpaste free). Any number of other rules appropriate for the retail context can be implemented.

In some cases, rules relating to demographics can be implemented so that certain items targeted to certain demographics (e.g., specialty drinks or candies appropriate for certain geographical regions or income levels). A store associated with certain demographics can then be assigned a rule set appropriate for the demographics. Subsequently, when items are placed throughout the store, placement will be done in light of the specified rule set.

Example 80

Exemplary Execution of Frameworks in Retail Context: Enterprise Automation Framework An exemplary execution of the frameworks as applied to the retail domain for planogram processing can replicate a standard planogram across multiple destinations (e.g., store clusters, stores, fixtures, or the like).

A user can specify the source logical planogram by way of a user interface. For example, a planogram may be developed by subject matter experts, who handle merchandising for the retailer. The combined effort to produce a standardized planogram may involve hours of labor. However, after the planogram a standardized, it can be replicated across any number of destinations. Because the enterprise automation framework supports rules, variations in the destinations (e.g., different store layouts) can be accommodated. Therefore, standardization can be achieved while preserving the ability to handle destinations that are not identical.

FIGS. 36, 37, 38, 39, and 40 are screen shots of exemplary user interfaces for providing information to an enterprise automation framework configured for a retail domain task. In the example, a source planogram is specified, and the planogram is propagated (e.g., intelligently copied) to a plurality of destinations. A similar user interface can be used in any of the examples herein to achieve a user interface for an enterprise automation framework.

Figure 36:
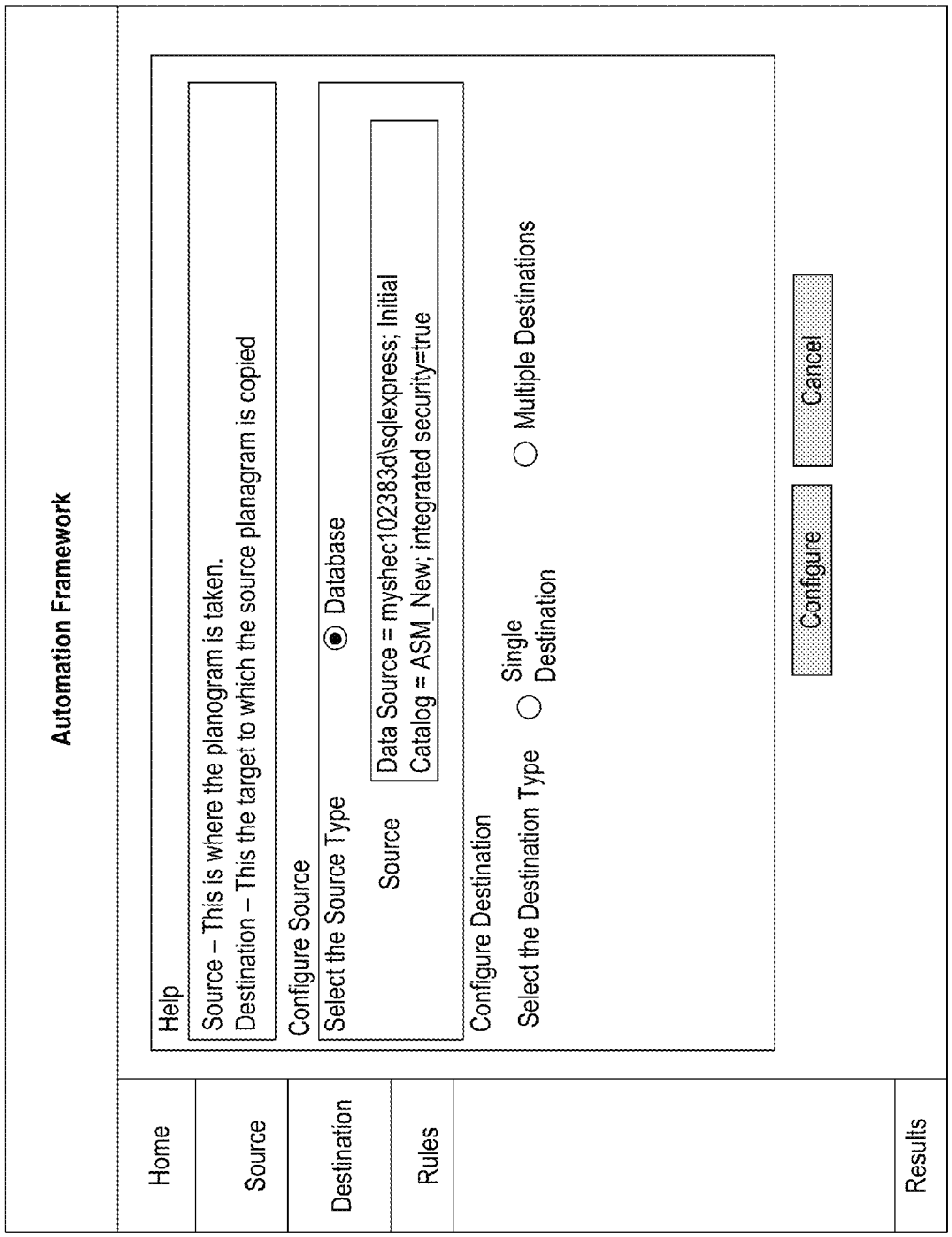

A user can interact with the user interface FIG. 36 by inputting an indication of the source business resource (e.g., a planogram). A source document can be provided in the form of a logical document (e.g., a template). The user interface allows a user to submit a request for processing to the enterprise automation framework, which employs the enterprise computing framework as needed.

Figure 37:
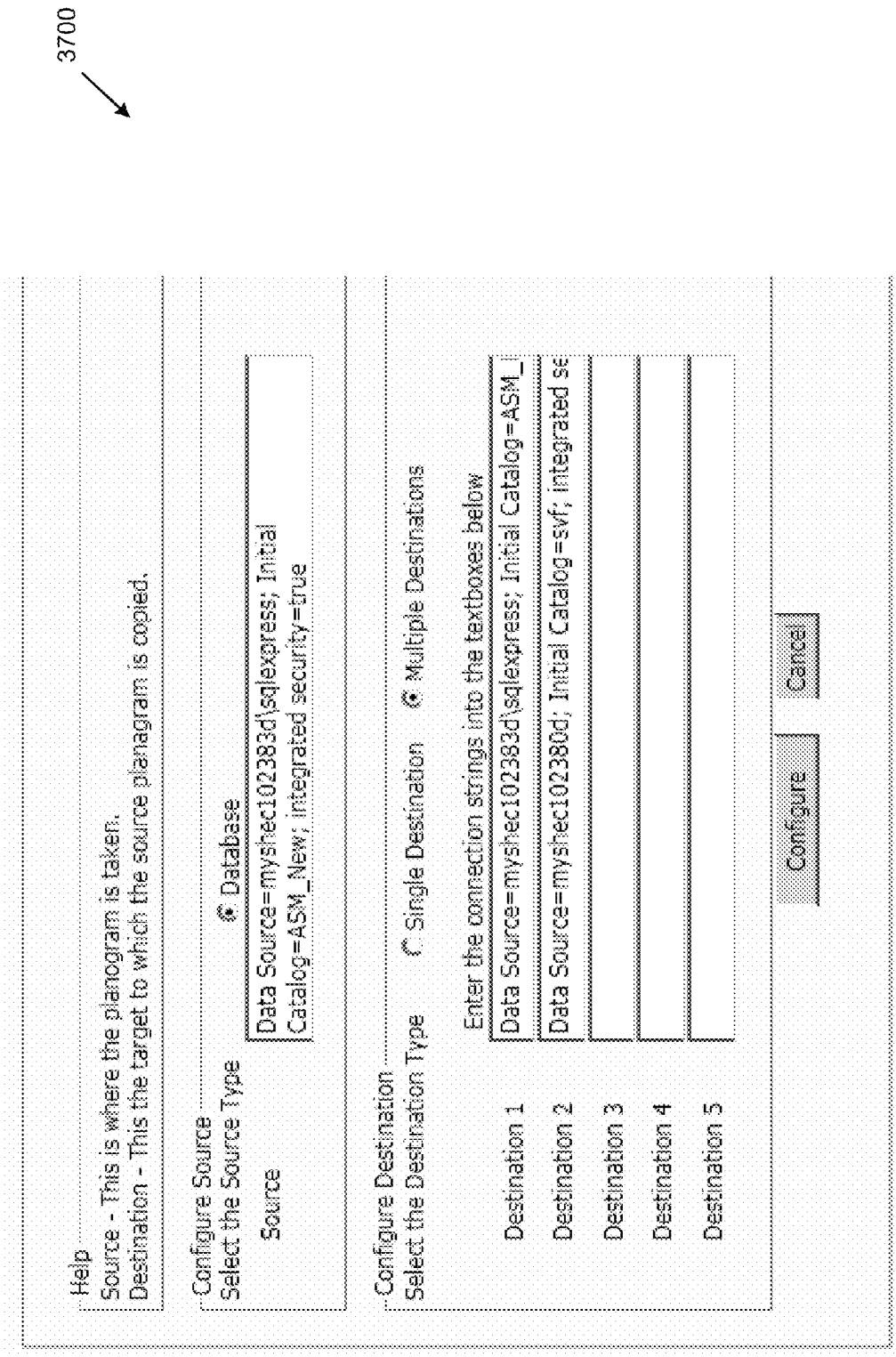

In addition to a source, the user can enter one or more destinations in a user interface 3700 of FIG. 37. The destinations can specify respective business resources. When the template document is transformed according to the rules, the transformed document can be stored as associated with the respective business resources.

Figure 38:
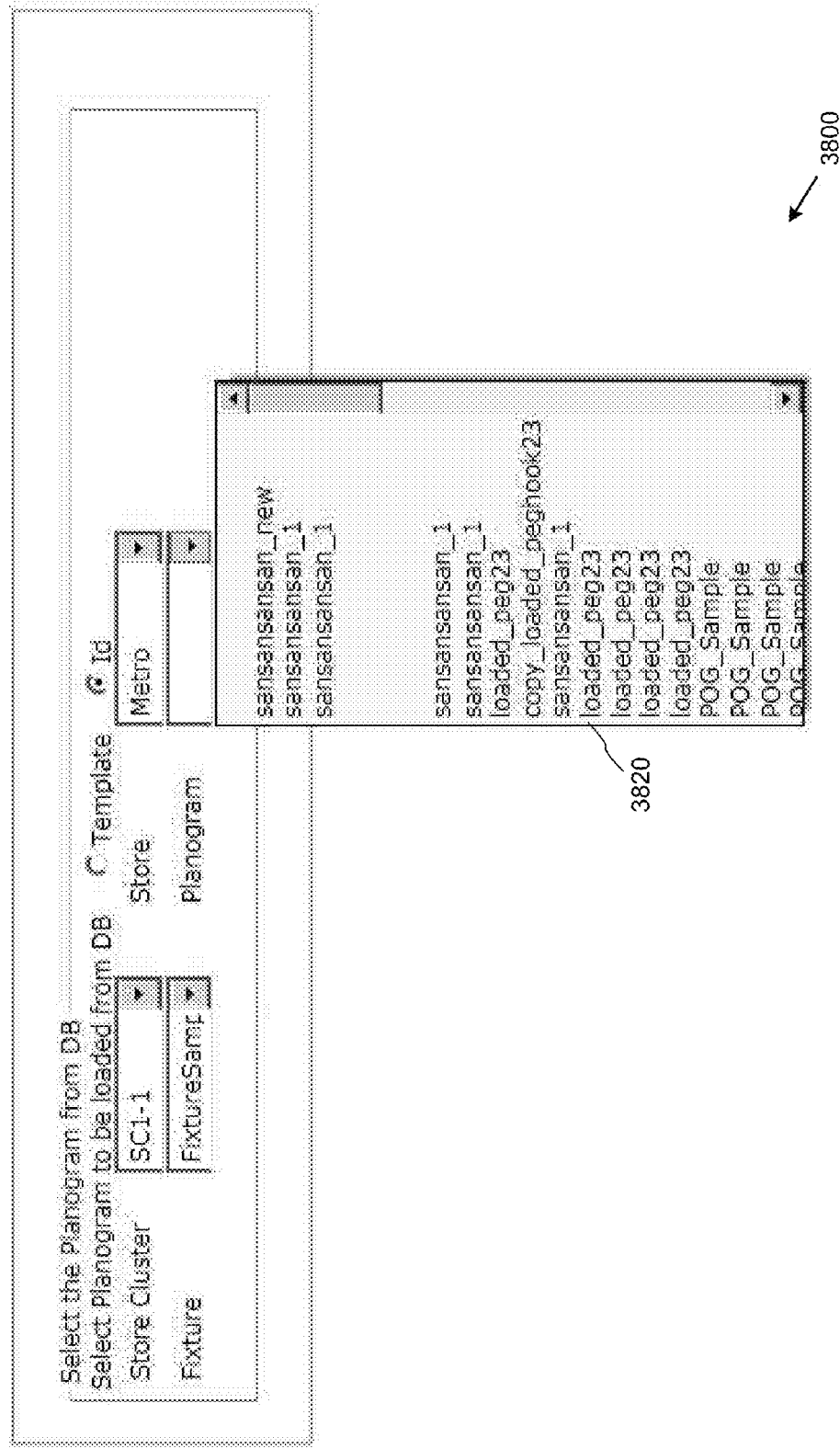

FIG. 38 shows a user interface 3800 that can be used to assist a user in finding the source business resource (e.g., represented by an entity, such as a document). In the example, a user can specify a planogram to be loaded from the database. The source can be specified by specifying a template or using the user interface to find the identifier of a source business resource. In the example user can specify a store cluster, store, and fixture. Responsive to the user's input, a drop down box 3820 then presents the identifiers of various source documents that are available according to the user's specified input. The user can then select the identifier of the desired source document from the drop down box 3820.

Figure 39:
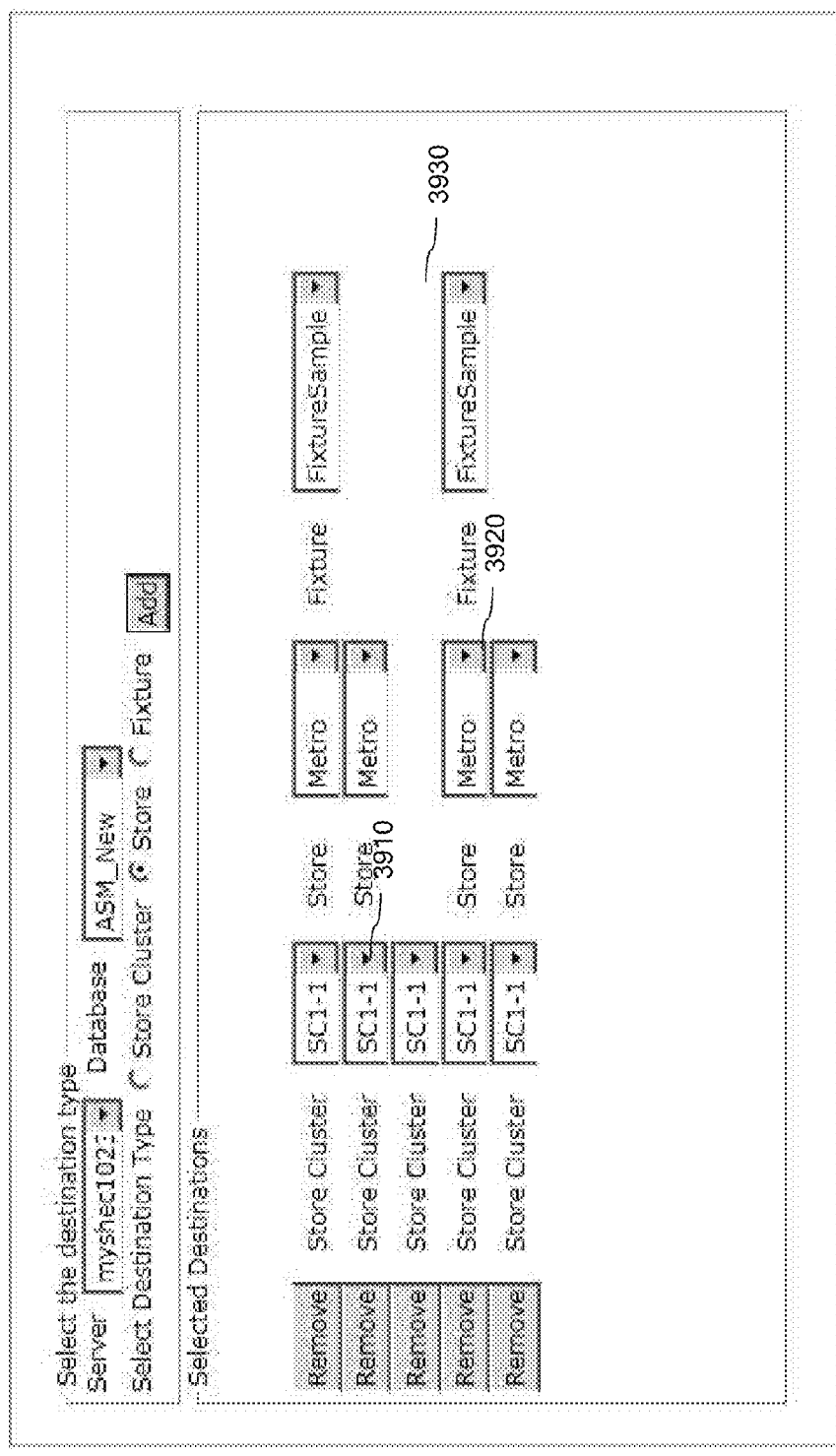

FIG. 39 shows another user interface 3900 that can be used to specify destinations. In practice, the destinations are specified as business resources. The enterprise automation framework been intelligently copies the source multiple times, once for each of the specified respective business resources, resulting in a plurality of transformed documents.

In the example, a destination can be of any of a plurality of destination types. Such destination types can include a store cluster (e.g., the stores in the cluster), a store, or fixture. A user can specify a store cluster in the user interface 3900 by specifying a store cluster identifier via a drop down box 3910. Responsive to receiving the store cluster identifier, the enterprise automation framework will perform processing for respective stores in the cluster.

A user can specify a store in the user interface 3900 by specifying a store cluster. Responsive to receiving the store cluster the user interface can present a drop down box 3920 that lists identifiers of the stores in the cluster. Responsive to a selection of a particular store in the drop down box 3920, the enterprise automation framework will perform processing for the specified store.

A user can specify a fixture in the user interface 3900 by specifying a store cluster and a store. Responsive to receiving the store cluster and the store, the user interface can present a drop down box activated by a user interface element 3930 that lists fixtures of the store. Responsive to a selection of a particular fixture in the drop down box, the enterprise automation framework will performs processing for the specified fixture.

In addition to being able to support selection of a single cluster, store, or fixture via the drop down boxes, the user interface can present a list that accommodates checking one or more of the listed identifiers. For example, when a user drills down to the fixture level, the user can select a plurality of the listed fixtures by activating checkmarks or checkboxes, which are displayed proximate to the selected fixtures.

Figure 40:
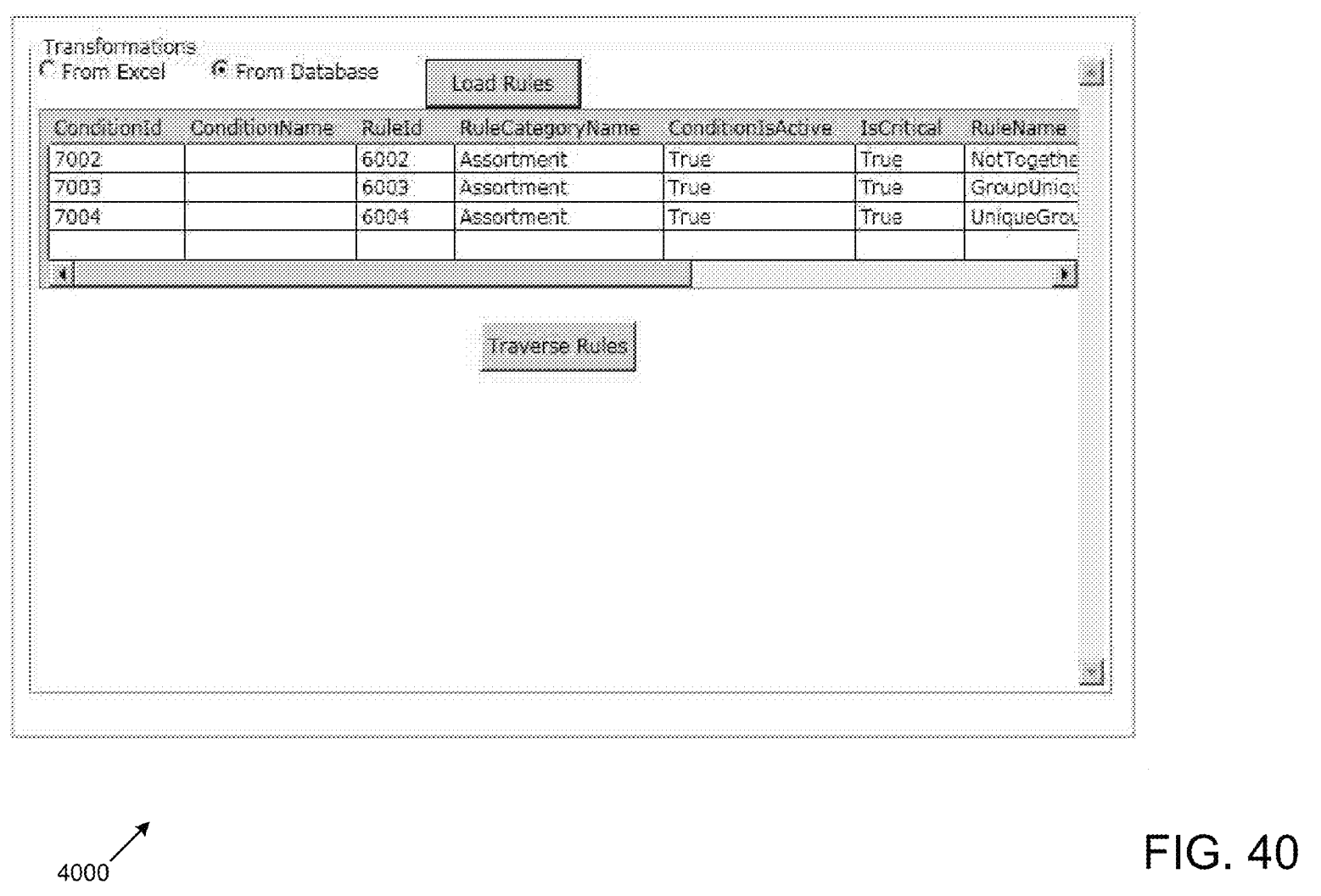

A user can specify a set of rules by which the documents are transformed via a user interface 4000 of FIG. 40. In the example, rules are stored in a spreadsheet format (e.g., according to Microsoft® Excel® spreadsheet software). The user interface 4000 can display the rules for review by the user. Although not shown, a user interface element (e.g., "Run" button) can be presented by which the user activates the enterprise automation framework's functionality. Another user interface element can be presented by which the user can enable parallel computing (e.g., a radio button or checkbox to turn on parallel computing). The inputs can be validated before processing commences.

Responsive to having selected parallel computing, the enterprise automation framework can engage the enterprise computing framework and specify that parallel computing is to take place. Parallel computing can take the form of parallel processing of the rules (e.g., via rules engines that are distributed across in a set of servers), parallel processing of the distribution of the documents (e.g., to ensure the documents are reliably copied to plural locations), or both.

When the enterprise automation framework's functionality is engaged, the source documents are replicated. For example, in the case of a planogram, the documents can be replicated by inserting appropriate data into a database. As has been described herein, the documents can take the form of logical documents. Therefore, the copying can be done without creating a plurality of physical documents. Instead, various records in the database can be created to represent the transformed documents. For example, if a planogram is to be replicated to n stores, n new records can be created in the database to represent the transformed planograms. Of course, in practice, the structure can be more complicated and involve additional records that are created in other tables of the database. However, using the database as described to represent logical documents provides a domain-independent framework by which any of a variety of domain-specific documents can be transformed without having to write domain-specific code.

During execution, activities and errors can be stored as audit data, providing audit trail functionality. Such data can include time stamps and other associated information.

Example 81

Exemplary Configuration of Frameworks in Retail Context: Enterprise Computing Framework and Enterprise Automation Framework An enterprise automation framework can be configured to operate in the retail context. To use the enterprise automation framework, the enterprise computing framework is also typically configured to work in conjunction.

In one implementation, the frameworks are configured by two main configuration files: a settings file (e.g., Settings.config) and a policy description file (e.g., PolicyDescriptionScript.xml). To achieve configuration, the configuration files can be kept with the application that is implemented via the framework.

The settings file can include client side settings, a reference to the policy description file, connection strings (e.g., pointing to the main database), and a reference to a thread workflow service (e.g., ThreadWFServiceURL, which specifies a URL).

The policy description file can be modified as described herein to specify how tasks and jobs are to be broken down for processing.

Configuration can also include an initial database that includes various generic configuration settings for the frameworks.

Configuration can also include a deploying various services such as age of executor service, a process monitor, and a thread workflow service.

The job executor service can be deployed by running a setup utility (e.g., setup.msi). A configuration file (e.g., app.config, jobExecutor.exe.Config, or the like) associated with the thread workflow service can be configured. The configuration file can specify the base address (e.g., IP address) of the local host for the service. If desired, an unused port number can also be specified. The base address can also be specified in the resources table of the main database.

The thread workflow service configuration file can also specify where the settings configuration file is found.

A services window can be opened (e.g., by running services.msc or via menu). The job executor service can be started by the services window. Any execution assemblies for the machine being configured can be placed in the path specified in the configuration files. In the policy description file, the execution assembly path can be mentioned for each job.

The process monitor can be deployed as follows. A setup utility can be executed to install the process monitor service. After installation, the configuration file (e.g., app.config, jobExecutor.exe.Config, or the like) associated with the process monitor service can be configured. The configuration file can specify the base address (e.g., IP address) of the local host for the service. If desired, an unused port number can also be specified.

The process monitor service configuration file can also specify where the settings configuration file is found.

A services window can be opened (e.g., by running services.msc or via menu). The process monitor service can be started by the services window.

The thread workflow service can be deployed as follows. A setup utility can be executed to install the process monitor service. After installation, the configuration file (e.g., app.config, jobExecutor.exe.Config, or the like) associated with the thread workflow service service can be configured. The configuration file can specify the base address (e.g., IP address) of the local host for the service. If desired, an unused port number can also be specified.

The process monitor service configuration file can also specify where the settings configuration file is found.

A services window can be opened (e.g., by running services.msc or via menu). The thread workflow service can be started by the services window.

Next, to accommodate an event messages, an xml file with the event messages can be placed into appropriate folder (e.g., "bin").

In the application configuration file the connection string to the entity (e.g., planogram document) database can be specified.

A connection string where rules are defined in the database can also be specified.

An enterprise computing framework database can specify job executor service details. Appropriate changes in a resource details table can be made to reflect the appropriate details for the service.

In the rules database, the parser assembly path in the table "condition handler master" can be changed.

The service URL of the job executor service can be mentioned in the host program. The service can be kept running.

The job executor service configuration file can have a key in the app settings section to hold the ECF database connection string.

Example 82

Figure 41:
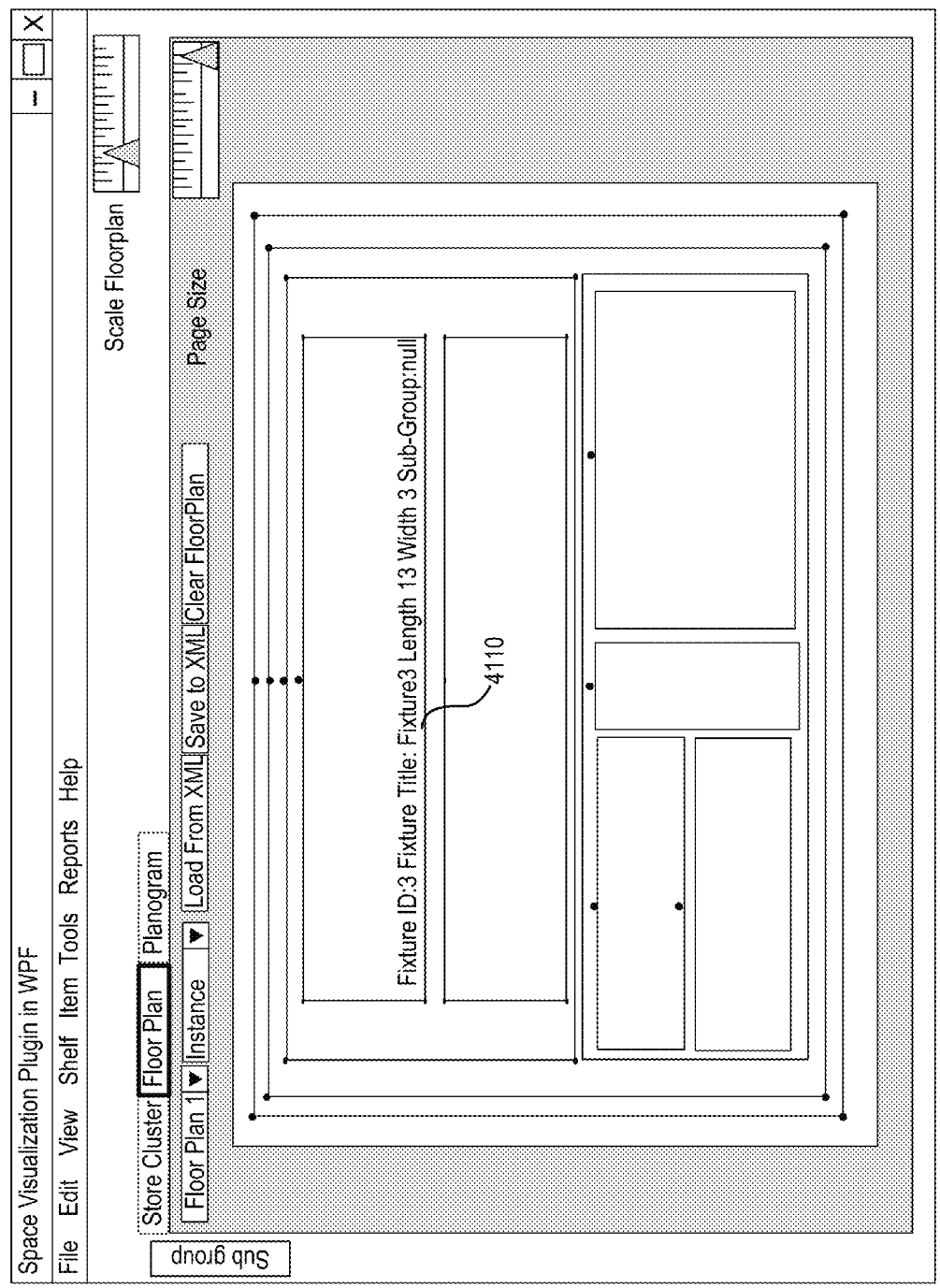
FIGS. 41 and 42 are screen shots of exemplary user interfaces for providing a visualization of business entities.
Figure 42:
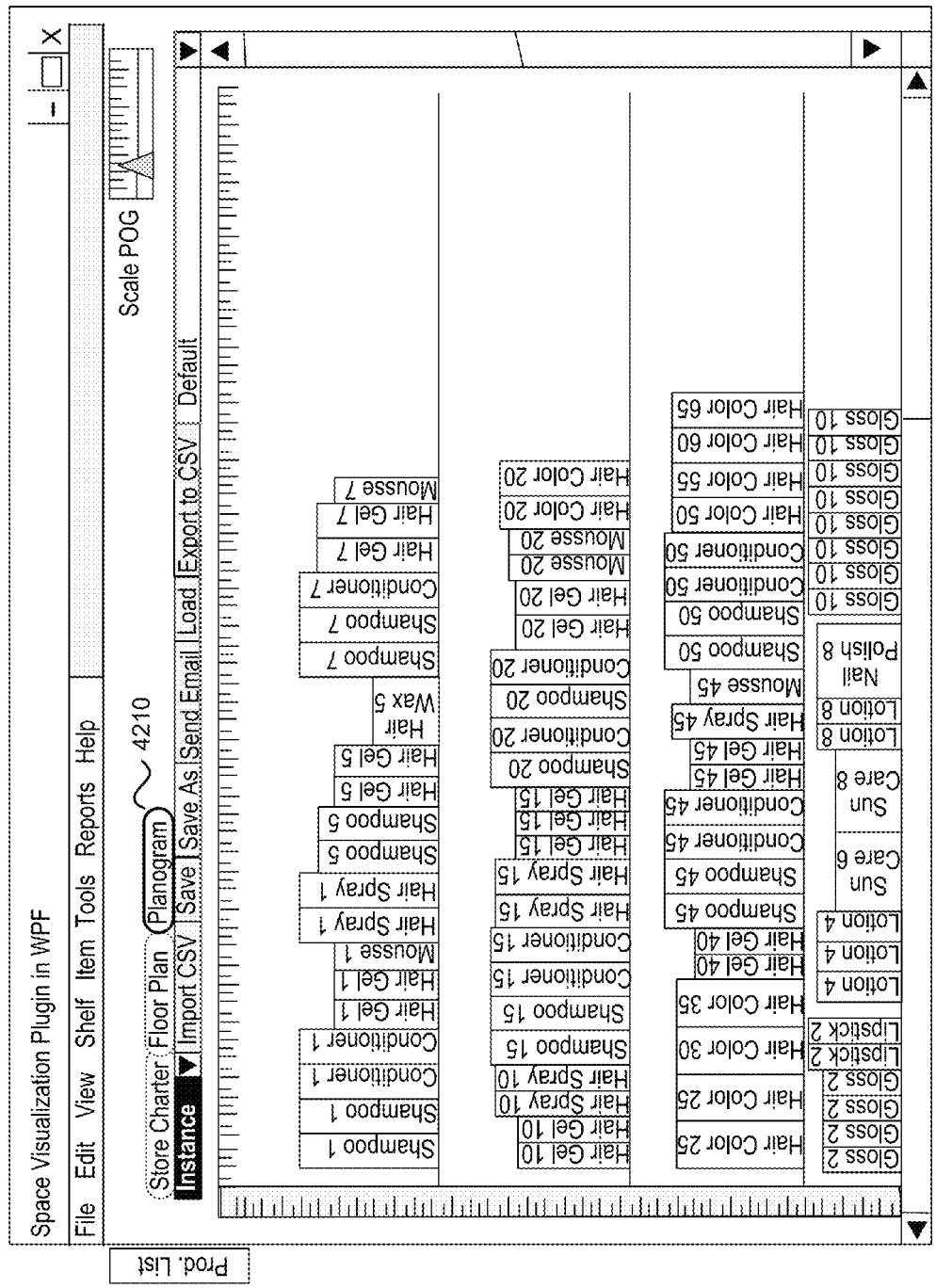

Exemplary Configuration of Frameworks in Retail Context: Space Visualization Framework FIGS. 41 and 42 are screen shots of exemplary user interfaces for providing a visualization of business entities. Store floors are represented by floor plans, and fixtures are represented by planograms, both of which can be implemented as logical documents in the extensible view architecture and displayed by a space visualization framework.

In the examples, zooming (e.g., scaling) is supported (e.g., via a user interface slider or other mechanism), and the user can navigate to different levels of the hierarchy (e.g., cluster, floor plan, planogram) by use of tabs 4210 across the top of the viewing area.

Hovering over a particular resource causes identifying information 4110 to be displayed.

Individual items appearing on the resources can be selected for movement, deletion, or editing.

A planogram representation shown in FIG. 42 can depict spatial arrangement of product on a fixture (e.g., shelves). Representation of product can be by name a shown, by color, shading, or other differentiating characteristic. A graphic mock up of the product (e.g., a bitmap representing a can of hair spray) can be used to more realistically portray the product arrangement.

Example 83

Exemplary Further Features: Common Extensible Pattern Architecture Framework

The extensible view architecture and smart proxy (e.g., together or separately) can provide a variety of features.

Create, read, update, and delete (CRUD) operations can be provided and managed as a service on logical and/or physical entities (e.g., business documents).

Non-view entities can be converted to views, and views can be converted to non-view entities.

The framework can be built using reusable components such as a view provider (e.g., base and specific), dispatcher, receiver, event manager, view manager (e.g., base and specific), use case manager, entity manager, and document manager.

Location independence can be provided so that any of the components can be deployed on different servers of a network to implement distributed computing.

The framework can be totally independent of any particular domain implementation.

Example 84

Exemplary Further Features: Space Visualization Framework

The space visualization framework can be implemented as a totally generic framework that can work for thick clients or thin clients, and can apply to any domain where space visualization is involved.

The space visualization framework can provide an amalgamation of space visualization with space automation plus space optimization all under one umbrella leading to one-click space management.

Reference implementations can be provided as examples along with interfaces specific to a particular domain (e.g., retail) for better understanding by developers.

Many reusable components such as drag-and-drop framework, optimization framework, rules integration framework, rules execution framework, what-if-analysis framework, document/entity linkages maintenance and management framework, space maintenance framework, space plans comparison framework, space analytics, reporting, and business intelligence can be included in the framework.

Example 85

Exemplary Further Features: Enterprise Automation Framework

The enterprise automation framework can support both blind copying and intelligent copying. Rules for intelligent copying can be provided from a variety of sources (e.g., a database, a spreadsheet, or the like). Data can be copied across multiple service are distributed processing. After transformation the space visualization framework can be used to display the transformed documents and further modify them according to user requirements.

The entire process can be secure, ensuring data integrity (e.g., transactions).

The entire set of activities can be logged. The resulting logs can be viewed to determine audit trail and error logging.

The enterprise automation framework can be integrated with dynamic rules and a dynamic rules engine for intelligent data transformation from source to destination(s).

The framework can cater to distributed computing and/or processing.

The framework can integrate with parallel computing so that intelligent transformation can be done in less time with utilization of available resources.

Auto error recovery can be supported.

A visual display can be provided after intelligent transformation so that a user can rework on transformed data (e.g., via interactive transformation and visualization).

Transactional processing, data-integrity checks, secure transformation, and intelligent transformation can be supported.

The framework can provide extended support to what-if analysis after the intelligent transformation takes place.

Batch jobs, complex workflows (e.g., including manual interventions, real-time-, near-real-time, and deferred workflows) can be automated.

The framework can provide a gigantic workflow engine that can break down execution requests hierarchically and/or recursively.

The enterprise automation framework can provide workflow-based automation using a transformations matrix for large scale high computing and complex enterprise jobs.

Example 86

Exemplary Further Features: Enterprise Computing Framework

The enterprise computing framework can manage break down and execution of large requests.

The framework can also provide centralized execution of requests and/or jobs; reduce the time taken for execution of requests; reduce the cycle time for a request by breaking it into smaller jobs; and prioritize and execute tasks in parallel.

The framework can also in able use of the cloud by acting as a cloud service provider, cloud service customer, or cloud service choreographer.

The framework can provide large-scale improvement in productivity; a lightweight component deployed in the client system; ease of maintenance; centralized request break-down and submission of jobs for processing; and request break-down handlers deployed on a central server.

Database in queue interaction from a central server can take advantage of connection pooling; therefore, performance can be improved.

The framework can provide ease of maintenance by storing configuration policy files on a central server.

The framework can provide superior tracking, control, and reporting due to use of a centralized database.

The framework can also provide seamlessly integrated features such as managed request break-down into jobs; a monitoring framework; a recovery framework (e.g., at both the request level and job level); usage of handlers provided by client applications as thread execution providers; centralized, transparent business policy-based handling; loosely coupled, location independent execution; workload calculation; real-time asynchronous capabilities; generic nature; flexible request management; a multiprotocol abstraction layer; and an option to plug-in a dynamic policy-based load balancing server.

The framework can include a cloud abstraction layer, so that the framework can work independently of the cloud service provider (e.g., the framework can utilize the services of any number of cloud service providers or protocols).

The framework can cater to the following core principles: flexibility to run in synchronous or asynchronous mode; configurability provides flexible, generic configuration policies for request break-down, processing, messaging, recovery (e.g., request level and job level), and thread management.

A single entry point with a simple interface can be provided. Accordingly, the client program only needs to provide the policy and respective handlers.

An interface trip and design can be supported. Accordingly, component functionality can be isolated from each other. Clients can provide policies and handlers.

The framework can also provide flexibility in the form of genericness across usage and business domains.

Recovery features, workflow management features, real-time bookkeeping features, process monitoring, thread monitoring, and response management features can be provided by the framework.

Example 87

Exemplary Further Information

In any of the examples herein, the described technologies can provide a generic framework processing requests broken down into smaller jobs that can be executed as individual units in parallel, reducing the overall time required.

The technologies can utilize available IT resources and provide optimal managed execution.

The technologies can provide transparent execution, monitoring, and auto-recovery facilities.

The technologies can be integrated with a rules engine and a workflow engine for support.

The technologies can satisfy the need for virtual computing in the cloud.

The technologies can bring unification of traditional, parallel, smart, grid, and cloud computing under one umbrella.

Exemplary components of an enterprise computing framework can include job submission console with client request handler; request manager; request workflow manager with indicative sample break-down and execution handler; job workflow manager; thread workflow manager; scheduler; enterprise resource configurator; process monitor; recovery manager; response manager; and a job status console.

The technologies described herein can provide a smart, flexible, extensible, an adaptive parallel computing framework. The technologies can handle requests which can be broken down into smaller pieces or jobs. The technologies can provide centralized monitoring for execution of requests/jobs. The technologies can provide distributed execution driving optimal usage of available resources. The technologies can prioritize and execute tasks in parallel.

Benefits include large-scale improvement in throughput with ease of maintenance; scalable, fault tolerant, distributed computing; generic technologies usable across domains; centralize request break-down, distributed processing; workflow management at request and job level; asynchronous processing; intelligence of load balancing, distributed grid management; better tracking, process monitoring, and control; recovery, bookkeeping, notification, and reporting; a lightweight component deployed in the client system.

The framework can be used across multiple business domains that involve jobs that can be broken down into smaller parallel tasks. Such domains include retail and logistical applications; shipping, cargo, and transportation; engineering and utilities; office administration and planning; real estate, apartment, asset management; manufacturing; banking, insurance, and financial services; communication, media, and entertainment.

Example 88

Exemplary Computing Environment

The techniques and solutions described herein can be performed by software, hardware, or both of a computing environment, such as one or more computing devices. For example, computing devices include server computers, desktop computers, laptop computers, notebook computers, netbooks, tablet devices, mobile devices, and other types of computing devices.

Figure 43:
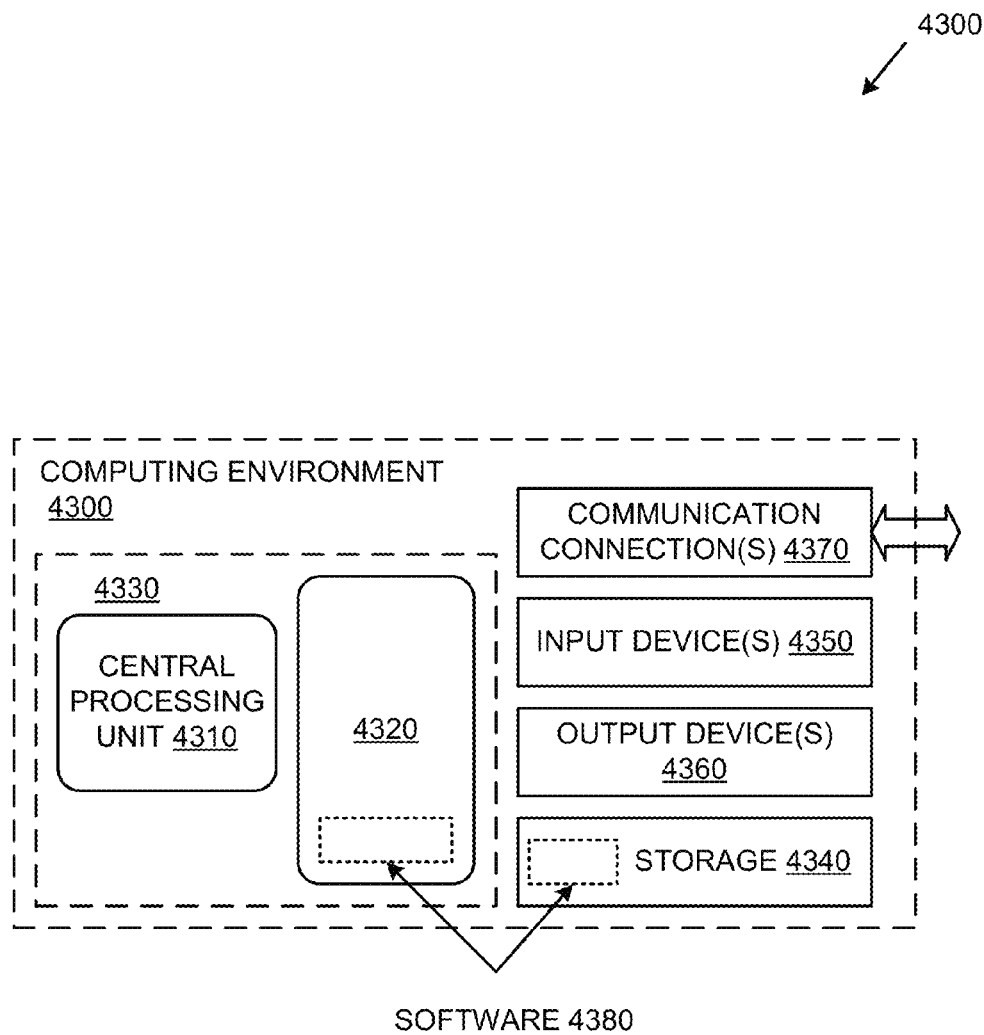
FIG. 43 is a block diagram of an exemplary computing environment suitable for implementing any of the technologies described herein.

FIG. 43 illustrates a generalized example of a suitable computing environment 4300 in which the described technologies can be implemented. The computing environment 4300 is not intended to suggest any limitation as to scope of use or functionality, as the technologies may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 43, the computing environment 4300 includes at least one processing unit 4310 coupled to memory 4320. In FIG. 43, this basic configuration 4330 is included within a dashed line. The processing unit 4310 executes computer-executable instructions and may be a real or a virtual processor. In a multi-processing system, multiple processing units execute computer-executable instructions to increase processing power. The memory 4320 may be volatile memory (e.g., registers, cache, RAM), non-volatile memory (e.g., ROM, EEPROM, flash memory, etc.), or some combination of the two. The memory 4320 can store software 4380 implementing any of the technologies described herein.

A computing environment may have additional features. For example, the computing environment 4300 includes storage 4340, one or more input devices 4350, one or more output devices 4360, and one or more communication connections 4370. An interconnection mechanism (not shown) such as a bus, controller, or network interconnects the components of the computing environment 4300. Typically, operating system software (not shown) provides an operating environment for other software executing in the computing environment 4300, and coordinates activities of the components of the computing environment 4300.

The storage 4340 may be removable or non-removable, and includes magnetic disks, magnetic tapes or cassettes, CD-ROMs, CD-RWs, DVDs, or any other computer-readable media which can be used to store information and which can be accessed within the computing environment 4300. The storage 4340 can store software 4380 containing instructions for any of the technologies described herein.

The input device(s) 4350 may be a touch input device such as a keyboard, mouse, pen, or trackball, a voice input device, a scanning device, or another device that provides input to the computing environment 4300. For audio, the input device(s) 4350 may be a sound card or similar device that accepts audio input in analog or digital form, or a CD-ROM reader that provides audio samples to the computing environment. The output device(s) 4360 may be a display, printer, speaker, CD-writer, or another device that provides output from the computing environment 4300.

The communication connection(s) 4370 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computer to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Other Features

A. A computer-implemented method comprising:
in a computer-system, receiving an indication from a user of one or more reference implementation layers;
responsive to receiving the indication from the user, accessing one or more reference implementations corresponding to the one or more reference implementation layers; and
configuring one or more domain-independent frameworks according to the one or more reference implementations;
wherein at least one of the one or more reference implementation layers is an intermediate reference implementation layer.

B. An enterprise computing platform stored on one or more computer-readable media and comprising:
an enterprise automation framework configured to transform one or more documents to a plurality of transformed documents according to business rules, wherein the enterprise automation framework is configured to send a request to an enterprise computing framework;
the enterprise computing framework, wherein the enterprise computing framework is configured to break down the request into a plurality of jobs and send the plurality of jobs to different servers based on server availability and capacity; and
an extensible view architecture framework configured to provide user interface interaction with the plurality of transformed documents.

C. The enterprise computing platform of claim B wherein:
the extensible view architecture framework is domain independent; and
the enterprise computing platform further comprises at least one domain-specific domain mapper configured to extend domain-independent functionality of the extensible view architecture framework to domain-specific functionality.

D. The enterprise computing platform of claim C wherein:
the at least one domain-specific domain mapper extends retail user interface functionality.

E. The enterprise computing platform of claim B wherein:
the extensible view architecture framework is further configured to store a logical document, wherein the logical document comprises one or more logical document elements comprising content drawn from a plurality of source documents stored in a data source.

F. The enterprise computing platform of claim B further comprising:
a common extensible pattern architecture framework, which comprises the extensible view architecture framework and a smart proxy.

G. The enterprise computing platform of claim B further comprising:
a hierarchical visualization framework configured to support user interface manipulation of hierarchically-arranged entities.

H. The enterprise computing platform of claim G wherein:
the hierarchical visualization framework implements spatial hierarchical visualization.

I. One or more computer-readable devices comprising computer-executable instructions for performing a method comprising:
receiving a request to generate a plurality of transformed documents according to business rules associated with a plurality of respective business locations;
breaking the request down into a plurality of jobs according to a policy description;
based on periodic monitoring of availability and capacity of a plurality of possible servers, sending the plurality of jobs to respective of the plurality of possible servers, wherein the plurality of jobs collectively generate the plurality of transformed documents;
managing the plurality of jobs for failure recovery and job dependencies;
storing content of the plurality of transformed documents in a data source as one or more source documents;
receiving a request from a view provider for a view of a document out of the plurality of transformed documents;
responsive to the request for the view, generating a logical document representing the document, wherein the logical document comprises a plurality of logical document elements drawn from the one or more source documents;
further responsive to the request for the view, generating a logical view based on the logical document and comprising content from one or more of the plurality of logical document elements; and
providing the logical view to a view provider for presentation as a rendered view.

J. The one or more computer-readable devices of claim I wherein:
processing the logical view with a programming object of an object class derived from a domain-independent entity object class, wherein the object class derived from the domain-independent entity object class comprises domain-specific attributes or callable methods.

K. A method comprising:
in a computer system, receiving a request to perform processing in an enterprise automation framework customized by configuration information;
from the configuration information, reading policy description information for the request;
breaking the request into a plurality of jobs according to the policy description information;
assigning the plurality of jobs to respective servers;
sending the plurality of jobs to the respective servers for processing;
receiving results of the processing from the respective servers; and
indicating a status of the request.

L. One or more computer-readable devices comprising computer-executable instructions causing a computer system to perform the method of claim K.

M. The method of claim K wherein:
the policy description information is of a format according to a XML schema;
the XML schema specifies one or more tags for parallel processing; and
the XML schema specifies one or more tags for specifying retries on a per-job basis.

N. The method of claim K further comprising:
accepting the policy description information from a graphical user interface.

O. The method of claim K wherein:
breaking the request into a plurality of jobs comprises breaking the request in accordance with the policy description information.

P. The method of claim K further comprising:
receiving at least a portion of the policy description information from a programming object.

Q. The method of claim K wherein:
the policy description information comprises configuration information specifying how to process a job error.

R. The method of claim K wherein:
the policy description information comprises configuration information specifying how many times a job is to be retried.

S. The method of claim R wherein sending the plurality of jobs to respective servers comprises:
resending a job that has failed responsive to a determination that the configuration information indicates that retries remain.

T. The method of claim K wherein:
the policy description information comprises configuration information specifies at least one job concurrency relationship; and
sending the plurality of jobs respects the at least one job concurrency relationship.

U. The method of claim K wherein:
the policy description information comprises configuration information specifying a job bundle comprising a plurality of jobs.

V. The method of claim K further comprising:
receiving a request to execute a job; and
responsive to receiving the request, invoking a thread execution handler provided as part of the configuration information.

W. The method of claim K further comprising:
monitoring workload at the respective servers; wherein assigning the plurality of jobs to respective servers comprises evaluating the workload and assigning the plurality of jobs accordingly.

X. One or more computer-readable storage media comprising computer-executable instructions causing a computer to perform a method comprising:
  receiving a request to execute a bundle of jobs;
  receiving configuration information for the bundle of jobs, wherein the configuration information comprises a reference to a programming object;
  responsive to detecting the reference to the programming object, sending a request to the programming object for policy description information;
  receiving from the programming object, policy description information specifying per-job retry information, and one or more job concurrency relationships;
  assigning the jobs to respective different servers for execution, respecting the one or more job concurrency relationships;
  detecting a failure of a job;
  responsive to detecting failure, retrying the job in accordance with the per-job retry information;
  detecting successful completion of the bundle of jobs;
  responsive to detecting successful completion of the bundle of jobs, indicating success of the request.

Y. An enterprise computing framework stored on one or more computer-readable media and comprising:
  a request handler configured to receive a request;
  a request workflow manager configured to break the request down into a plurality of jobs according to a policy description;
  an enterprise resource config configured to manage details of servers executing in a network, wherein the details comprise availability of a server and capacity of the server;
  a scheduler configured to schedule the plurality of jobs according to job dependencies specified in the policy description and server availability as indicated by the enterprise resource config;
  a process monitor configured to monitor whether jobs complete successfully and identify a failed job, and orchestrate a retry request for the failed job based on the policy description; and
  a recovery manager configured to receive the retry request from the process monitor and implement a retry for the failed job, wherein a number of allowable retries is specified in the policy description, and the enterprise computing framework respects the number of allowable retries specified.

Z. The enterprise computing framework of claim Y further comprising:
  a job workflow manager;
  a thread workflow manager; and
  a response manager.

AA. The enterprise computing framework of claim Y wherein:
  the policy description accommodates a different number of retries for different jobs.

BB. The enterprise computing framework of claim Y wherein:
  the policy description accommodates dependencies between jobs; and
  the enterprise computing framework executes the jobs according to the dependencies.

CC. A computer-implemented method comprising:
  in a computer system, receiving a request to generate a plurality of transformed documents, wherein the request specifies a plurality of destinations;
  receiving a source document representing a standardized business entity;
  repeatedly transforming the source document according to the request and business rules, the transforming generating the plurality of transformed documents; and
  repeatedly storing the plurality of transformed documents as associated with respective destinations.

DD. The computer-implemented method of claim CC wherein:
  the source document represents a standardized business resource; and
  the plurality of transformed documents represent customized versions of the standardized business resource, wherein the customized versions represent a plurality of respective destination business resources; and
  transforming the source document comprises customizing the source document according to rules associated with respective of the destination business resources.

EE. The computer-implemented method of claim DD wherein:
  the source document represents a standardized planogram for a retail store; and
  the plurality of transformed documents represent customized versions of the standardized planogram, wherein the customized versions represent a plurality of respective fixtures.

FF. The computer-implemented method of claim CC wherein storing the plurality of transformed documents comprises:
  storing the plurality of transformed documents as logical documents in a database.

GG. The computer-implemented method of claim CC wherein repeatedly transforming the source document comprises:
  transforming the source document at two different servers having separately executing local transformation engines.

HH. The computer-implemented method of claim CC further comprising:
  receiving a request to view a transformed document out of the plurality of transformed documents; and
  responsive to the request, presenting the transformed document in a user interface provided by a space visualization framework.

II. The computer-implemented method of claim CC wherein:
  repeatedly transforming the source document comprises enforcing transaction processing discipline on database operations.

JJ. The computer-implemented method of claim CC wherein the request is received by an enterprise automation framework, them method further comprising:
  logging activities of the enterprise automation framework; and
  based on the logged activities, providing an audit trail for display to a user.

KK. A software development kit comprising:
  an extensible view architecture framework encoded on one or more computer-readable media;
  one or more reference implementations encoded on the one or more computer-readable media.

LL. A computer-implemented method of developing software comprising:
  receiving a request to build a new software application;
  presenting a user interface accepting an indication of a business domain;
  receiving an indication of the business domain;
  responsive to receiving an indication of the business domain, selecting a pre-coded reference implementation for the business domain; and customizing a domain-independent framework for the business domain, wherein the customizing comprises merging the domain-independent framework with the pre-coded reference implementation for the business domain, wherein the merging comprises indicating object classes derived from domain-independent object classes of the domain-independent framework.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. One or more non-transitory computer-readable devices comprising computer-executable instructions for performing a method comprising:
   in an extensible view architecture framework providing a document-centric platform, receiving a request to interact with a logical document, wherein the request to interact comprises a request to perform an edit operation on the logical document;
   responsive to receiving the request, processing the request according to configuration information associated with the logical document and stored for the extensible view architecture framework, wherein the processing comprises directing method calls to a programming object of a domain-specific object class derived from a domain-independent base object class specified in the configuration information;
   collecting content of one or more logical document elements from one or more locations within a data source, wherein the content is collected from an original source document in the data source, content of the original source document is filtered, and the content of the one or more logical document elements does not have all the content of the original source document;
   constructing a logical view of the logical document based on the one or more logical document elements, wherein the one or more logical document elements are arranged hierarchically in a spatial context; and
   providing access to the logical view for consumption by a view provider;
   wherein the logical view is of a format for consumption by a plurality of different view provider types, wherein the method further comprises:
   receiving a request to display the logical document according to the logical view;
   displaying the logical document according to the logical view, wherein the displaying comprises depicting the one or more logical document elements as spatially within the logical document;
   receiving edits to the logical view of the logical document; and
   saving the logical view, wherein saving the logical view comprises leaving the content of the original source document in the data source as unchanged, and saving changes from the edits as a separate list of changes to a base document;
   wherein at least one logical document element of the one or more logical document elements itself contains further sub-elements that are depicted as spatially within the at least one logical document element.

2. The one or more non-transitory computer-readable devices of claim 1 wherein:
   the logical view is encapsulated in the programming object of the domain-specific object class.

3. The one or more non-transitory computer-readable devices of claim 1 wherein:
   the class derived from the domain-independent base object class contains domain-specific callable methods for processing domain-specific aspects of the logical document.

4. The one or more non-transitory computer-readable devices of claim 1 wherein:
   the extensible view architecture framework supports location independence.

5. The one or more non-transitory computer-readable devices of claim 1 further comprising:
   representing the logical document internally as a logical document comprising one or more logical document elements, wherein the content of the one or more logical document elements are stored as source documents in one or more locations within a data source.

6. The one or more non-transitory computer-readable devices of claim 5 further comprising:
   storing hierarchical relationships within the logical document; and
   outputting the hierarchical relationships to a view provider for presentation by the view provider.

7. The one or more non-transitory computer-readable devices of claim 1 further comprising:
   instantiating a view manager as a view manager programming object; and
   managing the logical view with the view manager.

8. The one or more non-transitory computer-readable devices of claim 7 wherein:
   the view manager programming object is of an object class derived from the domain-independent base object class.

9. The one or more non-transitory computer-readable devices of claim 1 further comprising:
   instantiating the logical view as a logical view programming object;
   wherein the logical view programming object is of an object class derived from the domain-independent base object class.

10. The one or more non-transitory computer-readable devices of claim 9 wherein:
    the domain-independent object class comprises:
    a callable method drawing the logical view; and
    a callable method capturing the logical view.

11. The one or more non-transitory computer-readable devices of claim 1 wherein:
    the logical view is of a view-provider-independent form.

12. The one or more non-transitory computer-readable devices of claim 11 wherein providing access comprises:
    providing a reference to the logical view to a view provider for translation from the logical view to a rendered view.

13. The one or more non-transitory computer-readable devices of claim 12 further comprising:
    presenting the rendered view, wherein the presenting visually presents a presentation of the logical document.

14. The one or more non-transitory computer-readable devices of claim 1 wherein:
collecting the content comprises accessing a serialized version of content of the logical document in a database;
drawing content of one or more logical view elements from the serialized version of the content of the logical document; and
constructing the logical view comprises representing the content of the one or more logical view elements in memory as the logical view.

15. The one or more non-transitory computer-readable devices of claim 1 further comprising:
storing rules for document transformation for a plurality of entities; and
in an enterprise automation framework, applying the rules for respective of the entities, the applying generating a plurality of transformed documents comprising the logical document;
wherein the original source document comprises an optimized source document; and
transforming a given document comprises repeatedly transforming the optimized source document.

16. The one or more non-transitory computer-readable devices of claim 15 further comprising:
storing availability and capacity information for a plurality of servers; and
based on the availability and capacity information for the plurality of servers, in an enterprise computing framework, sending a job to a server;
wherein the job performs the generating of the logical document;
based on the availability and capacity information for the plurality of servers, in an enterprise computing framework, sending a different job to a different server; and
wherein the different job performs generating of a different document.

17. The one or more non-transitory computer-readable devices of claim 16 further comprising:
in an enterprise resource and services management framework, storing configuration information for a plurality of other frameworks.

18. The one or more non-transitory computer-readable devices of claim 1 wherein the method further comprises:
receiving an attempted edit to the logical view of the logical document via a user drag operation;
detecting that the user drag operation drags an item to an impermissible location or attempts to delete an essential item; and
responsive to detecting that the user drag operation drags an item to an impermissible location or attempts to delete an essential item, obtaining approval of another party before implementing the user drag operation.

19. The one or more non-transitory computer-readable devices of claim 1 wherein the original source document comprises an optimized source document and the method further comprises:
transforming the optimized source document repeatedly, wherein the transforming generates a plurality of transformed documents.

20. A method implemented at least in part by one or more computing devices, the method comprising:
in an extensible view architecture framework providing a document-centric platform, receiving a request for a view of a logical document comprising one or more logical document elements of the logical document;
responsive to the request, accessing the logical document according to configuration information stored for the extensible view architecture framework, wherein accessing the logical document comprises calling at least one method on at least one programming object of a domain-specific object class derived from a domain-independent base class specified in the configuration information, the programming object representing the logical document, wherein the at least one programming object is configured to provide content of the logical document, and is based on a plurality of original source documents in a data source, wherein the plurality of original source documents for the logical document are scattered among different sources at scattered locations in the data source, wherein the original source documents comprise different source types, wherein content of the original source documents is filtered, and content of the one or more logical document elements does not have all the content of the original source documents, wherein the one or more logical document elements are arranged hierarchically in a spatial context;
further responsive to the request, providing the content of the one or more logical document elements as represented by the at least one programming object representing the logical document;
representing one logical view of the logical document out of a plurality of logical views with a programming object representing the logical view;
providing access to the programming object representing the logical view;
receiving a method call on the programming object representing the logical view to provide the logical view for display as a rendered view;
responsive to the method call, providing content in a view-provider-independent format for display as the rendered view;
displaying the logical document according to the logical view, wherein the logical view incorporates the filtered content of the original source documents that are scattered among different sources at scattered locations in the data source, wherein the original source documents comprise different source types, wherein displaying the logical document comprises depicting the one or more logical document elements as spatially within the logical document;
receiving a request to perform an edit operation on the logical document;
receiving edits to the logical view of the logical document; and
saving the logical view, wherein saving the logical view comprises leaving the content of the original source documents in the data source as unchanged, and saving changes from the edits as a separate list of changes to one or more base documents;
wherein at least one logical document element of the one or more logical document elements itself contains further sub-elements that are depicted as spatially within the at least one logical document element.

21. The method of claim 20 wherein:
the logical document is represented by a domain-independent entity object class representing an entity.

22. The method of claim 21 wherein:
the domain-independent entity object class comprises the following attributes:
identifier;
meta type;
one or more serialization attributes; and
one or more security attributes.

23. The method of claim 22 wherein:
the meta type specifies whether that the entity is a document.

24. The method of claim 22 wherein:
the meta type supports specifying that the entity is a document, a view, a business object, and a use case.

25. The method of claim 20 wherein:
the logical document is represented by an object class having domain-specific features; and
the object class having domain-specific features is derived from a domain-independent entity object class.

26. The method of claim 20 wherein:
the logical document is represented by a more domain-specific object class having more domain-specific features, and the more domain-specific object class is derived from a lesser domain-specific object class having lesser domain-specific features; and
the lesser domain-specific object class is derived from a domain-independent entity object class.

27. The method of claim 20 wherein:
the logical document is a document type out of a plurality of document types; and
features are provided for the logical document by a configurable framework according to configuration information stored as associated with the document type.

28. The method of claim 27 wherein the features are specified to indicate:
whether the logical document is a compound document.

29. The method of claim 27 wherein the features comprise: encryption.

30. A computer-implemented method of processing a plurality of documents of a plurality of different source document types, the method comprising:
in a computer system comprising a processor, representing a logical view of the documents for consumption by a view provider out of a plurality of view providers, wherein the logical view of the documents is represented via an entity object or a class derived from the entity object;
representing a logical document, wherein the logical document comprises one or more logical document elements drawing filtered content from the plurality of documents of the plurality of different source document types that are at scattered locations in a data source, and the logical document filters data from the plurality of documents of the plurality of different source document types that are at the scattered locations in the data source so that the logical document does not have all content of the documents of the plurality of different source document types, wherein the logical document is represented via the entity object or the class derived from the entity object, and the source document types comprise a spreadsheet and a database table;
storing configuration information for the different source document types, wherein the configuration information comprises a meta type indicating that the documents are documents, and the documents are original source documents in the data source;
receiving a request to view the documents;
responsive to the request, calling a method on an object class for providing content of the logical document, wherein the object class is derived from a domain-independent object class for providing content of an entity and the content is collected from the original source documents in the data source;
sending the content to the view provider for rendering as a physical view of the logical document;
representing one logical view of the logical document out of a plurality of logical views with a programming object representing the logical view, wherein the logical view incorporates the original source documents that are at the scattered locations in the data source and the one or more logical document elements are arranged hierarchically in a spatial context;
providing access to the programming object representing the logical view;
receiving a method call on the programming object representing the logical view to provide the logical view for display as a rendered view;
responsive to the method call, providing content in a view-provider-independent format for display as the rendered view, wherein the view-provider-independent format designates the one or more logical document elements as spatially within the logical document;
receiving a request to perform an edit operation on the logical document;
receiving edits to the logical view of the logical document; and
saving the logical view, wherein saving the logical view comprises leaving the content of the original source documents in the data source as unchanged, and saving changes from the edits as a separate list of changes to one or more base documents;
wherein at least one given logical document element itself contains further sub-elements that are designated as spatially within the given logical document element of the one or more logical document elements; and
wherein the documents provide a visual view of hierarchical spatial data representing store fixtures, and the one or more logical document elements comprise planograms representing a plurality of shelves onto which products are designated as placed.

* * * * *